US006370473B1

(12) United States Patent
Yasui et al.

(10) Patent No.: US 6,370,473 B1
(45) Date of Patent: Apr. 9, 2002

(54) AIR-FUEL RATIO CONTROL APPARATUS FOR MULTICYLINDER INTERNAL COMBUSTION ENGINE

(75) Inventors: Yuji Yasui; Shusuke Akazaki; Yoshihisa Iwaki, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/680,480

(22) Filed: Oct. 6, 2000

(30) Foreign Application Priority Data

Oct. 8, 1999 (JP) .......................................... 11-288511

(51) Int. Cl.[7] .......................... F02D 41/14; G05B 13/04

(52) U.S. Cl. ......................... 701/109; 123/692; 60/276; 60/285

(58) Field of Search ................................ 123/672, 673, 123/674, 679, 690, 691, 692; 60/274, 276, 285; 701/101, 102, 103, 106, 109, 114, 115

(56) References Cited

U.S. PATENT DOCUMENTS

| | | | | | |
|---|---|---|---|---|---|
| 5,694,910 | A | | 12/1997 | Hasegawa et al. | 123/674 |
| 5,813,389 | A | * | 9/1998 | Kitamura et al. | 701/109 |
| 5,845,490 | A | | 12/1998 | Yasui et al. | 60/276 |
| 5,845,491 | A | | 12/1998 | Yasui et al. | 60/276 |
| 5,852,930 | A | | 12/1998 | Yasui et al. | 60/276 |
| 5,880,952 | A | | 3/1999 | Yasui et al. | 701/103 |
| 5,924,281 | A | | 7/1999 | Yasui et al. | 60/276 |
| 5,947,096 | A | * | 9/1999 | Kurokawa et al. | 710/109 |
| 6,079,205 | A | | 6/2000 | Yasui et al. | 60/276 |
| 6,082,099 | A | | 7/2000 | Yasui et al. | 60/276 |
| 6,112,517 | A | * | 9/2000 | Yasui et al. | 60/274 |
| 6,188,953 | B1 | * | 2/2001 | Yasui et al. | 701/109 |
| 6,195,988 | B1 | * | 3/2001 | Yasui et al. | 60/285 |
| 6,256,983 | B1 | * | 7/2001 | Yasui | 60/285 |
| 6,266,605 | B1 | * | 7/2001 | Yasui et al. | 701/109 |
| 6,292,739 | B1 | * | 9/2001 | Yasui et al. | 701/109 |

FOREIGN PATENT DOCUMENTS

| | | |
|---|---|---|
| JP | 4-369471 | 12/1992 |
| JP | 5-79374 | 3/1993 |
| JP | 7-83094 | 3/1995 |
| JP | 8-21273 | 1/1996 |
| JP | 8-105345 | 4/1996 |
| JP | 11-93741 | 4/1999 |
| JP | 11-153051 | 6/1999 |

OTHER PUBLICATIONS

Serial No.: 09/153,300; filed: Sep. 15, 1998; By: Yuji Yasui et al For: Plant Control System.

(List continued on next page.)

*Primary Examiner*—Willis R. Wolfe
(74) *Attorney, Agent, or Firm*—Arent Fox Kintner Plotkin & Kahn, PLLC

(57) ABSTRACT

An exhaust system is regarded as being equivalent to a system for generating an output of an $O_2$ sensor or exhaust gas sensor from a combined air-fuel ratio that is produced by combining outputs of air-fuel ratio sensors associated with respective cylinder groups according to a filtering process of the mixed model type. With the equivalent system as an object to be controlled, an exhaust system controller determines a target value for the combined air-fuel ratio, and determines a target air-fuel ratio for the cylinder groups from the target combined air-fuel ratio. The outputs of the air-fuel ratio sensors are converted to the target combined air-fuel ratio under feedback control.

28 Claims, 16 Drawing Sheets

OTHER PUBLICATIONS

Serial No.: 09/311,353; filed: May 13, 1999; By: Yuji Yasui et al For: Plant Control System.
Serial No. 09/465,765, filed: Dec. 17, 1999; By: Yuji Yasui et al For: Air–Fuel Ratio Control System for Internal Combustion Engine.
Serial No. 09/465,395, filed: Dec. 17, 1999; By: Yuji Yasui et al For: Plant Control System.
Serial No. 09/465,766, filed: Dec. 17, 1999; By: Yuji Yasui et al For: Plant Control System.
Serial No. 09/499,975, filed: Feb. 8, 2000; By: Yuji Yasui et al For: Air–Fuel Ratio Control System for Internal Combustion Engine.
Serial No. 09/548,931; filed: Apr. 13, 2000; By: Yuji Yasui For: Plant Control System.

* cited by examiner

AIR-FUEL RATIO CONTROL APPARATUS FOR MULTICYLINDER INTERNAL COMBUSTION ENGINE

BACKGROUND OF THE INVENTION

1. Field of the Invention

The present invention relates to an apparatus for controlling the air-fuel ratio of a multicylinder internal combustion engine.

2. Description of the Related Art

Internal combustion engines having a multiplicity of cylinders, such as V-type 6-cylinder engines, V-type 8-cylinder engines, or in-line 6-cylinder engines, suffer structural limitations that make it difficult to combine exhaust gases generated by the combustion of an air-fuel mixture in the cylinders in a region close to the cylinders. Therefore, such multicylinder internal combustion engines generally have an exhaust system including relatively long auxiliary exhaust passages that extend separately from respective cylinder groups into which the cylinders are grouped. The auxiliary exhaust passages have downstream ends joined to a main exhaust passage which is shared by all the cylinders. In the exhaust system, exhaust gases from the cylinders of the cylinder groups are combined and discharged into the auxiliary exhaust passages near the cylinder groups, and then introduced from the auxiliary exhaust passages as combined exhaust gases into the main exhaust passage.

FIGS. 15 through 17 of the accompanying drawings schematically show respective V-type engines 1 each having two cylinder groups 3, 4 disposed one on each side of an output shaft, i.e., crankshaft, 2. Each of the cylinder groups 3, 4 comprises a plurality of cylinders 5 juxtaposed closely to each other in the axial direction of the output shaft 2. If the V-type engine 1 is a V-type 6-cylinder engine, then each of the cylinder groups 3, 4 comprises three cylinders. If the V-type engine 1 is a V-type 8-cylinder engine, then each of the cylinder groups 3, 4 comprises four cylinders.

The V-type engine 1 has an exhaust system including an auxiliary exhaust pipe, i.e., an auxiliary exhaust passage, 6 extending from the cylinder group 3 for receiving exhaust gases produced in the cylinders 5 of the cylinder group 3 and combined by an exhaust manifold near the cylinder group 3, and an auxiliary exhaust pipe, i.e., an auxiliary exhaust passage, 7 extending from the cylinder group 4 for receiving exhaust gases produced in the cylinders 5 of the cylinder group 4 and combined by an exhaust manifold near the cylinder group 4. The auxiliary exhaust pipes 6, 7 have downstream ends connected to a main exhaust pipe, i.e., a main exhaust passage, 8.

FIG. 18 of the accompanying drawings schematically shows an in-line 6-cylinder engine 101 having six cylinders 103 juxtaposed in the axial direction of an output shaft, i.e., a crankshaft, 102. The cylinders 103 are grouped into a right cylinder group 104 of three closely positioned cylinders 103 and a left cylinder group 105 of three closely positioned cylinders 103. The in-line 6-cylinder engine 101 has an exhaust system including auxiliary exhaust pipes, or auxiliary exhaust passages, 106, 107 extending respectively from the cylinder groups 103, 104. The auxiliary exhaust pipes 106, 107 have downstream ends connected to a main exhaust pipe, i.e., a main exhaust passage, 108.

In the above multicylinder internal combustion engines whose exhaust system includes the auxiliary exhaust passages associated with the respective cylinder groups and the main exhaust passage to which the auxiliary exhaust passages are connected in common, catalytic converters, such as three-way catalytic converters, for purifying exhaust gases are generally arranged in the following layouts:

In FIG. 15, catalytic converters 9, 10 are connected to the respective auxiliary exhaust pipes 6, 7. In FIG. 16, catalytic converters 9, 10, 11 are connected respectively to the auxiliary exhaust pipes 6, 7 and the main exhaust pipe 8. In FIG. 17, a catalytic converter 11 is connected to the main exhaust pipe 8 only.

The above catalytic converter layouts are applicable to not only the exhaust systems of the V-type engines 1 shown in FIGS. 15 through 17, but also the exhaust system of the in-line 6-cylinder engine 101 shown in FIG. 18.

It is more important than ever for exhaust gas purifying systems for use with not only the above multicylinder internal combustion engines, but also other internal combustion engines, to have catalytic converters with a reliable exhaust gas purifying capability for effective environmental protection.

In order to achieve a desired exhaust gas purifying capability of a catalytic converter irrespective of deterioration of the catalytic converter, the applicant of the present application has proposed a system having an $O_2$ sensor disposed downstream of the catalytic converter for detecting the concentration of a certain component, e.g., the concentration of oxygen, in exhaust gases that have passed through the catalytic converter. The proposed system controls the air-fuel ratio of a mixture of air and fuel combusted by an internal combustion engine for converging the output of the $O_2$ sensor, i.e., the detected oxygen concentration, to a predetermined target value, i.e., a constant value. See, for example, Japanese laid-open patent publication No. 11-93741 or U.S. Pat. No. 6,082,099, for details.

According to the disclosed arrangement, the $O_2$ sensor is disposed downstream of the catalytic converter in an exhaust system, such as for an in-line 4-cylinder engine, wherein exhaust gases from all the cylinders are combined and introduced into a single exhaust pipe near the engine and the catalytic converter is connected to the single exhaust pipe only. A target air-fuel ratio, more precisely a target value for the air-fuel ratio represented by the oxygen concentration in the exhaust gases in a region where the exhaust gases from all the cylinders are combined, is determined for an air-fuel mixture combusted by the engine in order to converge the output of the $O_2$ sensor to the predetermined target value, and the air-fuel ratio of the air-fuel mixture combusted in the cylinders of the engine is controlled depending on the target air-fuel ratio.

In view of the above technical background, there have been proposed exhaust systems for use with multicylinder internal combustion engines having auxiliary exhaust passages associated with respective cylinder groups. Each of the proposed exhaust systems controls the air-fuel ratio of the internal combustion engine in order to achieve a desired purifying capability of catalytic converters connected to the auxiliary exhaust passages and the main exhaust passage. Those proposed exhaust systems will be described below.

If the catalytic converters 9, 10 are connected to the respective auxiliary exhaust pipes 6, 7 as shown in FIG. 15, then in order to achieve a total purifying capability of the catalytic converters 9, 10, an $O_2$ sensor 12 is mounted on the main exhaust pipe 8 near an upstream end thereof where the auxiliary exhaust pipes 6, 7 are joined, and the air-fuel ratios of the air-fuel mixtures combusted in the cylinder groups 3, 4 of the engine 1 are controlled in order to converge the output of the $O_2$ sensor 12 to the predetermined target value.

If the catalytic converters 9, 10, 11 are connected respectively to the auxiliary exhaust pipes 6, 7 and the main exhaust pipe 8, as shown in FIG. 16, then in order to achieve a total purifying capability of the catalytic converters 9, 10, 11, an $O_2$ sensor 12 is mounted on the main exhaust pipe 8 downstream of the catalytic converter 11, and the air-fuel ratio of the air-fuel mixture combusted in the cylinder groups 3, 4 of the engine 1 is controlled in order to converge the output of the $O_2$ sensor 12 to the predetermined target value.

If the catalytic converter 11 is connected to the main exhaust pipe 8 only, as shown in FIG. 17, then in order to achieve a purifying capability of the catalytic converter 11, an $O_2$ sensor 12 is mounted on the main exhaust pipe 8 downstream of the catalytic converter 11, and the air-fuel ratio of the air-fuel mixture combusted in the cylinder groups 3, 4 of the engine 1 is controlled in order to converge the output of the $O_2$ sensor 12 to the predetermined target value.

Generally, due to differences in length and shape between the auxiliary exhaust pipes 6, 7 and also differences in characteristics between the catalytic converters 9, 10 connected to the auxiliary exhaust pipes 6, 7, response characteristics of changes in the output of the $O_2$ sensor 12 with respect to changes in the air-fuel ratio of the air-fuel mixture combusted in the cylinder groups 3, 4 differ between the auxiliary exhaust pipe 6, i.e., the cylinder group 3, and the auxiliary exhaust pipe 8, i.e., the cylinder group 4.

For performing the control process to converge (set) the output of the $O_2$ sensor 12 to the predetermined target value with as high stability as possible, it is desirable to determine target air-fuel ratios for the respective cylinder groups 3, 4 and control the air-fuel ratios of the air-fuel mixtures combusted in the cylinder groups 3, 4 depending on the respective target air-fuel ratios.

To determine target air-fuel ratios for the respective cylinder groups 3, 4, however, it is necessary to recognize an exhaust system, upstream of the $O_2$ sensor 12, which comprises the auxiliary exhaust pipes 6, 7 and the catalytic converters 9, 10, as a 2-input, 1-output system which generates the output of the $O_2$ sensor 12 from the air-fuel ratios of the air-fuel mixtures combusted in the cylinder groups 3, 4. Consequently, determining target air-fuel ratios for the respective cylinder groups 3, 4 requires a complex model and a complex computing algorithm for the 2-input, 1-output system. The complex model and the complex computing algorithm tend to cause a modeling error and accumulated computation errors, which make it difficult to determine appropriate target air-fuel ratios.

SUMMARY OF THE INVENTION

It is therefore an object of the present invention to provide an air-fuel ratio control apparatus for a multicylinder internal combustion engine having as many auxiliary exhaust passages as the number of cylinder groups, the air-fuel ratio control apparatus being capable of appropriately controlling air-fuel ratios of the respective cylinder groups for converging an output of an $O_2$ sensor that is disposed in a main exhaust passage downstream of a catalytic converter according to a relatively simple process without the need for a complex model and a complex algorithm.

Another object of the present invention is to provide an air-fuel ratio control apparatus for a multicylinder internal combustion engine, which is capable of performing a control process of converting an output of an exhaust gas sensor to a target value accurately and stably and hence of reliably achieving a desired purifying capability of a catalytic converter.

To achieve the above objects, there is provided in accordance with the present invention an apparatus for controlling the air-fuel ratio of a multicylinder internal combustion engine having all cylinders divided into a plurality of cylinder groups and an exhaust system including a plurality of auxiliary exhaust passages for discharging exhaust gases produced when an air-fuel mixture of air and fuel is combusted from the cylinder groups, respectively, a main exhaust passage joining the auxiliary exhaust passages together at downstream sides thereof, an exhaust gas sensor mounted in the main exhaust passage for detecting the concentration of a given component in the exhaust gases flowing through the main exhaust passage, and a catalytic converter connected to the auxiliary exhaust passages and/or the main exhaust passage upstream of the exhaust gas sensor, so that the air-fuel ratio of the air-fuel mixture combusted in each of the cylinder groups is controlled to converge an output from the exhaust gas sensor to a predetermined target value. The apparatus comprises a plurality of air-fuel ratio sensors mounted respectively in the auxiliary exhaust passages upstream of the catalytic converter, for detecting the air-fuel ratio of the air-fuel mixture combusted in each of the cylinder groups, the exhaust system including an object exhaust system disposed upstream of the exhaust gas sensor and including the auxiliary exhaust passages and the catalytic converter, the object exhaust system being equivalent to a system for generating an output of the exhaust gas sensor from a combined air-fuel ratio determined by combining the values of air-fuel ratios of air-fuel mixtures combusted by the cylinder groups, respectively, according to a filtering process of the mixed model type, and target combined air-fuel ratio data generating means for sequentially generating target combined air-fuel ratio data representing a target value for the combined air-fuel ratio which is required to converge the output from the exhaust gas sensor to the predetermined target value with the system equivalent to the object exhaust system serving as an object to be controlled. The apparatus also has target air-fuel ratio data generating means for sequentially generating target air-fuel ratio data from the target combined air-fuel ratio data generated by the target combined air-fuel ratio data generating means according to a predetermined converting process based on characteristics of a filtering process identical to the filtering process of the mixed model type, the target air-fuel ratio data representing a target air-fuel ratio for the air-fuel mixture combusted in each of the cylinder groups, the target air-fuel ratio being shared by the cylinder groups, the target combined air-fuel ratio data being produced by subjecting the target air-fuel ratio data to the filtering process, and air-fuel ratio manipulating means for manipulating the air-fuel ratio of the air-fuel mixture combusted in each of the cylinder groups in order to converge an output of each of the air-fuel ratio sensors to the target air-fuel ratio represented by the target air-fuel ratio data generated by the target air-fuel ratio data generating means.

With the above arrangement, the combined air-fuel ratio is introduced which is produced by combining the values, detected by the respective air-fuel ratio sensors, of the air-fuel ratios of the air-fuel mixtures combusted in the cylinder groups according to the filtering process of the mixed model type. Therefore, the object exhaust system of the exhaust system of the multicylinder internal combustion engine can be regarded as being equivalent to a system for generating the output of the exhaust gas sensor from the combined air-fuel ratio. Stated otherwise, the object exhaust system can be regarded as being equivalent to a 1-input, 1-output system (hereinafter referred to as "equivalent exhaust system") for being supplied with the combined air-fuel ratio as an input quantity and outputting the output of the exhaust gas sensor as an output quantity.

With the equivalent exhaust system introduced, in order to control the output of the exhaust gas sensor which is the output quantity from the equivalent exhaust system at the predetermined target value, the combined air-fuel ratio may be manipulated as a control input to the equivalent exhaust system. According to the present invention, the target combined air-fuel ratio data generating means sequentially generates target combined air-fuel ratio data representing a target value for the combined air-fuel ratio which is required to converge the output from the exhaust gas sensor to the predetermined target value with the equivalent exhaust system serving as an object to be controlled.

The target combined air-fuel ratio data generating means may generate only the target combined air-fuel ratio data as a single control input to the equivalent object system. Therefore, the target combined air-fuel ratio data generating means can generate the target combined air-fuel ratio data using the algorithm of a relatively simple feedback control process, e.g., a PID control process, without using a complex model of the equivalent object system.

The target combined air-fuel ratio data generated by the target combined air-fuel ratio data generating means may represent the value of the target combined air-fuel ratio itself. However, the target combined air-fuel ratio data may represent the difference between the value of the target combined air-fuel ratio and a predetermined reference air-fuel ratio, e.g., a stoichiometric air-fuel ratio.

When the target combined air-fuel ratio data is thus generated, the target combined air-fuel ratio represented by the target combined air-fuel ratio data is equal to the values of the target air-fuel ratios of the air-fuel mixtures combusted in the respective cylinder groups which are combined by a filtering process identical to the filtering process of the mixed model type, according to the definition of the combined air-fuel ratio. Because of the characteristics of the filtering process of the mixed model type, the target air-fuel ratio for each of the cylinder groups may be shared by all the cylinder groups. With the value of the target combined air-fuel ratio being determined, a target air-fuel ratio for each of the cylinder groups can be determined from the target combined air-fuel ratio according to a process that is a reversal of the filtering process.

According to the present invention, the target air-fuel ratio data generating means sequentially generates the target air-fuel ratio data from the target combined air-fuel ratio data generated by the target combined air-fuel ratio data generating means according to a predetermining converting process, which is a process that is a reversal of the filtering process, based on characteristics of the filtering process identical to the filtering process of the mixed model type, the target air-fuel ratio data representing a target air-fuel ratio for the air-fuel mixture combusted in each of the cylinder groups, the target air-fuel ratio being shared by the cylinder groups, the target combined air-fuel ratio data being produced by subjecting the target air-fuel ratio data to the filtering process.

Therefore, it is possible to obtain a target air-fuel ratio for each of the cylinder groups which is required to converge the output of the exhaust gas sensor to the predetermined target value.

As with the target combined air-fuel ratio data, the target air-fuel ratio data may represent the value of the target air-fuel ratio itself. However, the target air-fuel ratio data may represent the difference between the value of the target air-fuel ratio and a predetermined reference air-fuel ratio, e.g., a stoichiometric air-fuel ratio.

According to the present invention, the air-fuel ratio manipulating means manipulates the air-fuel ratio of the air-fuel mixture combusted in each of the cylinder groups in order to converge an output of each of the air-fuel ratio sensors, i.e., the detected value of the air-fuel ratio of the air-fuel mixture combusted in each of the cylinder groups, to the target air-fuel ratio represented by the target air-fuel ratio data thus generated. Thus, the combined air-fuel ratio that is the input quantity to the equivalent exhaust system is manipulated into the target combined air-fuel ratio represented by the target combined air-fuel ratio data, and the output of the exhaust gas sensor is converted to the predetermined target value.

According to the present invention, as described above, the target air-fuel ratio for each of the cylinder groups can appropriately be determined in order to converge the output of the exhaust gas sensor disposed downstream of the catalytic converter to the predetermined target value according to a relatively simple process without the need for a complex model and algorithm. By manipulating the air-fuel ratio of each of the cylinder groups in order to converge the output of each of the air-fuel ratio sensors which detects the air-fuel ratio of the air-fuel mixture combusted in each of the cylinder groups, to the target air-fuel ratio, the control process of converging the output of the exhaust gas sensor to the predetermined target value can suitably be performed. As a result, the catalytic converter disposed in each of the auxiliary exhaust passages or the main exhaust passage upstream of the exhaust sensor can have a good purifying capability.

For the catalytic converter disposed upstream of the exhaust sensor to have an optimum purifying capability, it is preferable that the exhaust gas sensor comprise an $O_2$ sensor and the target value for the output of the exhaust gas sensor be a constant value.

The filtering process of the mixed model type comprises a filtering process for obtaining the combined air-fuel ratio in each given control cycle by combining a plurality of time-series values of the air-fuel ratio of the air-fuel mixture combusted in each of the cylinder groups in a control cycle earlier than the control cycle, according to a linear function having the time-series values as components thereof.

The filtering process using the linear function allows a combined air-fuel ratio to be defined which is suitable for determining the target air-fuel ratio for each of the cylinder groups.

The linear function which has, as its components, a plurality of time-series values of the air-fuel ratio of the air-fuel mixture combusted in each of the cylinder groups is a linear combination of those time-series values, for example. In this case, the filtering process obtains a weighted mean value of the time-series values as the combined air-fuel ratio.

When the filtering process of the mixed model type is determined by the linear function, the target combined air-fuel ratio data in each given control cycle is obtained by a linear function which employs time-series data of the target air-fuel ratio data earlier than the control cycle as components of the linear function. Therefore, the target air-fuel ratio data generating means can generate target air-fuel ratio data in each given control cycle from the target combined air-fuel ratio data generated by the target combined air-fuel ratio data generating means, according to a predetermined operating process determined by the linear function.

More specifically, the target air-fuel ratio data in each control cycle may be determined using the target combined air-fuel ratio data in the control cycle and the target air-fuel ratio data in a past control cycle prior to the control cycle.

The target combined air-fuel ratio data may be generated by a feedback control process, such as a PID control process, which does not need a model of the object to be controlled. However, since the object exhaust system includes the catalytic converter, a change in the output of the exhaust gas sensor which serves as the output quantity to the equivalent exhaust system, in response to a change in the input quantity to the equivalent exhaust system that is equivalent to the object exhaust system, is liable to be affected by a response delay caused by the catalytic converter.

According to the present invention, therefore, the target combined air-fuel ratio data generating means comprises means for generating the target combined air-fuel ratio data in order to converge the output of the exhaust gas sensor to the predetermined target value according to an algorithm of a feedback control process constructed based on a predetermined model of the equivalent exhaust system which is defined as a system for generating data representing the output of the exhaust gas sensor with at least a response delay from the combined air-fuel ratio data representing the combined air-fuel ratio.

By thus generating the target combined air-fuel ratio data using the algorithm of the feedback control process constructed based on the model of the equivalent exhaust system in view of the response delay thereof, the effect of the response delay due to the catalytic converter included in the object exhaust system is appropriately compensated for, generating target combined air-fuel ratio data suitable for converting the output of the exhaust gas sensor to the predetermined target value. Inasmuch as the equivalent exhaust system is a 1-input, 1-output system, the equivalent exhaust system can be constructed of a simple arrangement.

In the above model, the combined air-fuel ratio data should preferably represent the difference between an actual combined air-fuel ratio and a predetermined reference air-fuel ratio, and the data representing the output of the exhaust gas sensor should preferably represent the difference between an actual output from the exhaust gas sensor and the predetermined target value for the purposes of increasing the ease with which to construct the algorithm of the feedback control process and the reliability of the target combined air-fuel ratio data generated using the algorithm. In this case, the target combined air-fuel ratio data represents the difference between an actual target combined air-fuel ratio and the predetermined reference air-fuel ratio, i.e., a target value for the difference between the combined air-fuel ratio and the reference air-fuel ratio.

If the algorithm of the feedback control process performed for the target combined air-fuel ratio data generating means to generate the target combined air-fuel ratio data is constructed based on the model of the equivalent exhaust system, then the algorithm of the feedback control process should preferably comprise an algorithm of a sliding mode control process.

Particularly, the sliding mode control process should preferably comprise an adaptive sliding mode control process.

Specifically, the sliding mode control process has such characteristics that it generally has high control stability against disturbances. By generating the target combined air-fuel ratio data using the algorithm of the sliding mode control process, the reliability of the target combined air-fuel ratio data is increased, and hence the stability of the control process of converging the output of the exhaust gas sensor to the target value is increased.

The adaptive sliding mode control process incorporates an adaptive control law (adaptive algorithm) for minimizing the effect of a disturbance, in a normal sliding mode control process. Therefore, the target combined air-fuel ratio data is made highly reliable.

More specifically, the sliding mode control process uses a function referred to as a switching function constructed using the difference between a controlled quantity (the output of the exhaust gas sensor in this invention) and its target value, and it is important to converge the value of the switching function to "0". According to the normal sliding mode control process, a control law referred to as a reaching control law is used to converge the value of the switching function to "0". However, due to the effect of a disturbance, it may be difficult in some situations to provide sufficient stability in converging the value of the switching function to "0" only with the reaching control law. According to the adaptive sliding mode control process, in order to converge the value of the switching function to "0" while minimizing the effect of disturbances, the adaptive control law (adaptive algorithm) is used in addition to the reaching control law. By using the algorithm of the adaptive sliding mode control process, it is possible to converge the value of the switching function highly stably to "0", and hence converge the output of the exhaust gas sensor to the predetermined target value with high stability.

As described above, the algorithm of the feedback control process comprises the algorithm of the sliding mode control process (including the adaptive sliding mode control process). Preferably, the algorithm of the sliding mode control process employs, as a switching function for the sliding mode control process, a linear function having, as components, a plurality of time-series data of the difference between the output of the exhaust gas sensor and the predetermined target value.

In the sliding mode control process, the switching function used thereby usually comprises a controlled quantity and a rate of change thereof. The rate of change of the controlled quantity is generally difficult to detect directly, and is often calculated from a detected value of the controlled quantity. The calculated value of the rate of change of the controlled quantity tends to suffer an error.

According to the present invention, the switching function for the sliding mode control process comprises a linear function having, as components, a plurality of time-series data of the difference between the output of the exhaust gas sensor and the predetermined target value. Therefore, the algorithm for generating the target combined air-fuel ratio data can be constructed without the need for the rate of change of the output of the exhaust gas sensor. Consequently, the reliability of the generated target combined air-fuel ratio data is increased.

With the switching function thus constructed, the algorithm of the sliding mode control process generates target combined air-fuel ratio data so as to converge the values of the time-series data of the difference between the output of the exhaust gas sensor and the predetermined target value to "0".

In order to generate target combined air-fuel ratio data as described above, the algorithm of the feedback control process based on the model of the equivalent exhaust system including the algorithm of the sliding mode control process is employed. The model should preferably comprise a model which expresses a behavior of the equivalent exhaust system with a discrete time system, though it may comprise a model which expresses a behavior of the equivalent exhaust system with a continuous time system.

With the behavior of the equivalent exhaust system being expressed by the discrete time system, the algorithm of the feedback control process can be constructed easily, and can be made suitable for computer processing.

The model which expresses the behavior of the equivalent exhaust system with the discrete time system may comprise a model which expresses data representing the output of the exhaust gas sensor in each given control cycle with data representing the output of the exhaust gas sensor in a past control cycle prior to the control cycle and the combined air-fuel ratio data.

The model thus constructed can appropriately express the behavior of the equivalent exhaust system.

The data representing the output of the exhaust gas sensor in the past control cycle is a so-called autoregressive term, and is related to a response delay of the equivalent exhaust system.

With the model of the equivalent exhaust system comprising the model of the discrete time system, as described above, the apparatus should further comprise first filtering means for sequentially determining the combined air-fuel ratio data by effecting a filtering process identical to the filtering process of the mixed model type on the output of each of the air-fuel ratio sensors, and identifying means for sequentially identifying a value of a parameter to be set of the model using the combined air-fuel ratio data determined by the first filter means and the data representing the output of the exhaust gas sensor, wherein the algorithm of the feedback control process performed by the target combined air-fuel ratio data generating means comprises an algorithm for generating the target combined air-fuel ratio data using the value of the parameter identified by the identifying means.

The model has parameters to be set to a certain value in describing its behavior. For example, if the model is a model which expresses the data representing the output of the exhaust gas sensor in each given control cycle with data representing the output of the exhaust gas sensor in a past control cycle prior to the control cycle and the combined air-fuel ratio data, then coefficient parameters relative respectively to the data representing the output of the exhaust gas sensor in the past control cycle and the combined air-fuel ratio data are included in the parameters of the model.

According to the algorithm of the feedback control process constructed based on the model, the target combined air-fuel ratio data is generated using the parameters of the model. For increasing the reliability of the target combined air-fuel ratio data, it is preferable to identify the values of the parameters of the model on a real-time basis depending on the actual behavior of the equivalent exhaust system, which is based on the actual behavioral characteristics of the object exhaust system and often tends to change with time.

When the combined air-fuel ratio data is determined by effecting the filtering process identical to the filtering process of the mixed model type on the data representing the output of each of the air-fuel ratio sensors, the combined air-fuel ratio data corresponds to the detected value of the actual combined air-fuel ratio as the input quantity to the equivalent exhaust system. In the model which expresses the equivalent exhaust system with the discrete time system, the combined air-fuel ratio data sequentially determined from the data representing the output of each of the air-fuel ratio sensors and the data representing the output of the exhaust gas sensor corresponding to the actual output quantity from the equivalent exhaust system are used to sequentially identify the parameters of the model depending on the actual behavior of the equivalent exhaust system.

Therefore, the apparatus of the present invention further includes the first filter means and the identifying means. The values of the parameters of the model are sequentially identified, and the target combined air-fuel ratio data is generated using the identified values of the parameters. It is thus possible to generate the target combined air-fuel ratio data depending on the actual behavior of the equivalent exhaust system based on the actual behavior, from time to time, of the object exhaust system. As a result, the reliability of the target combined air-fuel ratio data is increased, making it possible to accurately and stably converge the output of the exhaust gas sensor to the predetermined target value.

If the model is a model which expresses the data representing the output of the exhaust gas sensor in each given control cycle with data representing the output of the exhaust gas sensor in a past control cycle prior to the control cycle and the combined air-fuel ratio data, then the identifying means identifies at least one of the coefficient parameters, preferably all the coefficient parameters, relative respectively to the data representing the output of the exhaust gas sensor and the combined air-fuel ratio data.

The identifying means can sequentially identify the values of the parameters according to an algorithm, e.g., an identifying algorithm such as a method of least squares, a method of weighted least squares, a fixed gain method, a degressive gain method, a fixed tracing method, etc., constructed in order to minimize an error between the output of the exhaust gas sensor in the model and the actual output of the exhaust gas sensor.

In the apparatus for controlling the air-fuel ratio of the multicylinder internal combustion engine according to the present invention, the equivalent exhaust system may have a relatively long dead time, i.e., a time required until the value, at each time point, of the actual combined air-fuel ratio that is the input quantity to the equivalent exhaust system is reflected in the output of the exhaust gas sensor, because of the catalytic converter and the auxiliary exhaust pipes, which are relatively long, in the object exhaust system. With the equivalent exhaust system having such a dead time, then the stability of the control process of converging the output of the exhaust gas sensor to the predetermined target value would tend to be lowered if the target combined air-fuel ratio were generated to manipulate the air-fuel ratio for the cylinder groups without taking the data time into account.

According to the present invention, the further comprises estimating means for sequentially generating data representing an estimated value of the output of the exhaust gas sensor after a dead time according to an algorithm constructed based on a predetermined model of the equivalent exhaust system which is defined as a system for generating data representing the output of the exhaust gas sensor with a response delay and the dead time from the combined air-fuel ratio data representing the combined air-fuel ratio. The target combined air-fuel ratio data generating means comprises means for generating the target combined air-fuel ratio data in order to converge the output of the exhaust gas sensor to the predetermined target value according to an algorithm of a feedback control process constructed using the data generated by the estimating means.

Since the model of the equivalent exhaust system is determined in view of the response delay and dead time thereof, the estimating means can sequentially generate data representing an estimated value of the output of the exhaust gas sensor after the dead time according to the algorithm constructed based on the model.

The target combined air-fuel ratio data generating means generates the target combined air-fuel ratio data according to the algorithm of the feedback control process constructed using the data representing the estimated value of the output of the exhaust gas sensor. Therefore, it is possible to generate the target combined air-fuel ratio data suitable for compensating for the effect of the dead time of the equivalent exhaust system and converging the output of the exhaust gas sensor stably to the predetermined target value.

When the multicylinder internal combustion engine operates at a relatively low rotational speed, a system comprising the air-fuel ratio manipulating means and the multicylinder internal combustion engine, which system is basically considered to be a system for generating an actual combined air-fuel ratio corresponding to the target air-fuel ratio data from the target air-fuel ratio data, may have a relatively long dead time. In such a case, the stability of the control process of converging the output of the exhaust gas sensor to the predetermined target value would not be sufficiently high if only the effect of the dead time of the equivalent exhaust system were compensated for.

According to the present invention, the apparatus further comprises estimating means for sequentially generating an estimated value of the output of the exhaust gas sensor after a total dead time which is the sum of a dead time of the equivalent exhaust system and a dead time of a system comprising the air-fuel ratio manipulating means and the multicylinder internal combustion engine, according to according to an algorithm constructed based on a predetermined model of the equivalent exhaust system which is defined as a system for generating data representing the output of the exhaust gas sensor with a response delay and the dead time from the combined air-fuel ratio data representing the combined air-fuel ratio, and a predetermined model of the system (hereinafter referred to as "air-fuel ratio manipulating system") comprising the air-fuel ratio manipulating means and the multicylinder internal combustion engine which is defined as a system for generating the combined air-fuel ratio data with the dead time from the target combined air-fuel ratio data. The target combined air-fuel ratio data generating means comprises means for generating the target combined air-fuel ratio data in order to converge the output of the exhaust gas sensor to the predetermined target value according to an algorithm of a feedback control process constructed using the data generated by the estimating means.

Since the model of the equivalent exhaust system is determined in view of the response delay and dead time thereof and the model of the air-fuel ratio manipulating system is determined in view of the dead time thereof, the estimating means can sequentially generate data representing an estimated value of the output of the exhaust gas sensor after the total dead time, which represents the sum of the dead time of the equivalent exhaust system and the dead time of the air-fuel ratio manipulating system, according to the algorithm constructed based on those models. Because the effect of the response delay of the multicylinder internal combustion engine can be compensated for by the air-fuel ratio manipulating means, no problem arises if the response delay of the multicylinder internal combustion engine is taken into account in the model of the air-fuel ratio manipulating means.

The target combined air-fuel ratio data generating means generates the target combined air-fuel ratio data according to the algorithm of the feedback control process constructed using the data representing the estimated value of the output of the exhaust gas sensor. Therefore, it is possible to generate the target combined air-fuel ratio data suitable for compensating for the effect of the dead time of the equivalent exhaust system and the dead time of the air-fuel ratio manipulating system and converging the output of the exhaust gas sensor stably to the predetermined target value.

Irrespective whether the data representing the estimated value of the output of the exhaust gas sensor after the dead time of the equivalent exhaust system is generated or the data representing the estimated value of the output of the exhaust gas sensor after the total dead time representing the sum of the dead time of the equivalent exhaust system and the dead time of the air-fuel ratio manipulating system, the combined air-fuel ratio data represents the difference between an actual combined air-fuel ratio and a predetermined reference air-fuel ratio, and the data representing the output of the exhaust gas sensor represents the difference between an actual output from the exhaust gas sensor and the predetermined target value in the model of the equivalent exhaust model. Such an arrangement is effective to increase the ease with which to construct the algorithm for generating the data representing the estimated value of the output of the exhaust gas sensor and to increase the reliability of the data representing the estimated value of the output of the exhaust gas sensor using the algorithm. In this case, the data representing the estimated value of the output of the exhaust gas sensor represents the difference the estimated value of the output of the exhaust gas sensor and the predetermined target value The estimating means can sequentially generate data representing an estimated value of the output of the exhaust gas sensor after the dead time of the equivalent exhaust system or the total data time representing the sum of the dead time of the equivalent exhaust system and the dead time of the air-fuel ratio manipulating system, basically according to the algorithm constructed using the target combined air-fuel ratio data, specifically, a plurality of time-series data of past values of the target combined air-fuel ratio data, generated by the target combined air-fuel ratio data generating means, and the data representing the output of the exhaust gas sensor, specifically, a plurality of time-series data of the data prior to the present cycle.

If the dead time of the air-fuel ratio manipulating system can be ignored, i.e., if the data representing the estimated value of the output of the exhaust gas sensor after the dead time of the equivalent exhaust system is generated, then the target combined air-fuel ratio data at each time point can basically be considered to be equal to the combined air-fuel ratio data representing the actual combined air-fuel ratio at the same time point.

If the air-fuel ratio manipulating system has a dead time, i.e., if the data representing the estimated value of the output of the exhaust gas sensor after the total data time representing the sum of the dead time of the equivalent exhaust system and the dead time of the air-fuel ratio manipulating system is generated, then the target combined air-fuel ratio data at each time point can basically be considered to be equal to the combined air-fuel ratio data representing the actual combined air-fuel ratio after the dead time of the equivalent exhaust system by the model of the air-fuel ratio manipulating system.

When the combined air-fuel ratio data is sequentially determined by effecting the filtering process identical to the filtering process of the mixed model type on the output of each of the air-fuel ratio sensors, the combined air-fuel ratio data corresponds to the detected value of the actual combined air-fuel ratio as the input quantity to the equivalent exhaust system.

In view of the relationship between the target combined air-fuel ratio data and the corresponding actual combined air-fuel ratio data, if the dead time of the air-fuel ratio manipulating system can be ignored, then the combined air-fuel ratio data determined as described above from the data representing the output of each of the air-fuel ratio sensors can be used instead of all target combined air-fuel ratio data used in the algorithm which uses the target combined air-fuel ratio data and the data representing the output of the exhaust gas sensor in order to generate the estimated value of the output of the exhaust gas sensor.

If the air-fuel ratio manipulating system has a dead time and the dead time is relatively short, or specifically, if the dead time is at most the same as the period for generating the target combined air-fuel ratio data, then the combined air-fuel ratio data determined from the data representing the output of each of the air-fuel ratio sensors can be used instead of all target combined air-fuel ratio data used in the above algorithm for generating the data representing the output of the exhaust gas sensor.

If the air-fuel ratio manipulating system has a dead time and the dead time is relatively long, or specifically, if the dead time is longer than the period for generating the target combined air-fuel ratio data, then the combined air-fuel ratio data determined from the data representing the output of each of the air-fuel ratio sensors can be used instead of some target combined air-fuel ratio data used in the above algorithm.

In the case where the estimating means sequentially generates the data representing the estimated value of the output of the exhaust gas sensor after the dead time of the equivalent exhaust system or the estimating means sequentially generates the data representing the estimated value of the output of the exhaust gas sensor after the total data time representing the sum of the dead time of the equivalent exhaust system and the dead time of the air-fuel ratio manipulating system, the apparatus further comprises first filtering means for sequentially determining the combined air-fuel ratio data by effecting a filtering process identical to the filtering process of the mixed model type on the output of each of the air-fuel ratio sensors. The algorithm performed by the estimating means comprises an algorithm for generating the data representing the estimated value of the output of the exhaust gas sensor using the data representing the output of the exhaust gas sensor and the combined air-fuel ratio data generated by the first filter means.

In the case where the estimating means sequentially generates the data representing the estimated value of the output of the exhaust gas sensor after the total data time representing the sum of the dead time of the equivalent exhaust system and the dead time of the air-fuel ratio manipulating system, the apparatus further comprises first filtering means for sequentially determining the combined air-fuel ratio data by effecting a filtering process identical to the filtering process of the mixed model type on the output of each of the air-fuel ratio sensors. The algorithm performed by the estimating means comprises an algorithm for generating the data representing the estimated value of the output of the exhaust gas sensor using the data representing the output of the exhaust gas sensor and the combined air-fuel ratio data generated by the first filter means.

As described above, the algorithm for the estimating means to generate the data representing the estimated value of the output of the exhaust gas sensor uses the combined air-fuel ratio data generated by the first filter means, i.e., the data corresponding to the detected value of the actual combined air-fuel ratio. Therefore, even if the actual combined air-fuel ratio suffers an error due to a disturbance with respect to the target combined air-fuel ratio data, the estimating means can generate the data representing the estimated value of the output of the exhaust gas sensor in a manner to take the effect of the disturbance into account. Consequently, the reliability of the data representing the estimated value is increased. Thus, the target combined air-fuel ratio data generating means can generate the target combined air-fuel ratio data while appropriately compensating for the dead time of the equivalent exhaust system and the dead time of the air-fuel ratio manipulating system according to the algorithm of the feedback control process that is constructed using the data representing the estimated value.

In the above apparatus with the above estimating means, the air-fuel ratio manipulating means does not always need to manipulate the air-fuel ratio of the air-fuel mixture in each of the cylinder groups according to the target air-fuel ratio represented by the target air-fuel ratio data that is generated by the target combined air-fuel ratio data generating means from the target combined air-fuel ratio data, but may manipulate the air-fuel ratio of the air-fuel mixture in each of the cylinder groups according to a target air-fuel ratio other than the target air-fuel ratio data generated by the target combined air-fuel ratio data generating means, depending on operating conditions of the multicylinder internal combustion engine, e.g., when the internal combustion engine operates with the supply of fuel being cut off or operates to meet a large output power requirement.

If the air-fuel ratio manipulating means comprises means for manipulating the air-fuel ratio of the air-fuel mixture combusted in each of the cylinder groups depending on a target air-fuel ratio other than the target air-fuel ratio represented by the target air-fuel ratio data generated by the target air-fuel ratio data generating means, depending on operating conditions of the multicylinder internal combustion engine, and the algorithm performed by the estimating means uses the target combined air-fuel ratio data generated by the target combined air-fuel ratio data generating means, the apparatus further comprises second filter means for sequentially determining actually used target combined air-fuel ratio data as target combined air-fuel ratio data corresponding to an actual target air-fuel ratio by effecting a filtering process identical to the filtering process of the mixed model type on data representing the actual target air-fuel ratio that is actually used for the air-fuel ratio manipulating means to manipulate the air-fuel ratio in each of the cylinder groups. The estimating means comprises means for generating the data representing the estimated value of the output of the exhaust gas sensor using the actually used target combined air-fuel ratio data determined by the second filter means instead of the target combined air-fuel ratio data.

The second filter means effects the filtering process identical to the filtering process of the mixed model type on the data representing the actual target air-fuel ratio that is actually used by the air-fuel ratio manipulating means, which may not necessarily be the target air-fuel ratio data generated by the target air-fuel ratio data generating means, for thereby determining the actually used target combined air-fuel ratio data as the target combined air-fuel ratio data corresponding to the target air-fuel ratio that is actually used by the air-fuel ratio manipulating means. By using the actually used target combined air-fuel ratio data instead of the target combined air-fuel ratio data in the algorithm performed by the estimating means, the data representing the estimated value of the output of the exhaust gas sensor is generated in view of how the air-fuel ratio in each of the cylinder groups is actually manipulated by the air-fuel ratio manipulating means.

Therefore, the data representing the estimated value of the output of the exhaust gas sensor which is generated by the estimating means reflects how the air-fuel ratio in each of the cylinder groups is actually manipulated by the air-fuel ratio manipulating means. Consequently, the reliability of the data representing the estimated value is increased.

In the apparatus having the estimating means, the algorithm of the estimating means may be constructed such that the model of the equivalent exhaust system comprises a model that expresses the behavior of the equivalent exhaust system with a continues time system. However, the model of the equivalent exhaust system should preferably be a model that expresses the behavior of the equivalent exhaust system with a discrete time system.

With the behavior of the equivalent exhaust system being expressed by the discrete time system, the algorithm performed by the estimating means can be constructed easily, and can be made suitable for computer processing.

If the estimating means generates the data representing the estimated value of the output of the exhaust gas sensor after the total dead time, then the model of the air-fuel ratio manipulating system may express the behavior of the air-fuel ratio manipulating system on the assumption that the actual combined air-fuel ratio at each time point is equal to the target combined air-fuel ratio prior to the dead time of the air-fuel ratio manipulating system. Therefore, there is no difference if the model of the air-fuel ratio manipulating system is expressed by either the continuous time system or the discrete time system.

The model of the equivalent exhaust system which expresses the behavior of the equivalent exhaust system with the discrete time system comprises a model which expresses the data representing the output of the exhaust gas sensor in each given control cycle, with the data representing the output of the exhaust gas sensor in a past control cycle prior to the control cycle, and the combined air-fuel ratio data in a control cycle which is earlier than the control cycle by a dead time of the equivalent exhaust system.

With the model thus constructed, the behavior of the equivalent exhaust system, including its response delay and dead time, can appropriately be expressed by the model.

The data representing the output of the exhaust gas sensor in the past control cycle is a so-called autoregressive term, and is related to a response delay of the equivalent exhaust system. The combined air-fuel ratio data prior to the dead time of the equivalent exhaust system expresses the dead time of the equivalent exhaust system.

If the model of the equivalent exhaust system is expressed by the discrete time system and the apparatus has the first filter means for determining the combined air-fuel ratio data used in the algorithm of the estimating means, then the apparatus further comprises identifying means for sequentially identifying values of parameters to be set of the model of the system equivalent to the object exhaust system, using the combined air-fuel ratio data determined by the first filter means and the output representing the output of the exhaust gas sensor. The algorithm performed by the estimating means comprises an algorithm for using the value of the parameters identified by the identifying means in order to generate the data representing the estimated value of the output of the exhaust gas sensor.

The model of the equivalent exhaust system has parameters to be set to certain values in describing its behavior. For example, if the model is a model which expresses the data representing the output of the exhaust gas sensor in each given control cycle with data representing the output of the exhaust gas sensor in a past control cycle prior to the control cycle and the combined air-fuel ratio data in a control cycle prior to the control cycle by the dead time of the equivalent exhaust system, then coefficient parameters relative respectively to the data representing the output of the exhaust gas sensor in the past control cycle and the combined air-fuel ratio data in the control cycle prior to the dead time are included as the parameters of the model.

Since the algorithm of the estimating means is based on the model of the equivalent exhaust system, the data representing the estimated value of the output of the exhaust gas sensor is generated using the parameters of the model. For increasing the reliability of the data representing the estimated value of the output of the exhaust gas sensor, it is preferable to identify the values of the parameters of the model on a real-time basis depending on the actual behavior of the equivalent exhaust system.

If the model of the equivalent exhaust system is expressed by the discrete time system, then the parameters of the model can sequentially be identified depending on the actual behavior of the equivalent exhaust system when the first filter means uses the combined air-fuel ratio data sequentially determined from the data representing the output of each of the air-fuel ratio sensors and the data representing the output of the exhaust gas sensor.

If the apparatus has the first filter means for sequentially determining the combined air-fuel ratio data used in the algorithm of the estimating means, the identifying means sequentially identifies the parameters of the model of the equivalent exhaust system, and the estimating means sequentially generates the data representing the estimated value of the output of the exhaust gas sensor using the identified values of the parameters. Therefore, it is possible to generate the data representing the estimated value of the output of the exhaust gas sensor depending on the actual behavior of the equivalent exhaust system based on the actual behavior, from time to time, of the object exhaust system. As a result, the reliability of the data representing the estimated value is increased. The highly reliable target combined air-fuel ratio data can be generated according to the algorithm of the feedback control process constructed using the data representing the estimated value, so that the output of the exhaust gas sensor can be converged to the predetermined target value accurately and stably.

If the model is a model which expresses the data representing the output of the exhaust gas sensor in each given control cycle with data representing the output of the exhaust gas sensor in a past control cycle prior to the control cycle and the combined air-fuel ratio data in a control cycle prior to the control cycle by the dead time of the equivalent exhaust system, then the identifying means identifies at least one of the coefficient parameters, preferably all the coefficient parameters, relative respectively to the data representing the output of the exhaust gas sensor and the combined air-fuel ratio data.

The identifying means can sequentially identify the values of the parameters according to an algorithm, e.g., an identifying algorithm such as a method of least squares, a method of weighted least squares, a fixed gain method, a degressive gain method, a fixed tracing method, etc., constructed in order to minimize an error between the output of the exhaust gas sensor in the model of the equivalent exhaust system and the actual output of the exhaust gas sensor.

In the above description of the identifying means, it is premised that the algorithm of the estimating means uses the combined air-fuel ratio data determined by the first filter means. However, if the algorithm of the estimating means generates the data representing the estimated value of the output of the exhaust gas sensor using the target combined air-fuel ratio data without using the combined air-fuel ratio data determined by the first filter means, then the first filter means is associated with the identifying means, and the identifying means identifies the parameters of the model of the equivalent exhaust system.

With the identifying means as well as the estimating means being employed, the algorithm of the feedback control process for generating the target combined air-fuel ratio data may be constructed based on a model of the equivalent exhaust system determined differently from the model of the equivalent exhaust system in the estimating means. However, the algorithm of the feedback control process performed by the target combined air-fuel ratio data generating means should preferably comprise an algorithm constructed based on the model of the equivalent exhaust system, for generating the target combined air-fuel ratio data using the values of the parameters identified by the identifying means.

Because the algorithm of the feedback control process is constructed based on the model of the equivalent exhaust system determined to construct the algorithm of the estimating means, the algorithm of the feedback control process using the data representing the estimated value of the output of the exhaust gas sensor generated by the estimating means can easily be constructed. At the same time, when the algorithm of the feedback control process uses the values of the parameters of the equivalent exhaust system that are identified by the identifying means, the target combined air-fuel ratio data can be generated depending on the actual behavior of the equivalent exhaust system. That is, it is possible to generate the target combined air-fuel ratio data that is highly reliable in converging the output of the exhaust gas sensor to the predetermined target value.

In the apparatus with the estimating means, the algorithm of the feedback control process performed by the target combined air-fuel ratio data generating means comprises an algorithm for generating the target combined air-fuel ratio data in order to converge the estimated value of the output of the exhaust gas sensor which is represented by the data generated by the estimating means to the predetermined target value.

The above algorithm of the feedback control process is capable of appropriately compensating for the dead time of the equivalent exhaust system or the total dead time which represents the sum of the dead time of the equivalent exhaust system and the dead time of the air-fuel ratio manipulating system, making it possible to generate the target combined air-fuel ratio data that is highly reliable in converging the output of the exhaust gas sensor to the predetermined target value.

In the apparatus with the estimating means, as is the case with the algorithm of the feedback control process based on the model of the equivalent exhaust system described above, the algorithm of the feedback control process performed by the target combined air-fuel ratio data generating means should preferably comprise an algorithm of a sliding mode control process.

Particularly, the sliding mode control process should preferably comprise an adaptive sliding mode control process.

Specifically, the sliding mode control process has the above-mentioned characteristics. By generating the target combined air-fuel ratio data using the algorithm of the sliding mode control process, particularly the adaptive sliding mode control process, the reliability of the target combined air-fuel ratio data is increased, and hence the stability of the control process of converging the output of the exhaust gas sensor to the target value is increased.

The algorithm of the sliding mode control process employs, as a switching function for the sliding mode control process, a linear function having, as components, a plurality of time-series data of the difference between estimated value of the output of the exhaust gas sensor which is represented by the data generated by the estimating means and the predetermined target value.

With the switching function for the sliding mode control process being thus constructed, the algorithm for generating the target combined air-fuel ratio data can be constructed without the need for data representing a rate of change of the output of the exhaust gas sensor. Therefore, the reliability of the generated target combined air-fuel ratio data is high.

The algorithm of the sliding mode control process generates the target combined air-fuel ratio data in order to converge the values of a plurality of time-series data of the difference between the estimated value of the output of the exhaust gas sensor and the predetermined target value to "0". Thus, it is possible to appropriately compensate for the dead time of the equivalent exhaust system or the total dead time which represents the sum of the dead time of the equivalent exhaust system and the dead time of the air-fuel ratio manipulating system.

The air-fuel ratio manipulating means should preferably comprise means for manipulating the air-fuel ratio of the air-fuel mixture combusted in each of the cylinder groups in order to converge the output of each of the air-fuel ratio sensors to the target air-fuel ratio represented by the target air-fuel ratio data generated by the target air-fuel ratio data generating means, using recursive-type feedback control means respectively for the cylinder groups.

Specifically, the recursive-type feedback control means may comprise an adaptive controller, an optimum regulator, or the like. When the air-fuel ratio of the air-fuel mixture combusted in each of the cylinder groups is manipulated for each of the cylinder groups using the above control means, the air-fuel ratio in each of the cylinder groups can be controlled at the target air-fuel ratio represented by the target air-fuel ratio data with a high ability to follow dynamic changes such as changes in the operating conditions and time-dependent characteristic changes of the multicylinder internal combustion engine. Moreover, the effect of the response delay of the multicylinder internal combustion engine can also be compensated for. Therefore, especially if the data representing the estimated value of the output of the exhaust gas sensor after the total dead time which represents the sum of the dead time of the equivalent exhaust system and the dead time of the air-fuel ratio manipulating system is generated, the reliability of the data of the estimated value can further be increased.

The recursive-type feedback control means determines a new feedback controlled quantity according to a given recursive formula containing a predetermined number of time-series data, prior to the present time, of the feedback controlled quantity of the air-fuel ratio in each of the cylinder groups, i.e., a corrective quantity for the amount of supplied fuel.

The recursive-type feedback control means should preferably comprise an adaptive controller in particular.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

An air-fuel ratio control apparatus according to the present invention will be described below with reference to FIGS. 1 through 14.

Figure 1:
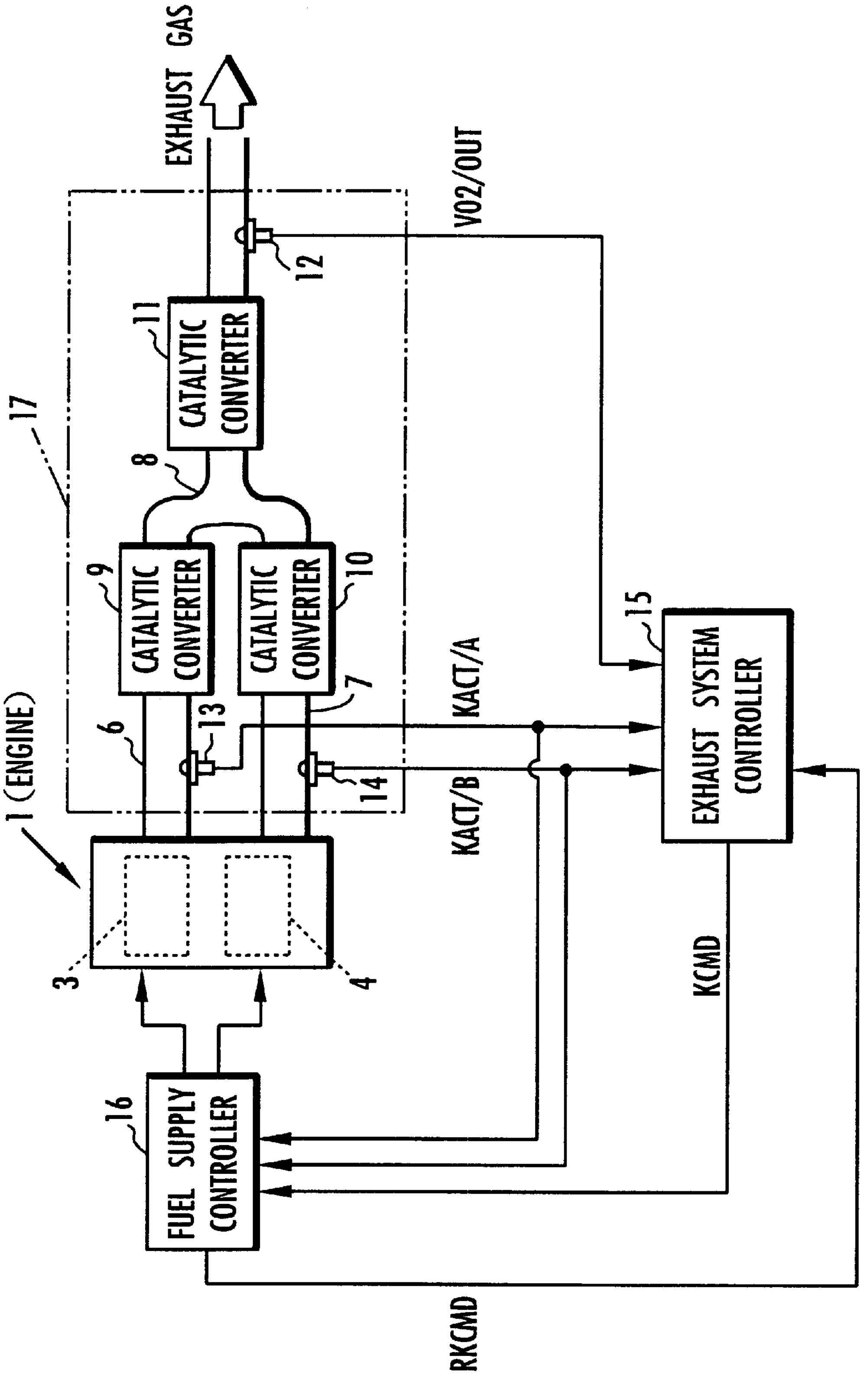
FIG. 1 is a block diagram of an overall system of an air-fuel ratio control apparatus for a multicylinder internal combustion engine according to an embodiment of the present invention.
Figure 2:
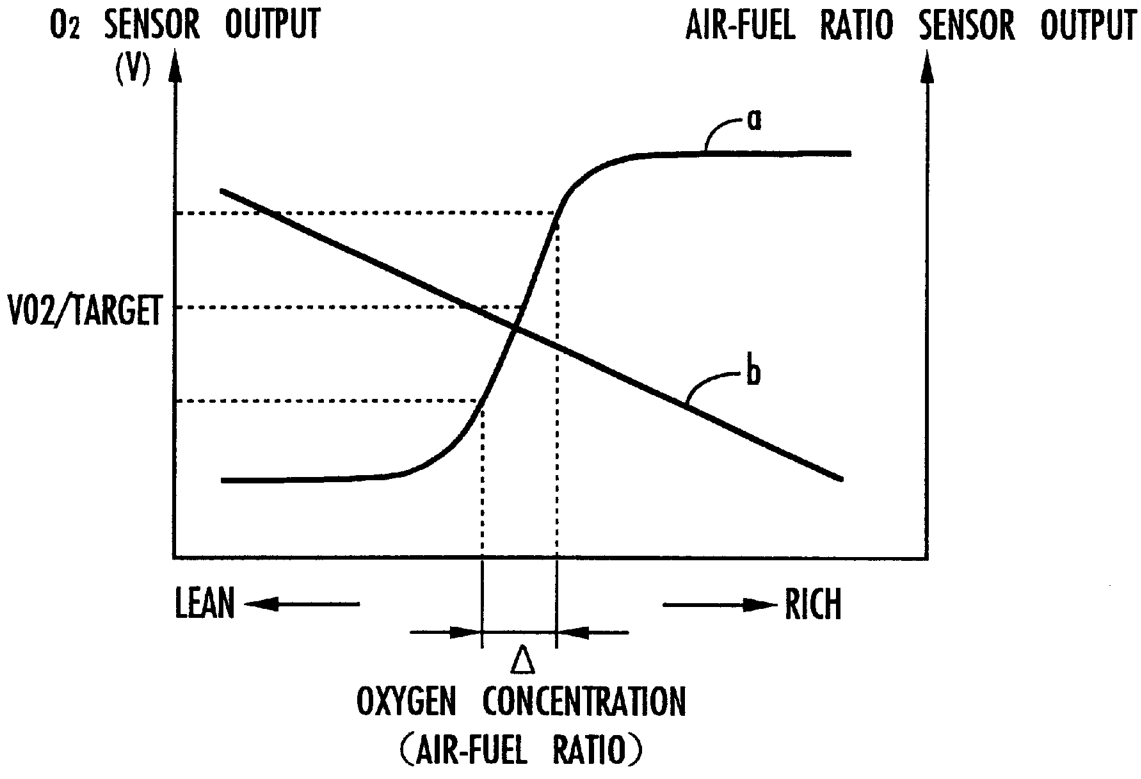
FIG. 2 is a diagram showing output characteristics of an $O_2$ sensor and an air-fuel ratio sensor used in the air-fuel ratio control apparatus shown in FIG. 1.

In FIG. 1, the present invention is applied to an air-fuel ratio control apparatus for a V-type engine 1 (hereinafter referred to as "engine 1") as a multicylinder internal combustion engine having an exhaust system shown in FIG. 16, for example. FIG. 1 shows in block diagram of an overall system of the air-fuel ratio control apparatus.

Figure 16:
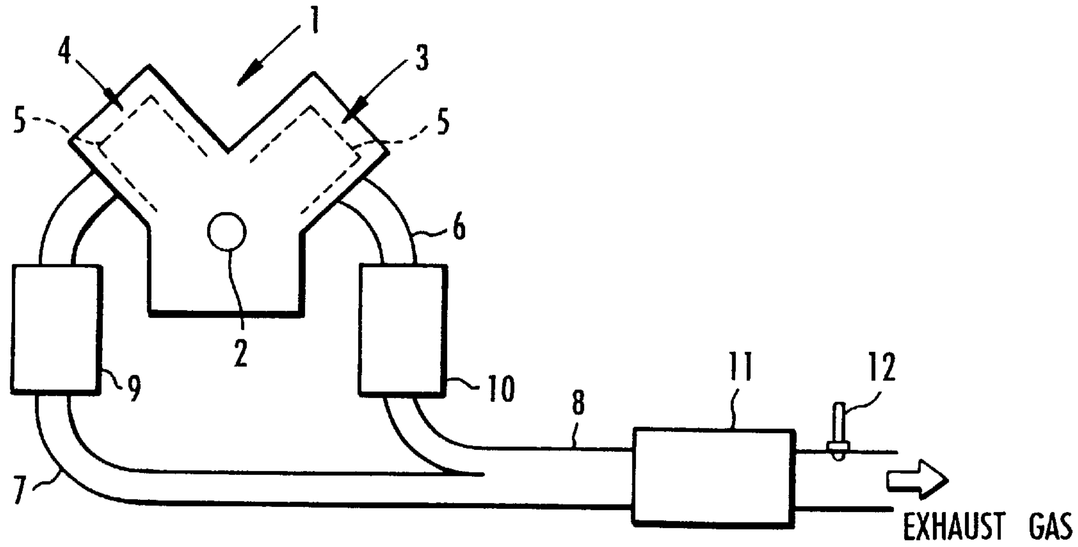
FIG. 16 is a block diagram of another exhaust system of a V-type engine as a multicylinder internal combustion engine.

As shown in FIG. 1, the engine 1 and its exhaust system are illustrated more simply than in FIG. 16. Specifically, the engine 1 is a V-type 6-cylinder engine mounted as a propulsion source on an automobile or a hybrid vehicle, for example, and has two cylinder groups 3, 4 each comprising three cylinders.

The exhaust system of the engine 1 has auxiliary exhaust pipes, i.e., auxiliary exhaust passages, 6, 7 connected to the respective two cylinder groups 3, 4, a main exhaust pipe, i.e., a main exhaust pipe, 8 to which the auxiliary exhaust pipes 6, 7 are connected in common, and catalytic converters 9, 10, 11 connected respectively to the auxiliary exhaust pipes 6, 7 and the main exhaust pipe 8. Each of the catalytic converters 9, 10, 11 comprises a three-way catalytic converter, for example.

An $O_2$ sensor 12 as an exhaust gas sensor is mounted on the main exhaust pipe 8 downstream of the catalytic converter 11. An air-fuel ratio sensor 13 is mounted on the auxiliary exhaust pipe 6 near an upstream end thereof, or more specifically, upstream of the catalytic converter 11 near a region where exhaust gases from the cylinders of the cylinder group 3 connected to the auxiliary exhaust pipe 6 are combined together. Similarly, an air-fuel ratio sensor 14 is mounted on the auxiliary exhaust pipe 7 near an upstream end thereof.

The $O_2$ sensor 12 comprises an ordinary $O_2$ sensor for generating an output signal VO2/OUT (representative of a detected value of oxygen concentration) having a level depending on the oxygen concentration in the exhaust gas that has passed through the catalytic converter 11 and flows in the main exhaust pipe 8. The oxygen concentration in the exhaust gas depends on the air-fuel ratio of the air-fuel mixture combusted by the engine 1. The output signal VO2/OUT from the $O_2$ sensor 12 will change with high sensitivity in substantial proportion to the oxygen concentration in the exhaust gas, with the air-fuel ratio corresponding to the oxygen concentration in the exhaust gas being in a range $\Delta$ close to a stoichiometric air-fuel ratio, as indicated by the solid-line curve 1 in FIG. 2. At the oxygen concentration corresponding to the air-fuel ratio outside the range $\Delta$, the output signal VO2/OUT from the $O_2$ sensor 12 is saturated and is of a substantially constant level.

The air-fuel ratio sensors 13, 14 (hereinafter referred to as "LAF sensors 13, 14") generate outputs KACT/A, KACT/B representing the detected values of air-fuel ratios of air-fuel mixtures combusted in the cylinder groups 3, 4 (specifically, air-fuel ratios recognized by oxygen concentrations in exhaust gases that are combinations of exhaust gases from the cylinders of the cylinder groups 3, 4). The air-fuel ratio sensors 13, 14 comprise wide-range air-fuel ratio sensors described in detail in Japanese laid-open patent publication No. 4-369471 or U.S. Pat. No. 5,391,282. As indicated by the solid-line curve b in FIG. 2, the air-fuel ratio sensors 13, 14 generate an output having a level proportional to the oxygen concentration in the exhaust gas in a wider range of oxygen concentrations than the $O_2$ sensor 12. Stated otherwise, the air-fuel ratio sensors 13, 14 generate outputs KACT/A, KACT/B having a level proportional to the air-fuel ratio corresponding to the oxygen concentration in the exhaust gas in a wide range of air-fuel ratios.

The system according the present embodiment basically performs a control process of manipulating the air-fuel ratios of air-fuel mixtures combusted in the cylinder groups of the engine 1 in order to achieve an optimum purifying capability of an overall exhaust gas purifying apparatus which comprises the catalytic converters 9, 10, 11. When the air-fuel ratios of air-fuel mixtures combusted in the cylinder groups of the engine 1 are controlled in order to converge (set) the output VO2/OUT of the $O_2$ sensor 12 to a predetermined target value VO2/TARGET (see FIG. 2), the overall exhaust gas purifying apparatus which comprises the catalytic converters 9, 10, 11 is allowed to have an optimum purifying capability.

The system according the present embodiment has controllers, described below, for performing a control process of converging (setting) the output VO2/OUT of the $O_2$ sensor 12 to the predetermined target value VO2/TARGET.

Specifically, the system has a controller 15 (hereinafter referred to as "exhaust system controller 15") for executing, in predetermined control cycles, a process of sequentially generating a target air-fuel ratio KCMD for the air-fuel mixtures combusted in the cylinder groups 3, 4 (which is also a target value for the air-fuel ratios detected by the LAF sensors 13, 14), and a controller 16 (hereinafter referred to as "fuel supply controller 16") as air-fuel ratio manipulating means for manipulating the air-fuel ratios of the air-fuel mixtures combusted in the cylinder groups 3, 4 by executing, in predetermined control cycles, a process of adjusting fuel supply quantities (fuel injection quantities) for the cylinder groups 3, 4 in order to converge the outputs KACT/A, KACT/B of the LAF sensors 13, 14, which represent the detected values of air-fuel ratios of air-fuel mixtures combusted in the cylinder groups 3, 4, to the target air-fuel ratio KCMD determined by the exhaust system controller 15.

The fuel supply controller 16 is supplied with the outputs KACT/A, KACT/B of the LAF sensors 13, 14, the output VO2/OUT of the $O_2$ sensor 12, and also detected output signals from various other sensors for detecting a engine speed, an intake pressure (a pressure in an intake pipe), a coolant temperature, etc. of the engine 1. The exhaust system controller 15 and the fuel supply controller 16 can exchange data of the target air-fuel ratio KCMD and other various items of operating condition information.

The controllers 15, 16 comprise a microcomputer, and perform their respective control processes in given control cycles. In the present embodiment, each of the control cycles in which the exhaust system controller 15 performs its control process of generating the target air-fuel ratio KCMD has a period, e.g., 30 to 100 ms, predetermined in view of the dead time due to the catalytic converters 9, 10, 11, the processing load, etc.

The control process performed by the fuel supply controller 16 for adjusting the fuel injection quantities is required to be synchronous with the rotational speed of the engine 1 or specifically combustion cycles of the engine 1. Therefore, the control cycles of the control process performed by the fuel supply controller 16 are of a period in synchronism with a crankshaft angle period (so-called TDC) of the engine 1.

The constant period of the control cycles of the exhaust system controller 15 is longer than the crankshaft angle period (TDC) of the engine 1.

The control processes performed by the exhaust system controller 15 and the fuel supply controller 16 will be described below.

The exhaust system controller 15 performs a process of sequentially determining, in given control cycles of a constant period, target air-fuel ratios KCMD (target values for the outputs of the LAF sensors 13, 14) for the cylinder groups 3, 4 in order to converge the output VO2/OUT of the $O_2$ sensor 12 to the predetermined target value VO2/TARGET, in view of behavioral characteristics (response delay characteristics and dead time) of a portion of the exhaust system of the engine 1 which is upstream of the $O_2$ sensor 12, i.e., the portion including the auxiliary exhaust pipes 6, 7 and the catalytic converters 9, 10, 11 and denoted by the reference numeral 17 in FIG. 1 (hereinafter referred to as "object exhaust system 17").

In order to perform the above process, the object exhaust system 17 is regarded as being equivalent to a system for generating the output VO2/OUT of the $O_2$ sensor 12 with a response delay and a dead time from a combined air-fuel ratio (denoted by KACT/T) that is produced by combining the actual air-fuel ratios of the air-fuel mixtures combusted in the cylinder groups 3, 4 (which are recognized as the outputs KACT/A, KACT/B of the LAF sensors 13, 14) according to a filtering process (described later on).

Figure 3:
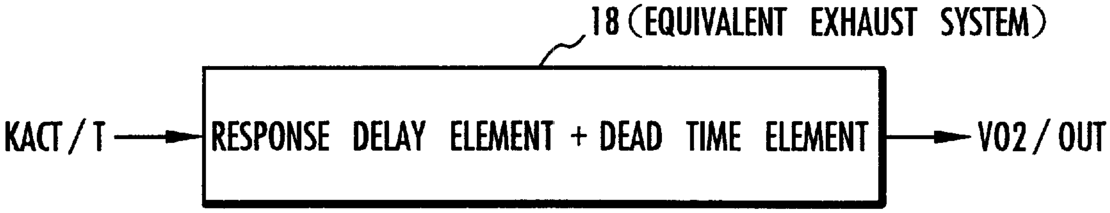
FIG. 3 is a block diagram of a system equivalent to an exhaust system of the multicylinder internal combustion engine shown in FIG. 1.

As shown in FIG. 3, the object exhaust system 17 is equivalent to a 1-input, 1-output system 18 for being supplied with the combined air-fuel ratio KACT/T as an input quantity and outputting the output VO2/OUT of the $O_2$ sensor 12 as an output quantity. The equivalent system 18 (hereinafter referred to as "equivalent exhaust system 18") is defined as a system comprising a response delay element and a dead time element.

The response delay element of the equivalent exhaust system 18 is primarily caused by the catalytic converters 9, 10, 11 of the object exhaust system 17. The dead time element of the equivalent exhaust system 18 is primarily caused by the auxiliary exhaust pipes 6, 7 and the catalytic converters 9, 10, 11 of the object exhaust system 17.

According to the basic control process carried out by the exhaust system controller 15, a target value for the combined air-fuel ratio KACT/T as a control input for the equivalent exhaust system 18 (hereinafter referred to as "target combined air-fuel ratio KCMD/T") is sequentially determined in control cycles in order to converge the output VO2/OUT of the $O_2$ sensor 12 as an output quantity of the equivalent exhaust system 18 to the target value VO2/TARGET, according to a feedback control algorithm for controlling the equivalent exhaust system 18. Then, a target air-fuel ratio KCMD for the cylinder groups 3, 4 is determined from the target combined air-fuel ratio KCMD/T.

In order to perform the above control process, a model representing the behavior of the equivalent exhaust system 18 is constructed in advance. For constructing such a mode, the difference between the combined air-fuel ratio KACT/T and a predetermined reference air-fuel ratio FLAF/BASE (KACT/T−FLAF/BASE, hereinafter referred to as "combined differential air-fuel ratio kact/t") is used as the input quantity to the equivalent exhaust system 18, and the difference between the output VO2/OUT of the $O_2$ sensor 12 and the target value VO2/TARGET (=VO2/OUT−VO2/TARGET, hereinafter referred to as "differential output VO2") is used as the output quantity from the equivalent exhaust system 18.

In the present embodiment, the reference air-fuel ratio FLAF/BASE is a stoichiometric air-fuel ratio. The combined differential air-fuel ratio kact/t corresponds to combined air-fuel ratio data, and the differential output VO2 of the $O_2$ sensor 12 corresponds to data representing the output of the $O_2$ sensor 12.

In the present embodiment, a model of the equivalent exhaust system 18 is constructed using the combined differential air-fuel ratio kact/t and the differential output VO2 of the $O_2$ sensor 12 as follows:

The model of the equivalent exhaust system 18 is constructed as a model which expresses the behavior of the equivalent exhaust system 18 with a discrete-time system (more specifically, an autoregressive model having a dead time in the combined differential air-fuel ratio kact/t as the input quantity to the equivalent exhaust system 18) according to the following equation (1):

$$VO2(k+1)=a1\cdot VO2(k)+a2\cdot VO2(k-1)+b1\cdot kact/t(k-d1) \quad (1)$$

where "k" represents an integer indicative of the ordinal number of a discrete-time control cycle of the exhaust system controller 15, and "d1" the number of control cycles of the exhaust system controller 15 which represents the dead time required until the value of the combined air-fuel ratio KACT/T or the combined differential air-fuel ratio kact/t in each control cycle is reflected in the output VO2/OUT or the differential output VO2 of the $O_2$ sensor 12. The dead time d1 is set to a predetermined value (fixed value) as described later on.

The first and second terms on the right side of the equation (1) are autoregressive terms representing respective elements of a response delay of the equivalent exhaust system 18. In the first and second terms, "a1", "a2" represent respective gain coefficients of primary and secondary autoregressive terms. Stated otherwise, these gain coefficients "a1", "a2" are coefficient parameters relative to the differential output VO2 of the $O_2$ sensor 12 as the output quantity from the equivalent exhaust system 18.

The third term on the right side of the equation (1) represents a dead time element of the equivalent exhaust system 18, and more precisely expresses the combined differential air-fuel ratio kact/t as the input quantity to the equivalent exhaust system 18, including the dead time d1 of the equivalent exhaust system 18. In the third term, "b1" represents a gain coefficient relative to the element, or stated otherwise a coefficient parameter relative to the combined differential air-fuel ratio kact/t as the input quantity to the equivalent exhaust system 18.

The gain coefficients "a1", "a2", "b1" are parameters which are to be set (identified) to certain values in defining the behavior of the equivalent exhaust system 18, and are sequentially identified by an identifier which will be described later on.

In the model of the equivalent exhaust system 18 expressed as the discrete time system according to the equation (1), the differential output VO2(k+1) of the $O_2$ sensor 12 as the output quantity from the equivalent exhaust system 18 in each control cycle of the exhaust system controller 15 is expressed by a plurality of (two in this embodiment) differential outputs VO2(k), VO2(k−1) in control cycles prior to the control cycle and a combined differential air-fuel ratio kact/t(k−d1) as the input quantity to the equivalent exhaust system 18 in a control cycle prior to the dead time d1 of the equivalent exhaust system 18.

The combined air-fuel ratio KACT/T as the input quantity to the equivalent exhaust system 18 is defined as the outputs KACT/A, KACT/B of the LAF sensors 13, 14 which represent the values (detected values) of the air-fuel ratios of the air-fuel mixtures combusted in the cylinder groups 3, 4 of the engine 1, as combined with respect to the cylinder groups 3, 4 according to a filtering process of the mixed model type described below. Since the model of the equivalent exhaust system 18 employs the combined differential air-fuel ratio kact/t(=KACT/T−FLAF/BASE) in the model of the equivalent exhaust system 18, the combined differential air-fuel ratio kact/t is defined as a combination of the difference kact/a (=KACT/A−FLAF/BASE, hereinafter referred to as "differential output kact/a") between the output KACT/A of the LAF sensor 13 and the reference air-fuel ratio FLAF/BASE and the difference kact/b (=KACT/B−FLAF/BASE, hereinafter referred to as "differential output kact/b") between the output KACT/B of the LAF sensor 14 and the reference air-fuel ratio FLAF/BASE.

In the present embodiment, therefore, the combined differential air-fuel ratio kact/t is defined as the differential outputs kact/a, kact/b of the LAF sensors 13, 14 which represent the values of the air-fuel ratios of the air-fuel mixtures actually combusted in the cylinder groups 3, 4, as being combined by the filtering process of the mixed model type that is expressed by the following equation (2):

$$kact/t(k-d1)=A1\cdot kact/a(k-dA)+A2\cdot kact/a(k-dA-1)+B1\cdot kact/b(k-dB)+B2\cdot kact/b(k-dB-1) \quad (2)$$

On the right side of the equation (2), "dA" represents the dead time (hereinafter referred to as "cylinder-group-3-side exhaust system dead time") required until the output KACT/A of the LAF sensor 13 associated with the cylinder group 3 in each control cycle of the exhaust system controller 15 is reflected in the output VO2/OUT of the $O_2$ sensor 12, in terms of the number of control cycles of the exhaust system controller 15, and "dB" represents the dead time (hereinafter referred to as "cylinder-group-4-side exhaust system dead time") required until the output KACT/B of the LAF sensor 14 associated with the cylinder group 4 in each control cycle of the exhaust system controller 15 is reflected in the output VO2/OUT of the $O_2$ sensor 12, in terms of the number of control cycles of the exhaust system controller 15.

The values of the dead times dA, dB depend on the lengths of the auxiliary exhaust pipes 6, 7, the capacities of the catalytic converters 9, 10 connected to the respective auxiliary exhaust pipes 6, 7, and the catalytic converter 11 connected to the main exhaust pipe 8. In the present embodiment, the values of the dead times dA, dB are set to a value (fixed value) predetermined through various experiments and simulation.

The coefficients A1, A2, B1, B2 of the terms on the right side of the equation (2) are preset as described later on.

In the present embodiment, the combined differential air-fuel ratio kact/t(k−d1) prior to the dead time d1 of the equivalent exhaust system 18 is determined according to a linear function which comprises as its components a plurality of (two in the embodiment) time-series data kact/a(k−dA), kact/a(k−dA−1), prior to the cylinder-group-3-side exhaust system dead time dA, of the differential output kact/a of the LAF sensor 13 associated with the cylinder group 3, and a plurality of (two in the embodiment) time-series data kact/b(k−dB), kact/b(k−dB−1), prior to the cylinder-group-4-side exhaust system dead time dB, of the differential output kact/b of the LAF sensor 14 associated with the cylinder group 4, or more specifically according to a linear combination of these time-series data.

The coefficients A1, A2, B1, B2 relative to the time-series data kact/a(k−dA), kact/a(k−dA−1), kact/b(k−dB), kact/b(k−dB−1) are set to such values that A1+A2+B1+B2=1

(preferably, A1+A2+B1+B2=0.5) and A1>A2, B1>B2 (e.g., A1=B1=0.4, A2=B2=0.1).

The combined differential air-fuel ratio kact/t thus determined is significant as a weighted mean value of the time-series data kact/a(k−dA), kact/a(k−dA−1), kact/b(k−dB), kact/b(k−dB−1).

In order to determine the combined differential air-fuel ratio kact/t, more time-series data of the differential outputs kact/a, kact/b of the LAF sensors 13, 14 may be employed.

The combined differential air-fuel ratio kact/t thus determined in each control cycle is given by an equation which is obtained by shifting the entire right side of the equation (2) into the future by control cycles corresponding to the dead time d1 of the equivalent exhaust system 18.

It is assumed that the cylinder-group-3-side exhaust system dead time dA and the cylinder-group-4-side exhaust system dead time dB are related to each other by dA≧dB, and their difference (dA−dB) is represented by dD (>0). If the dead time d1 of the equivalent exhaust system 18 is equal to the shorter one of the cylinder-group-3-side exhaust system dead time dA and the cylinder-group-4-side exhaust system dead time dB, i.e., the cylinder-group-4-side exhaust system dead time dB, (d1=dB), than the following equation (3) is obtained from the equation (2):

$$kact/t(k)=A1\cdot kact/a(k-dD)+A2\cdot kact/a(k-dD-1)+B1\cdot kact/b(k)+B2\cdot kact/b(k-1) \quad (3)$$

$$(dD=dA-dB\geqq 0,\ d1=dB)$$

Therefore, the combined differential air-fuel ratio kact/t (k) in each control cycle can be determined from the time-series data kact/a(k−dD), kact/a(k−dD−1), kact/b(k), kact/b(k−1) of the differential outputs kact/a, kact/b of the LAF sensors 13, 14 acquired prior to the control cycle, according to the filtering process represented by the equation (3).

In the present embodiment, the dead time d1 of the model of the equivalent exhaust system 18 is set to a value which is equal to the shorter one of the cylinder-group-3-side exhaust system dead time dA and the cylinder-group-4-side exhaust system dead time dB, i.e., the cylinder-group-4-side exhaust system dead time dB. For example, d1=7 in the present embodiment. The equation (3) is used as a basic equation expressing the filtering process of the mixed model type for determining the combined differential air-fuel ratio kact/t from the differential outputs kact/a, kact/b of the LAF sensors 13, 14.

The combined differential air-fuel ratio kact/t thus determined signifies an air-fuel ratio that is recognized from the oxygen concentration of exhaust gases produced when exhaust gases discharged from the cylinder groups 3, 4 are combined in the vicinity of the cylinder groups 3, 4. When the combined differential air-fuel ratio kact/t is determined from the differential outputs kact/a, kact/b of the LAF sensors 13, 14 according to the equation (3), the determined value corresponds to the detected value of the combined differential air-fuel ratio kact/t, i.e., the actual input quantity to the equivalent exhaust system 18.

When the combined air-fuel ratio KACT/T and the combined differential air-fuel ratio kact/t are determined as described above, if the target combined air-fuel ratio KCMD/T which is a target value for the combined air-fuel ratio KACT/T, i.e., a target value for the input quantity to the equivalent exhaust system 18, or a target value for the combined differential air-fuel ratio kact/t (=KCMD/T−FLAF/BASE, hereinafter referred to as "target combined differential air-fuel ratio kcmd/t") is determined in each control cycle, then a target air-fuel ratio KCMD(k) for the cylinder groups 3, 4 in each control cycle, i.e., a target value for the outputs KACT/A, KACT/B of the LAF sensors 13, 14, can be determined from the target combined air-fuel ratio KCMD/T(k) or the target combined differential air-fuel ratio kcmd/t(k) in each control cycle, as follows:

It is assumed that the target air-fuel ratio KCMD for the cylinder groups 3, 4 is shared by the cylinder groups 3, 4, and the difference between the target air-fuel ratio KCMD and the reference air-fuel ratio FLAF/BASE (KCMD−FLAF/BASE) is represented by kcmd (the difference kcmd will hereinafter be referred to as "target differential air-fuel ratio kcmd"). As indicated by the following equation (4), time-series data of the target differential air-fuel ratio kcmd as processed by the filtering process according to the right side of the equation (3) serve as the target combined differential air-fuel ratio kcmd/t(k) in each control cycle:

$$kcmd/t(k)=A1\cdot kcmd(k-dD)+A2\cdot kcmd(k-dD-1)+B1\cdot kcmd(k)+B2\cdot kcmd(k-1) \quad (4)$$

Therefore, once the value of the target combined differential air-fuel ratio kcmd/t(k) in each control cycle is determined, a target differential air-fuel ratio kcmd(k) in each control cycle can be determined from the value of the target combined differential air-fuel ratio kcmd/t(k) according to the equation (4), and hence a target air-fuel ratio KCMD(k) (=kcmd(k)+FLAF/BASE) for the cylinder groups 3, 4 can be determined.

Specifically, depending on whether the difference dD between cylinder-group-3-side exhaust system dead time dA and the cylinder-group-4-side exhaust system dead time dB (dD=dA−dB, hereinafter referred to as "cylinder-group exhaust system dead time difference dD") is dD 0 or dD>0, a target differential air-fuel ratio kcmd(k) in each control cycle can be determined according to the equations (5), (6):

$$kcmd(k)=\frac{1}{B1}\cdot[kcmd/t(k)-A1\cdot kcmd(k-dD)-A2\cdot kcmd(k-dD-1)-B2\cdot kcmd(k-1)] \quad (dD>0) \quad (5)$$

$$kcmd(k)=\frac{1}{A1+B1}\cdot[kcmd/t(k)-(A2+B2)\cdot kcmd(k-1)] \quad (dD=0) \quad (6)$$

Therefore, a target differential air-fuel ratio kcmd(k) in each control cycle can be determined from the target combined differential air-fuel ratio kcmd/t(k) determined in the control cycle and target differential air-fuel ratios kcmd(k−dD), kcmd(k−dD−1), kcmd(k−1) (the equation (5) or kcmd (k−1) (the equation (6)) in past control cycles.

In the present embodiment, the cylinder-group exhaust system dead time difference dD is dD>0 (e.g., dD=2). In this case, the target differential air-fuel ratio kcmd(k) for the cylinder groups 3, 4 corresponding to the target combined differential air-fuel ratio kcmd/t(k) can be determined in each control cycle according to the equation (5).

The target combined differential air-fuel ratio kcmd/t corresponds to target combined air-fuel ratio data, and the target differential air-fuel ratio kcmd corresponds to target air-fuel ratio data.

In the present embodiment, for determining the target air-fuel ratio KCMD for the cylinder groups 3, 4, a model expressing the behavior of an air-fuel ratio manipulating system is constructed in advance in order to compensate for not only the dead time d1 of the equivalent exhaust system 18 but also the dead time of a system which comprises the fuel supply controller 16 and the engine 1, i.e., the air-fuel ratio manipulating system, as follows:

The air-fuel ratio manipulating system is a system for generating the outputs KACT/A, KACT/B of the LAF sensors 13, 14 from the target air-fuel ratio KCMD, and has a dead time in a low rotational speed range of the engine 1. The air-fuel ratio manipulating system basically has response delay characteristics due to the engine 1. However, the effect that the engine 1 has on the response delay of the air-fuel ratio manipulating system can be compensated for by a control process of the exhaust system controller 15, the details of which will be described later on.

It is assumed that the dead time until the target air-fuel ratio KCMD in each control cycle is reflected in the output KACT/A of the LAF sensor 13 (hereinafter referred to as "cylinder-group-3-side air-fuel ratio manipulation dead time") and the dead time until the target air-fuel ratio KCMD in each control cycle is reflected in the output KACT/B of the LAF sensor 14 (hereinafter referred to as "cylinder-group-4-side air-fuel ratio manipulation dead time") are substantially equal to each other, and have an equal value (represented by the number of control cycles) d2. Based on the above assumption, the behavior of the air-fuel ratio manipulating system can be expressed, using the target differential air-fuel ratio kcmd and the differential outputs kact/a, kact/b of the LAF sensors 13, 14, according to the following equation (7):

$$kact/a(k)=kact/b(k)=kcmd(k-d2) \quad (7)$$

By applying the equation (7) to the equation (3), and using the equation (4), the following equation (8) can be obtained:

$$kact/t(k)=kcmd/t(k-d2) \quad (8)$$

The cylinder-group-3-side air-fuel ratio manipulation dead time and the cylinder-group-4-side air-fuel ratio manipulation dead time can be substantially equalized to each other, or specifically the difference between these dead times can be kept within one period of the control cycles of the exhaust system controller 15, by adjusting the positions where the LAF sensors 13, 14 are installed.

In the present embodiment, with the cylinder-group-3-side air-fuel ratio manipulation dead time and the cylinder-group-4-side air-fuel ratio manipulation dead time being substantially equalized to each other, as described above, a model expressing the behavior of the air-fuel ratio manipulating system is determined according to the equation (8).

That is, the air-fuel ratio manipulating system is expressed as a system for generating the combined differential air-fuel ratio kact/t as the input quantity to the equivalent exhaust system 18 with the dead time d2 from the target combined differential air-fuel ratio kcmd/t, stated otherwise, a system where the actual combined differential air-fuel ratio kact/t(k) in each control cycle is equal to the target combined differential air-fuel ratio kcmd/t(k−d2) prior to the dead time d2.

The cylinder-group-3-side air-fuel ratio manipulation dead time and the cylinder-group-4-side air-fuel ratio manipulation dead time are longer as the rotational speed of the engine 1 is higher. In the present embodiment, the value of the dead time d2 in the equation (8) is preset to an actual value of the air-fuel ratio manipulation dead time at an idling rotational speed of the engine 1 or a predetermined value (e.g., d2=3) slightly longer than the actual value of the air-fuel ratio manipulation dead time at an idling rotational speed.

The exhaust system controller 15 sequentially determines, in each control cycle, the target combined differential air-fuel ratio kcmd/t (the control input to the equivalent exhaust system 18) required to converge the differential output VO2 of the $O_2$ sensor 12 to "0", i.e., to converge the output VO2/OUT of the $O_2$ sensor 12 to the target value VO2/TARGET according to an algorithm that is constructed on the basis of the model of the equivalent exhaust system 18, the model of the air-fuel ratio manipulating system, and the filtering process of the mixed model type. For determining the target combined differential air-fuel ratio kcmd/t, the exhaust system controller 15 compensates for changes in the behavioral characteristics of the equivalent exhaust system 18, the response delay and data time d1 of the equivalent exhaust system 18, and the dead time d2 of the air-fuel ratio manipulating system. The exhaust system controller 15 then sequentially determines, in each control cycle, the target differential air-fuel ratio kcmd for the cylinder groups 3, 4 and the target air-fuel ratio KCMD from the determined target combined differential air-fuel ratio kcmd/t, and gives the target air-fuel ratio KCMD to the fuel supply controller 16.

Figure 4:
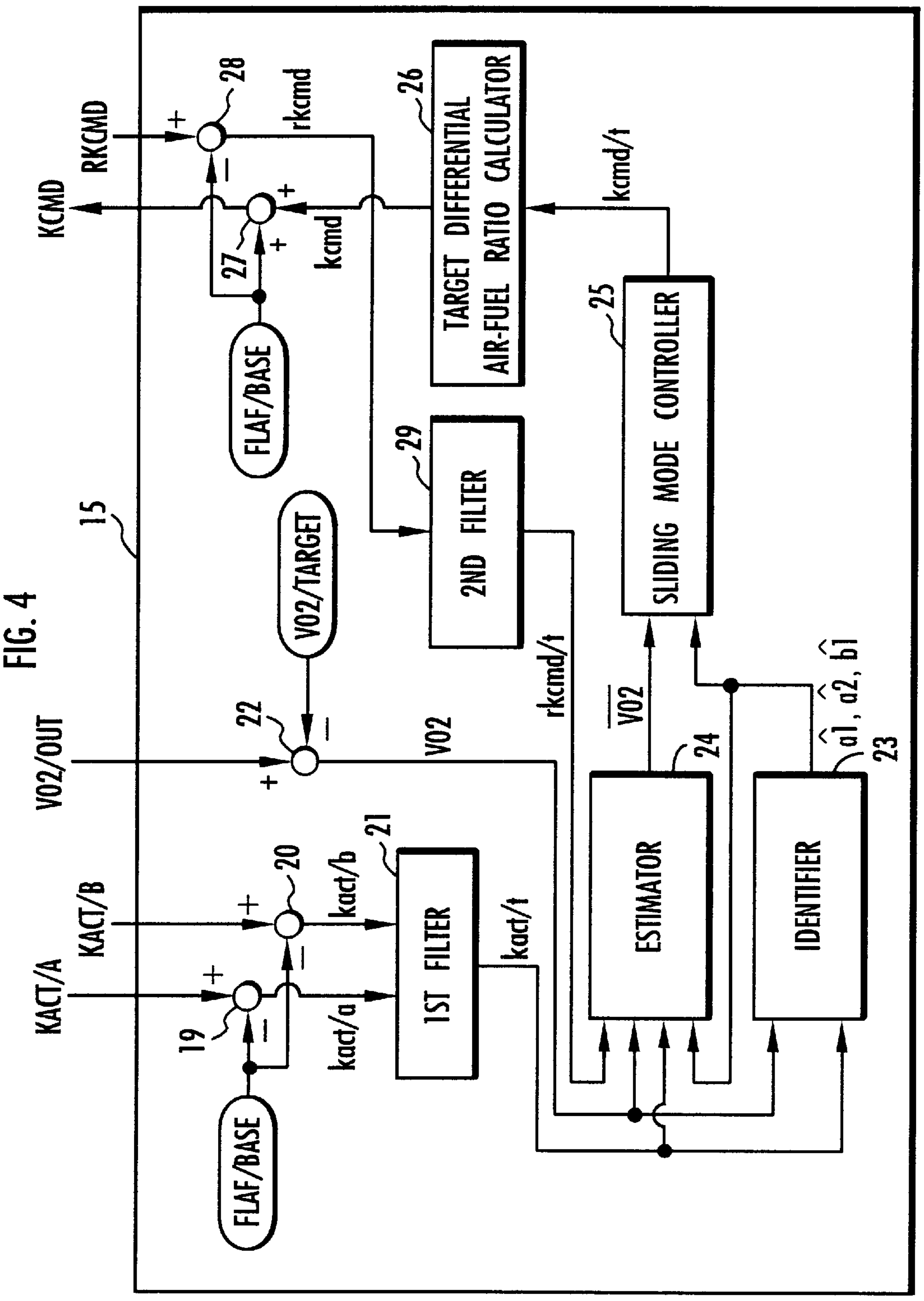
FIG. 4 is a block diagram of a basic arrangement of an exhaust system controller of the air-fuel ratio control apparatus shown in FIG. 1.

In order to perform the above process, the exhaust system controller 15 has a functional arrangement as shown in FIG. 4.

Specifically, the exhaust system controller 15 has subtractors 19, 20 for subtracting the reference air-fuel ratio FLAF/BASE from the outputs KACT/A, KACT/B of the LAF sensors 13, 14 to sequentially determine the differential outputs kact/a, kact/b, a first filter 21 (first filtering means) for effecting the filtering process represented by the equation (3) on the differential outputs kact/a, kact/b to sequentially determine the combined differential air-fuel ratio kact/t, and a subtractor 22 for subtracting the target value VO2/TARGET from the output VO2/OUT of the $O_2$ sensor 12 to sequentially determine the differential output VO2.

The exhaust system controller 15 also has an identifier 23 (identifying means) for sequentially determining identified values a1 hat, a2 hat, b1 hat of the gain coefficients a1, a2, b1 (hereinafter referred to as "identified gain coefficients a1 hat, a2 hat, b1 hat") which are parameters to be set of the model (the equation (1)) of the equivalent exhaust system 18.

The exhaust system controller 15 also has an estimator 24 (second estimating means) for sequentially determining an estimated value VO2 bar of the differential output VO2 from the $O_2$ sensor 12 (hereinafter referred to as "estimated differential output VO2 bar") as data representing an estimated value of the output VO2/OUT from the $O_2$ sensor 12 after a total dead time d (=d1+d2) which is the sum of the dead time d1 of the equivalent exhaust system 18 and the dead time d2 of the air-fuel ratio manipulating system.

The exhaust system controller 15 further includes a sliding mode controller 25 (target combined air-fuel ratio data generating means) for sequentially determining the target combined differential air-fuel ratio kcmd/t required to converge the output VO2 of the $O_2$ sensor 12 to the target value VO2/TARGET, according to the algorithm of an adaptive sliding mode control process, which is a feedback control process.

The exhaust system controller 15 also has a target differential air-fuel ratio calculator 26 (target air-fuel ratio data generating means) for sequentially determining a target differential air-fuel ratio kcmd for the cylinder groups 3, 4 by effecting the calculating process (converting process) according to the equation (5) on the target combined differential air-fuel ratio kcmd/t determined by the sliding mode controller 25, and an adder 27 for adding the reference air-fuel ratio FLAF/BASE to the target differential air-fuel ratio kcmd to sequentially generate a target air-fuel ratio KCMD for the cylinder groups 3, 4.

In the present embodiment, the fuel supply controller 16 occasionally manipulates the air-fuel ratio of the air-fuel mixture actually combusted in the cylinder groups 3, 4, not using the target air-fuel ratio KCMD determined by the exhaust system controller 15, but using a target air-fuel ratio that is determined separately from the target air-fuel ratio KCMD, depending on the operating conditions of the engine 1. A target air-fuel ratio, including the above separately determined target air-fuel ratio, actually used by the fuel supply controller 16 in order to manipulate the air-fuel ratios of the cylinder groups 3, 4 will hereinafter referred to as "actually used target air-fuel ratio RKCMD". As will be described in detail later on, the exhaust system controller 15 further includes the following functional arrangement in order to reflect the actually used target air-fuel ratio RKCMD in the operating process of the estimator 24:

The exhaust system controller 15 has a subtractor 28 for subtracting the reference air-fuel ratio FLAF/BASE from the actually used target air-fuel ratio RKCMD supplied from the fuel supply controller 16 for thereby sequentially determining an actually used target differential air-fuel ratio rkcmd (=RKCMD−FLAF/BASE) corresponding to the target differential air-fuel ratio actually used by the fuel supply controller 16, and a second filter 29 (second filtering means) for effecting the filtering process of the same type as the right side of the equation (3) or the equation (4) on an actually used target combined differential air-fuel ratio rkcmd/t (actually used target combined air-fuel ratio data) as a target combined differential air-fuel ratio that forms a basis for the actually used target differential air-fuel ratio rkcmd that is actually used by the fuel supply controller 16.

The filtering process performed by the second filter 29 is specifically given by the equation (9) given below, and the actually used target combined differential air-fuel ratio rkcmd/t(k) is determined in each control cycle of the exhaust system controller 15 according to the equation (9).

$$rkcmd/t(k)=A1\cdot rkcmd(k-dD)+A2\cdot rkcmd(k-dD-1)+B1\cdot rkcmd(k)+B2\cdot rkcmd(k-1) \quad (9)$$

The actually used target combined differential air-fuel ratio rkcmd/t(k) in each control cycle is determined by the filtering process according to the equation (9) from time-series data rkcmd(k), rkcmd(k−1), rkcmd(k−dD), rkcmd(k−dD−1) of the actually used target differential air-fuel ratio rkcmd that corresponds to the actually used target air-fuel ratio RKCMD that is being used or was used by the fuel supply controller 16 prior to the control cycle.

The actually used target air-fuel ratio RKCMD(k) actually used by the fuel supply controller 16 in each control cycle of the exhaust system controller 15 is usually equal to a target air-fuel ratio KCMD(k−1) that is finally determined by the exhaust system controller 15 in the preceding control cycle. Thus, usually, rkcmd(k)=kcmd(k−1). Therefore, the actually used target combined differential air-fuel ratio rkcmd/t(k) determined in each control cycle by the second filter 29 corresponds to a preceding value kcmd/t(k−1) of the target combined differential air-fuel ratio kcmd/t that is determined by the sliding mode controller 25 as described later on (usually, rkcmd/t(k)=kcmd/t(k−1)).

The algorithm of a processing sequence to be carried out by the identifier 23, the estimator 24, and the sliding mode controller 25 is constructed as follows:

The identifier 23 sequentially calculates, on a real-time basis, the identified gain coefficients a1 hat, a2 hat, b1 hat in order to minimize a modeling error of the model of the equivalent exhaust system 18.

The identifier 23 determines, in each of the control cycles of the exhaust system controller 15, the value of a differential output VO2(k) of the $O_2$ sensor 12 in the present control cycle on the model of the equivalent exhaust system 18 (hereinafter referred to as "identified differential output VO2(k) hat") according to the equation (10) shown below, using the values of the identified gain coefficients al(k−1) hat, a2(k−1) hat, b1(k−1) hat determined in the preceding control cycle (present values of the identified gain coefficients), the data of past values of the differential output VO2 from the $O_2$ sensor 12 as calculated by the subtractor 22 (more specifically, the differential output VO2(k−1) in a 1st control cycle prior to the present control cycle and the differential output VO2(k−2) in a 2nd control cycle prior to the present control cycle), and the data of a past value of the combined differential air-fuel ratio kact/t as calculated by the first filter 21 (more specifically, the differential output kact/t(k−d1−1) in a (d1+1)th control cycle prior to the present control cycle.

$$\hat{VO2}(k)=\hat{a}1(k-1)\cdot VO2(k-1)+\hat{a}2(k-1)\cdot VO2(k-2)+\hat{b}1(k-1)\cdot kact/t(k-d1-1)=\Phi^T(k-1)\cdot\xi(k) \quad (10)$$

where $$\Phi^T(k)=[\hat{a}1(k)\hat{a}2(k)\hat{b}1(k)]$$

$$\xi(k)=[VO2(k-1)VO2(k-2)kact/t(k-d1-1)]$$

The equation (10) corresponds to the equation (1) expressing the model of the equivalent exhaust system 18, as shifted into the past by one control cycle with the gain coefficients a1, a2, b1 being replaced with the respective identified gain coefficients al(k−1) hat, a2(k−1) hat, b1(k−1) hat.

The value of the dead time d1 of the equivalent exhaust system 18 in the third term of the equation (10) represents a preset value (constant value, which is a preset value of the cylinder-group-4-side exhaust system dead time dB) as described above. In the equation (10), Φ, ξ represent vectors defined therein, and T represents a transposition.

The identifier 23 also determines a difference ID/E(k) between the above identified differential output VO2 hat and the present actual differential output VO2 from the $O_2$ sensor 12, as representing a modeling error of the model of the equivalent exhaust system 18 according to the following equation (11) (the difference ID/E will hereinafter be referred to as "identified error ID/E"):

$$ID/E(k)=VO2(k)-\hat{VO2}(k) \quad (11)$$

The identifier 23 further determines new identified gain coefficients a1(k) hat, a2(k) hat, b1(k) hat, stated otherwise, a new vector Φ(k) having these identified gain coefficients as elements (hereinafter the new vector Φ(k) will be referred to as "identified gain coefficient vector Φ"), according to an algorithm to minimize the identified error ID/E (more precisely, the absolute value of the identified error ID/E), according to the equation (12) given below.

That is, the identifier 23 varies the identified gain coefficients a1(k−1) hat, a2(k−1) hat, b1(k−1) hat determined in the preceding control cycle by a quantity proportional to the identified error ID/E(k) for thereby determining the new identified gain coefficients a1(k) hat, a2(k) hat, b1(k) hat.

$$\Phi(k)=\Phi(k-1)+Kp(k)\cdot ID/E(k) \quad (12)$$

where Kp(k) represents a cubic vector determined by the following equation (13) in each control cycle, and determines a rate of change (gain) depending on the identified error ID/E of the identified gain coefficients a1 hat, a2 hat, b1 hat:

$$Kp(k)=\frac{P(k-1)\cdot\xi(k)}{1+\xi^T(k)\cdot P(k-1)\cdot\xi(k)} \quad (13)$$

where P(k) represents a cubic square matrix updated in each control cycle by a recursive formula expressed by the following equation (14):

$$P(k)=\frac{1}{\lambda 1}\left[I-\frac{\lambda 2\cdot P(k-1)\cdot\xi(k)\cdot\xi^T(k)}{\lambda 1+\lambda 2\cdot\xi^T(k)\cdot P(k-1)\cdot\xi(k)}\right]\cdot P(k-1) \quad (14)$$

where I represents a unit matrix. In the equation (14), an initial value P(O) of the matrix P(k) represents a diagonal matrix whose each diagonal component is a positive number, and λ1, λ2 are established to satisfy the conditions $0<\lambda 1\leqq 1$ and $0\leqq\lambda 2<2$.

Depending on how λ1, λ2 in the equation (14) are established, any one of various specific algorithms including a method of least squares, a method of weighted least squares, a fixed gain method, a degressive gain method, a fixed tracing method, etc. may be employed. According to the present embodiment, a method of least squares (λ1=λ2=1), for example, is employed.

Basically, the identifier 23 sequentially updates and determines in each control cycle the identified gain coefficients a1 hat, a2 hat, b1 hat in order to minimize the identified error ID/E according to the above algorithm (specifically, the processing sequence of a sequential method of least squares). Through this processing, it is possible to sequentially obtain the identified gain coefficients a1 hat, a2 hat, b1 hat which match the actual behavior of the equivalent exhaust system 18 on a real-time basis.

The above algorithm is the basic algorithm that is carried out by the identifier 23.

The estimator 24 sequentially determines in each control cycle the estimated differential output VO2 bar which is an estimated value of the differential output VO2 from the $O_2$ sensor 12 after the total dead time d (=d1+d2) in order to compensate for the effect of the dead time d1 (d1=7 in the present embodiment) of the equivalent exhaust system 18 and the effect of the dead time d2 (d2=3 in the present embodiment) of the air-fuel ratio manipulating system (composed of the engine 1 and the fuel supply controller 16) for the calculation of the target combined differential air-fuel ratio kcmd/t with the sliding mode controller 25 as described in detail later on.

An algorithm for determining the estimated differential output VO2 bar of the $O_2$ sensor is constructed based on the model of the equivalent exhaust system 18 expressed according to the equation (1) and the model of the air-fuel ratio manipulating system expressed according to the equation (8), as follows:

When the equation (8) is applied to the equation (1), the following equation (15) is obtained:

$$VO2(k+1)=a1\cdot VO2(k)+a2\cdot VO2(k-1)+b1\cdot kcmd/t(k-d)$$

where d=d1+d2.

The equation (15) expresses, with a discrete time system, the behavior of a system that is a combination of the air-fuel ratio manipulating system, which is regarded as a system composed of only dead-time elements, and the equivalent exhaust system.

By using the equation (15), the estimated differential output VO2(k+d) bar which is an estimated value of the differential output VO2(k+d) of the $O_2$ sensor 12 after the total dead time d in each control cycle can be expressed using time-series data VO2(k), VO2(k−1) of the differential output VO2 of the $O_2$ sensor 12 and time-series data kcmd/t(k−j) (j=1, 2, . . . , d) of the past values of the differential output VO2 of the $O_2$ sensor 12, according to the following equation (16):

$$\overline{VO2}(k+d)=\alpha 1\cdot VO2(k)+\alpha 2\cdot VO2(k-1)+\sum_{j=1}^{d}\beta j\cdot kcmd/t(k-j) \quad (16)$$

where

α1=the first-row, first-column element of $A^d$,

α2=the first-row, second-column element of $A^d$,

βj=the first-row, first-column elements of $A^{j-1}\cdot B$ $$A=\begin{bmatrix} a1 & a2\\ 1 & 0\end{bmatrix} \quad B=\begin{bmatrix} b1\\ 0\end{bmatrix}$$

In the equation (16), "α1", "α2" represent the first-row, first-column element and the first-row, second-column element, respectively, of the dth power $A^d$ (d: total dead time) of the matrix A defined as described above with respect to the equation (16), and "βj" (j=1, 2, . . . , d) represents the first-row elements of the product $A^{j-1}\cdot B$ of the (j−1)th power $A^{j-1}$ (j=1, 2, . . . , d) of the matrix A and the vector B defined as described above with respect to the equation (16).

Of the time-series data of the past values of the target combined differential air-fuel ratio kcmd/t according to the equation (16), the time-series data kcmd/t(k−d2), kcmd/t(k−d2−1), . . . , kcmd/t(k−d) prior to the dead time d2 of the air-fuel manipulating system can be replaced respectively with data kact/t(k), kact/t(k−1), . . . , kact/t(k−d+d2) prior to the present control cycle of the combined differential air-fuel ratio kact/t calculated by the first filter 21 according to the equation (8) (the model of the air-fuel manipulating system). When the time-series data are thus replaced, the following equation (17) is obtained:

$$\overline{VO2}(k+d)=\alpha 1\cdot VO2(k)+\alpha 2\cdot VO2(k-1)+\sum_{j=1}^{d2-1}\beta j\cdot kcmd/t(k-j)+\sum_{i=d2}^{d}\beta i\cdot kact/t(k+d2-i) \quad (17)$$

The time-series data kcmd/t(k−1), . . . , kcmd/t(k−d2+1) of the past values of the target combined differential air-fuel ratio kcmd/t according to the equation (17) basically correspond to the target air-fuel ratio KCMD used by the fuel supply controller 16 to manipulate the air-fuel ratios of the cylinder groups 3, 4 of the engine 1. As described later on, the fuel supply controller 16 may use another target air-fuel ratio than the target air-fuel ratio KCMD determined by the exhaust system controller 15 for manipulating the air-fuel ratios of the cylinder groups 3, 4. In this case, the target combined differential air-fuel ratio kcmd/t determined by the sliding mode controller 25 is not reflected in the manipulation of the actual air-fuel ratios of the cylinder groups 3, 4.

As described above, the actually used target combined differential air-fuel ratio rkcmd/t(k) sequentially determined in each control cycle by the second filter 29 corresponds to the target combined differential air-fuel ratio kcmd/t(k−1) determined in the preceding control cycle by the sliding mode controller 25 as described later on (usually, rkcmd/t(k)=kcmd/t(k−1)).

In the present embodiment, time series data rkcmd/t(k), . . . , rkcmd/t(k−d2+2) of the actually used target combined differential air-fuel ratio rkcmd/t sequentially determined by the second filter 29 are used instead of the time-series data kcmd/t(k−1), . . . , kcmd/t(k−d2+1) of the past values of the target combined differential air-fuel ratio kcmd/t according to the equation (17). For such a data replacement, the equation (17) can be rewritten into the following equation (18):

$$\overline{VO2}(k+d) = \alpha 1 \cdot VO2(k) + \alpha 2 \cdot VO2(k-1) + \sum_{j=1}^{d2-1} \beta j \cdot rkcmd/t(k-j+1) + \sum_{i=d2}^{d} \beta i \cdot kact/t(k+d2-i) \tag{18}$$

The equation (18) is used by the estimator 24 to calculate the estimated differential output VO2(k+d) bar in each control cycle. Specifically, in the present embodiment, the estimator 24 calculates, in each control cycle, the estimated differential output VO2(k+d) bar according to the equation (18), using the time-series data VO2(k), VO2(k−1) of the differential output VO2 of the $O_2$ sensor 12, the time-series data rkcmd(k−j+1) (j=1, . . . , d2−1) of the present and vast values of the actually used target combined differential air-fuel ratio rkcmd determined by the second filter 29 as corresponding to the target air-fuel ratio actually used by the fuel supply controller 16, and the time-series data kact/t(k+d2−i) (i=d2, . . . , d) of the present and vast values of the combined differential air-fuel ratio kact/t determined by the first filter 21 as corresponding to the detected value of the combined air-fuel ratio KACT/T.

The coefficients a1, a2, and β(j) (j=1, 2, . . . , d) required to calculate the equation (18) are calculated according to the definition given with respect to the equation (16), from the latest values (the values determined in the present control cycle) of the identified gain coefficients a1 hat, a2 hat, b1 hat determined by the identifier 23. The dead time d1 of the equivalent exhaust system 18 and the dead time d2 of the air-fuel ratio manipulating system, which are required to calculate the equation (18), are of the values established as described above.

The above processing sequence is the basic algorithm executed by the estimator 24.

The sliding mode controller 25 will be described in detail below.

The sliding mode controller 25 sequentially determines, in each control cycle, the target combined differential air-fuel ratio kcmd/t as a control input to be given to the equivalent exhaust system 18 for converging the VO2/OUT of the $O_2$ sensor 12 to the target value VO2/TARGET, i.e., for converging the differential output VO2 of the $O_2$ sensor 12 to "0", according to the algorithm of an adaptive sliding mode control process which incorporates an adaptive control law (adaptive algorithm) for minimizing the effect of a disturbance, in a normal sliding mode control process. The algorithm for carrying out the adaptive sliding mode control process is constructed as follows:

A switching function required for the algorithm of the adaptive sliding mode control process carried out by the sliding mode controller 25 and a hyperplane defined by the switching function (also referred to as a slip plane) will first be described below.

According to a basic concept of the sliding mode control process carried out by the sliding mode controller 25, a state quantity to be controlled (controlled quantity) is the time-series data of the differential output VO2 of the $O_2$ sensor 12, and a switching function σ for the sliding mode control process is defined according to the following equation (19):

$$\sigma(k) = s1 \cdot VO2(k) + s2 \cdot VO2(k-1) = S \cdot X \tag{19}$$

where $$S = [\, s1 \quad s2 \,]$$

$$X = \begin{bmatrix} VO2(k) \\ VO2(k-1) \end{bmatrix}$$

The switching function σ is defined by a linear function having as components a plurality of (two in this embodiment) time-series data VO2(k), VO2(k−1) prior to the present time of the differential output VO2 of the $O_2$ sensor 12, i.e., a linear combination of the time-series data VO2(k), VO2(k−1), more specifically, differential outputs VO2(k), VO2(k−1) in the present and preceding control cycles. The vector X defined in the equation (19) as a vector having the differential outputs VO2(k), VO2(k−1) as its components will hereinafter be referred to as a state quantity X.

The coefficients s1, s2 relative to the components VO2(k), VO2(k−1) of the switching function σ are set in advance to values to meet the condition of the following equation (20):

$$-1 < \frac{s2}{s1} < 1 \tag{20}$$

(when s1=1, −1<s2<1)

In the present embodiment, for the sake of brevity, the coefficient s1 is set to s1=1 (s2/s1=s2), and the coefficient s2 (constant value) is established to satisfy the condition: −1<s2 21 1.

Figure 5:
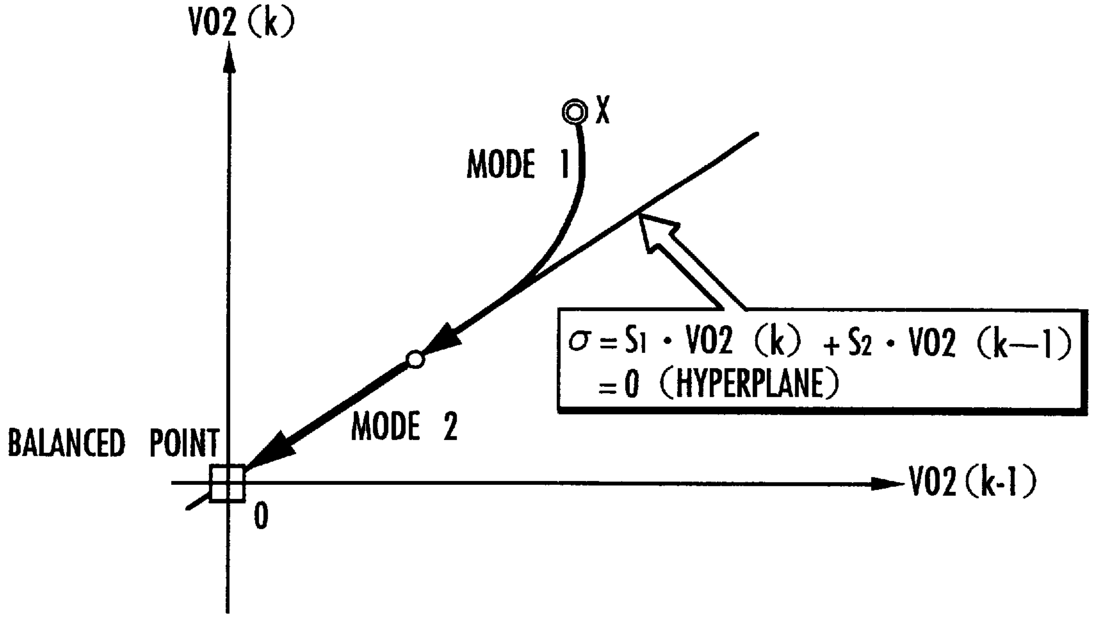
FIG. 5 is a diagram illustrative of a sliding mode control process employed by the exhaust system controller of the air-fuel ratio control apparatus shown in FIG. 1.

With the switching function σ thus defined, the hyperplane for the sliding mode control process is defined by the equation σ=0. Since the state quantity X is of the second degree, the hyperplane σ=0 is represented by a straight line as shown in FIG. 5. At this time, the hyperplane is called also a switching line.

In the present embodiment, the time-series data of the estimated differential output VO2 bar determined by the estimator 24 is actually used as the components of the switching function, as described later on.

The adaptive sliding mode control process performed by the sliding mode controller 25 serves to converge the state quantity X (VO2(k), VO2(k−1)) onto the hyperplane σ=0 according to a reaching control law which is a control law for converging the state quantity X onto the hyperplane σ=0, i.e., for converging the value of the switching function σ to "0", and an adaptive control law (adaptive algorithm) which is a control law for compensating for the effect of a disturbance in converging the state quantity X onto the hyperplane σ=0 (mode 1 in FIG. 5). While converging the state quantity X onto the hyperplane σ=0 according to an equivalent control input (holding the value of the switching function σ at "0"), the state quantity X is converged to a balanced point on the hyperplane σ=0 where VO2(k)=VO2(k−1)=0, i.e., a point where time-series data VO2/OUT(k), VO2/OUT(k−1) of the output VO2/OUT of the $O_2$ sensor 12 are equal to the target value VO2/TARGET (mode 2 in FIG. 5).

In the normal sliding mode control process, the adaptive control law is omitted in the mode 1, and the state quantity X is converged onto the hyperplane σ=0 only according to the reaching control law.

The target combined differential air-fuel ratio kcmd/t to be generated by the sliding mode controller 25 for converging the state quantity X to the balanced point on the hyperplane σ=0 is expressed as the sum of an equivalent control input Ueq which is an input component to be applied to the equivalent exhaust system 18 according to the control law for converging the state quantity X onto the hyperplane σ=0, an input component Urch (hereinafter referred to as "reaching control law input Urch") to be applied to the equivalent exhaust system 18 according to the reaching control law, and an input component Uadp (hereinafter referred to as "adaptive control law input Uadp") to be applied to the equivalent exhaust system 18 according to the adaptive control law (see the following equation (21)).

$$kcmd/t(k)=Ueq(k)+Urch(k)+Uadp(k) \tag{21}$$

The equivalent control input Ueq, the reaching control law input Urch, and the adaptive control law input Uadp are determined on the basis the equation (15) which has combined the model of the equivalent exhaust system 18 expressed by the equation (1) and the model of the air-fuel ratio manipulating system represented by the equation (8), as follows:

The equivalent control input Ueq which is an input component to be applied to the equivalent exhaust system 18 for converging the state quantity X onto the hyperplane σ=0 (holding the value of switching function σ at "0") is the target combined differential air-fuel ratio kcmd/t which satisfies the condition: σ(k+1)=σ(k)=0. Using the equations (15), (19), the equivalent control input Ueq which satisfies the above condition is given by the following equation (22):

$$Ueq(k) = \frac{-1}{s1 \cdot b1} \cdot \{[s1 \cdot (a1 - 1) + s2] \cdot VO2(k + d) + (s1 \cdot a2 - s2) \cdot VO2(k + d - 1)\} \tag{22}$$

The equation (22) is a basic formula for determining the equivalent control input Ueq(k) in each control cycle.

According to present embodiment, the reaching control law input Urch is basically determined according to the following equation (23):

$$Urch(k) = \frac{-1}{s1 \cdot b1} \cdot F \cdot \sigma(k + d) \tag{23}$$

Specifically, the reaching control law input Urch(k) in each control cycle is determined in proportion to the value of the switching function σ(k+d) after the total dead time d, in view of the total dead time d.

The coefficient F in the equation (23) is established to satisfy the condition expressed by the following equation (24):

$$0<F<2 \tag{24}$$

(Preferably, 0<F<1)

The preferable condition expressed by the equation (24) is a condition preferable to prevent the value of the switching function σ from varying in an oscillating fashion (so-called chattering) with respect to "0".

The adaptive control law input Uadp is basically determined according to the following equation (25) (ΔT in the equation (25) represents the period (constant value) of the control cycles of the exhaust system controller 15:

$$Uadp(k) = \frac{-1}{s1 \cdot b1} \cdot G \cdot \sum_{i=0}^{k+d} (\sigma(i) \cdot \Delta T) \tag{25}$$

The adaptive control law input Uadp(k) in each control cycle is determined in proportion to an integrated value (which corresponds to an integral of the values of the switching function σ over control cycles of the product of values of the switching function σ until after the total dead time d and the period ΔT of the control cycles, in view of the total dead time d.

The coefficient G (which determines the gain of the adaptive control law) in the equation (25) is established to satisfy the condition of the following equation (26):

$$G = J \cdot \frac{2 - F}{\Delta T} \tag{26}$$

A specific process of deriving conditions for establishing the equations (24), (26) is described in detail in Japanese patent application No. 11-93741 or U. S. Pat. No. 6,082,099, and will not be described in detail below.

The target combined differential air-fuel ratio kcmd/t generated by the sliding mode controller 25 as a control input to be given to the equivalent exhaust system 18 may basically be determined as the sum (Ueq+Urch+Uadp) of the equivalent control input Ueq, the reaching control law input Urch, and the adaptive control law input Uadp determined according to the respective equations (22), (23), (25). However, the differential outputs VO2(k+d), VO2(k+d−1) of the $O_2$ sensor 12 and the value σ(k+d) of the switching function σ, etc. used in the equations (22), (23), (25) cannot directly be obtained as they are values in the future.

Therefore, the sliding mode controller 25 uses the estimated differential outputs VO2(k+d) bar, VO2(k+d−1) bar determined by the estimator 24, instead of the differential outputs VO2(K+d), VO2(k+d−1) required to calculate the equation (22), and calculates the equivalent control input Ueq(k) in each control cycle according to the following equation (27):

$$Ueq(k) = \frac{-1}{s1 \cdot b1} \cdot \{[s1 \cdot (a1 - 1) + s2] \cdot \overline{VO2}(k + d) + (s1 \cdot a2 - s2) \cdot \overline{VO2}(k + d - 1)\} \tag{27}$$

According to present embodiment, furthermore, the sliding mode controller 25 actually uses time-series data of the estimated differential output VO2 bar sequentially determined by the estimator 24 as described above as a state quantity to be controlled. The sliding mode controller 25 defines a switching function σ bar according to the following equation (28) (the switching function σ bar corresponds to time-series data of the differential output VO2 in the equation (19) which is replaced with time-series data of the estimated differential output VO2 bar), in place of the switching function σ defined by the equation (19):

$$\overline{\sigma}(k)=s1 \cdot \overline{VO2}(k)+s2 \cdot \overline{VO2}(k-1) \tag{28}$$

The sliding mode controller 25 calculates the reaching control law input Urch(k) in each control cycle according to the following equation (29), using the value of the switching function σ bar represented by the equation (28), rather than the value of the switching function σ for determining the reaching control law input Urch according to the equation (23):

$$Urch(k) = \frac{-1}{s1 \cdot b1} \cdot F \cdot \bar{\sigma}(k+d) \tag{29}$$

Similarly, the sliding mode controller 25 calculates the adaptive control law input Uadp(k) in each control cycle according to the following equation (30), using the value of the switching function σ bar represented by the equation (23), rather than the value of the switching function σ for determining the adaptive control law input Uadp according to the equation (25):

$$Uadp(k) = \frac{-1}{s1 \cdot b1} \cdot G \cdot \sum_{i=0}^{k+d} (\bar{\sigma}(i) \cdot \Delta T) \tag{30}$$

The latest identified gain coefficients a1(k) hat, a2(k) hat, b1(k) hat which have been determined by the identifier 23 are basically used as the gain coefficients a1, a1, b1 that are required to calculate the equivalent control input Ueq, the reaching control law input Urch, and the adaptive control law input Uadp according to the equations (27), (29), (30).

The sliding mode controller 25 determines the sum of the equivalent control input Ueq, the reaching control law input Urch, and the adaptive control law input Uadp determined according to the equations (27), (29), (30), as the target combined differential air-fuel ratio kcmd/t (see the equation (21)). The conditions for establishing the coefficients s1, s2, F, G used in the equations (27), (29), (30) are as described above.

The target combined differential air-fuel ratio kcmd/t determined by the sliding mode controller 25 as described above is a control input to be given to the equivalent exhaust system 18 for converging the estimated differential output VO2 bar from the $O_2$ sensor 12 to "0", and as a result, for converging the output VO2/OUT from the $O_2$ sensor 12 to the target value VO2/TARGET.

The above process is a basic algorithm for generating the target combined differential output kcmd/t in each control cycle by the sliding mode controller 25.

The fuel supply controller 16 will be described below.

Figure 6:
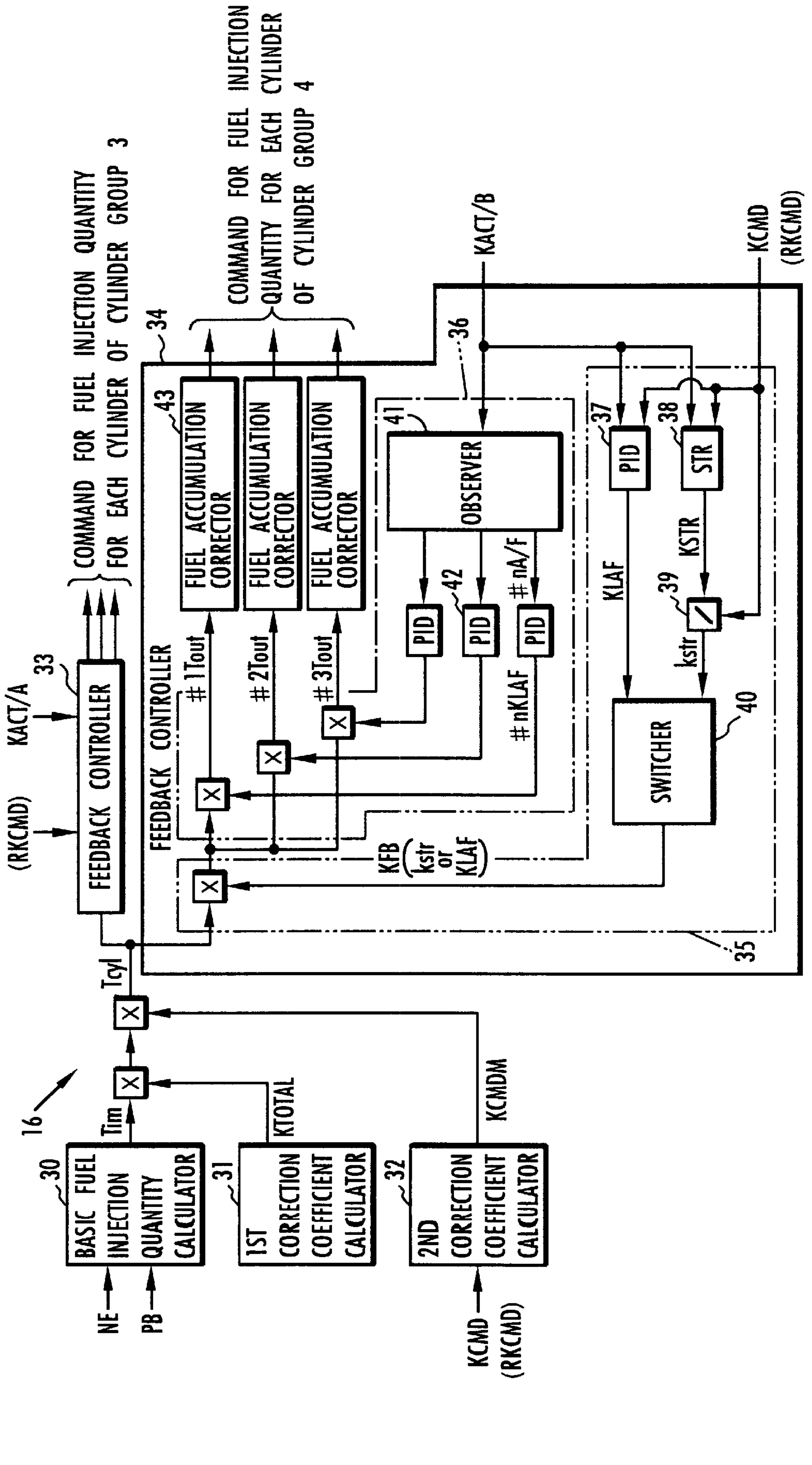
FIG. 6 is a block diagram of a basic arrangement of a fuel supply controller of the air-fuel ratio control apparatus shown in FIG. 1.

As shown in FIG. 6, the fuel supply controller 16 has, as its main functions, a basic fuel injection quantity calculator 30 for determining a basic fuel injection quantity Tim to be injected into the engine 1, a first correction coefficient calculator 31 for determining a first correction coefficient KTOTAL to correct the basic fuel injection quantity Tim, and a second correction coefficient calculator 32 for determining a second correction coefficient KCMDM to correct the basic fuel injection quantity Tim.

The basic fuel injection quantity calculator 30 determines a reference fuel injection quantity (fuel supply quantity) from the rotational speed NE and intake pressure PB of the engine 1 using a predetermined map, and corrects the determined reference fuel injection quantity depending on the effective opening area of a throttle valve (not shown) of the engine 1, thereby calculating a basic fuel injection quantity Tim.

The first correction coefficient KTOTAL determined by the first correction coefficient calculator 31 serves to correct the basic fuel injection quantity Tim in view of an exhaust gas recirculation ratio of the engine 1, i.e., the proportion of an exhaust gas contained in an air-fuel mixture introduced into the engine 1, an amount of purged fuel supplied to the engine 1 when a canister (not shown) is purged, a coolant temperature, an intake temperature, etc. of the engine 1.

The second correction coefficient KCMDM determined by the second correction coefficient calculator 32 serves to correct the basic fuel injection quantity Tim in view of the charging efficiency of an air-fuel mixture due to the cooling effect of fuel flowing into the engine 1 depending on a target air-fuel ratio KCMD generated by the exhaust system controller 15.

The fuel supply controller 16 corrects the basic fuel injection quantity Tim with the first correction coefficient KTOTAL and the second correction coefficient KCMDM by multiplying the basic fuel injection quantity Tim by the first correction coefficient KTOTAL and the second correction coefficient KCMDM, thus producing a demand fuel injection quantity Tcyl for the engine 1.

The basic fuel injection quantity Tim, the first correction coefficient KTOTAL, and the second correction coefficient KCMDM are shared by the cylinder groups 3, 4 of the engine 1. Specific details of processes for calculating the basic fuel injection quantity Tim, the first correction coefficient KTOTAL, and the second correction coefficient KCMDM are disclosed in detail in Japanese laid-open patent publication No. 5-79374 or U.S. Pat. No. 5,253,630, and will not be described below.

The fuel supply controller 16 also has, in addition to the above functions, a feedback controller 33 (feedback control means) for adjusting a fuel injection quantity for the cylinder group 3 according to a feedback control process so as to converge the output signal KACT/A (the detected value of the air-fuel ratio in the cylinder group 3) of the LAF sensor 13 associated with the cylinder group 3 toward the target air-fuel ratio KCMD which is sequentially generated by the exhaust system controller 15, and a feedback controller 34 (feedback control means) for adjusting a fuel injection quantity for the cylinder group 4 according to a feedback control process so as to converge the output signal KACT/B (the detected value of the air-fuel ratio in the cylinder group 4) of the LAF sensor 14 associated with the cylinder group 4 toward the target air-fuel ratio KCMD.

Since control processes carried out by the feedback controllers 33, 34 are identical to each other, only the control process carried out by the feedback controller 34 associated with the cylinder group 4, for example, will be described below.

The feedback controller 34 comprises a general feedback controller 35 for controlling a total air-fuel ratio for the entire cylinder group 4 and a local feedback controller 36 for feedback-controlling an air-fuel ratio for each of the cylinders of the cylinder group 4.

The general feedback controller 35 sequentially determines a feedback correction coefficient KFB to correct the demand fuel injection quantity Tcyl (by multiplying the demand fuel injection quantity Tcyl) so as to converge the output signal KACT/B from the LAF sensor 14 toward the target air-fuel ratio KCMD.

The general feedback controller 35 comprises a PID controller 37 for generating a feedback manipulated variable KLAF as the feedback correction coefficient KFB depending on the difference between the output signal KACT/B from the LAF sensor 14 and the target air-fuel ratio KCMD according to a known PID control process, and an adaptive controller 38 (indicated by "STR" in FIG. 6) for adaptively determining a feedback manipulated variable KSTR for determining the feedback correction coefficient KFB in view of changes in operating conditions of the engine 1 or characteristic changes thereof from the output signal KACT/B from the LAF sensor 14 and the target air-fuel ratio KCMD.

In the present embodiment, the feedback manipulated variable KLAF generated by the PID controller 37 is of "1" and can be used directly as the feedback correction coefficient KFB when the output signal KACT/B (the detected air-fuel ratio in the cylinder group 4) from the LAF sensor 14 is equal to the target air-fuel ratio KCMD. The feedback manipulated variable KSTR generated by the adaptive controller 38 becomes the target air-fuel ratio KCMD when the output signal KACT/B from the LAF sensor 14 is equal to the target air-fuel ratio KCMD. A feedback manipulated variable kstr (=KSTR/KCMD) which is produced by dividing the feedback manipulated variable KSTR by the target air-fuel ratio KCMD with a divider 39 can be used as the feedback correction coefficient KFB.

The feedback manipulated variable KLAF generated by the PID controller 37 and the feedback manipulated variable kstr which is produced by dividing the feedback manipulated variable KSTR from the adaptive controller 38 by the target air-fuel ratio KCMD are selected one at a time by a switcher 40. A selected one of the feedback manipulated variable KLAF and the feedback manipulated variable kstr is used as the feedback correction coefficient KFB. The demand fuel injection quantity Tcyl is corrected by being multiplied by the feedback correction coefficient KFB. Details of the general feedback controller 35 (particularly, the adaptive controller 38) will be described later on.

The local feedback controller 36 comprises an observer 41 for estimating real air-fuel ratios #nA/F (n=1, 2, 3) of the respective cylinders of the cylinder group 4 from the output signal KACT/B from the LAF sensor 14, and a plurality of PID controllers 42 (as many as the number of the cylinders of the cylinder group 4) for determining respective feedback correction coefficients #nKLAF for fuel injection quantities for the cylinders from the respective real air-fuel ratios #nA/F estimated by the observer 41 according to a PID control process so as to eliminate variations of the air-fuel ratios of the cylinders.

Briefly stated, the observer 41 estimates a real air-fuel ratio #nA/F of each of the cylinders as follows: A system from the engine 1 to the LAF sensor 14 (where the exhaust gases from the cylinders of the cylinder group 4 are combined) is considered to be a system for generating an air-fuel ratio detected by the LAF sensor 14 from a real air-fuel ratio #nA/F of each of the cylinders, and is modeled in view of a detection response delay of the LAF sensor 14 (e.g., a delay of first order) and a chronological contribution of the air-fuel ratio of each of the cylinders of the engine 1 to the air-fuel ratio detected by the LAF sensor 14. Based on the modeled system, a real air-fuel ratio #nA/F of each of the cylinders is estimated from the output signal KACT/B from the LAF sensor 14.

Details of the observer 41 are disclosed in Japanese laid-open patent publication No. 7-83094 or U.S. Pat. No. 5,531,208, for example, and will not be described below.

Each of the PID controllers 42 of the local feedback controller 36 divides the output signal KACT/B from the LAF sensor 14 by an average value of the feedback correction coefficients #nKLAF for all the cylinders of the cylinder group 4 determined by the respective PID controllers 42 in a preceding control cycle to produce a quotient value, and uses the quotient value as a target air-fuel ratio for the corresponding cylinder. Each of the PID controllers 42 then determines a feedback correction coefficient #nKLAF in a present control cycle so as to eliminate any difference between the target air-fuel ratio and the estimated value of the corresponding real air-fuel ratio #nA/F determined by the observer 41.

The local feedback controller 36 multiplies a value, which has been produced by multiplying the demand fuel injection quantity Tcyl by the feedback correction coefficient KFB produced by the general feedback controller 35, by the feedback correction coefficient #nKLAF for each of the cylinders of the cylinder group 4, thereby determining an output fuel injection quantity #nTout (n=1, 2, 3, 4) for each of the cylinders of the cylinder group 4.

The output fuel injection quantity #nTout thus determined for each of the cylinders is corrected for accumulated fuel particles on intake pipe walls of the engine 1 by a fuel accumulation corrector 43 in the feedback controller 34. The corrected output fuel injection quantity #nTout is applied, as a command for the fuel injection quantity for each of the cylinders of the cylinder group 4, to each of fuel injectors (not shown) of the engine 1, which injects fuel into each of the cylinders with the corrected output fuel injection quantity #nTout.

The correction of the output fuel injection quantity in view of accumulated fuel particles on intake pipe walls is disclosed in detail in Japanese laid-open patent publication No. 8-21273 and U.S. Pat. No. 5,568,799, for example, and will not be described in detail below.

The general feedback controller 35, particularly, the adaptive controller 38, will further be described below.

The general feedback controller 35 effects a feedback control process to converge the output KACT/B (detected air-fuel ratio of the cylinder group 4) from the LAF sensor 14 toward the target air-fuel ratio KCMD as described above. If such a feedback control process were carried out under the known PID control only, it would be difficult keep stable controllability against dynamic behavioral changes including changes in the operating conditions of the engine 1, characteristic changes due to aging of the engine 1, etc.

Figure 7:
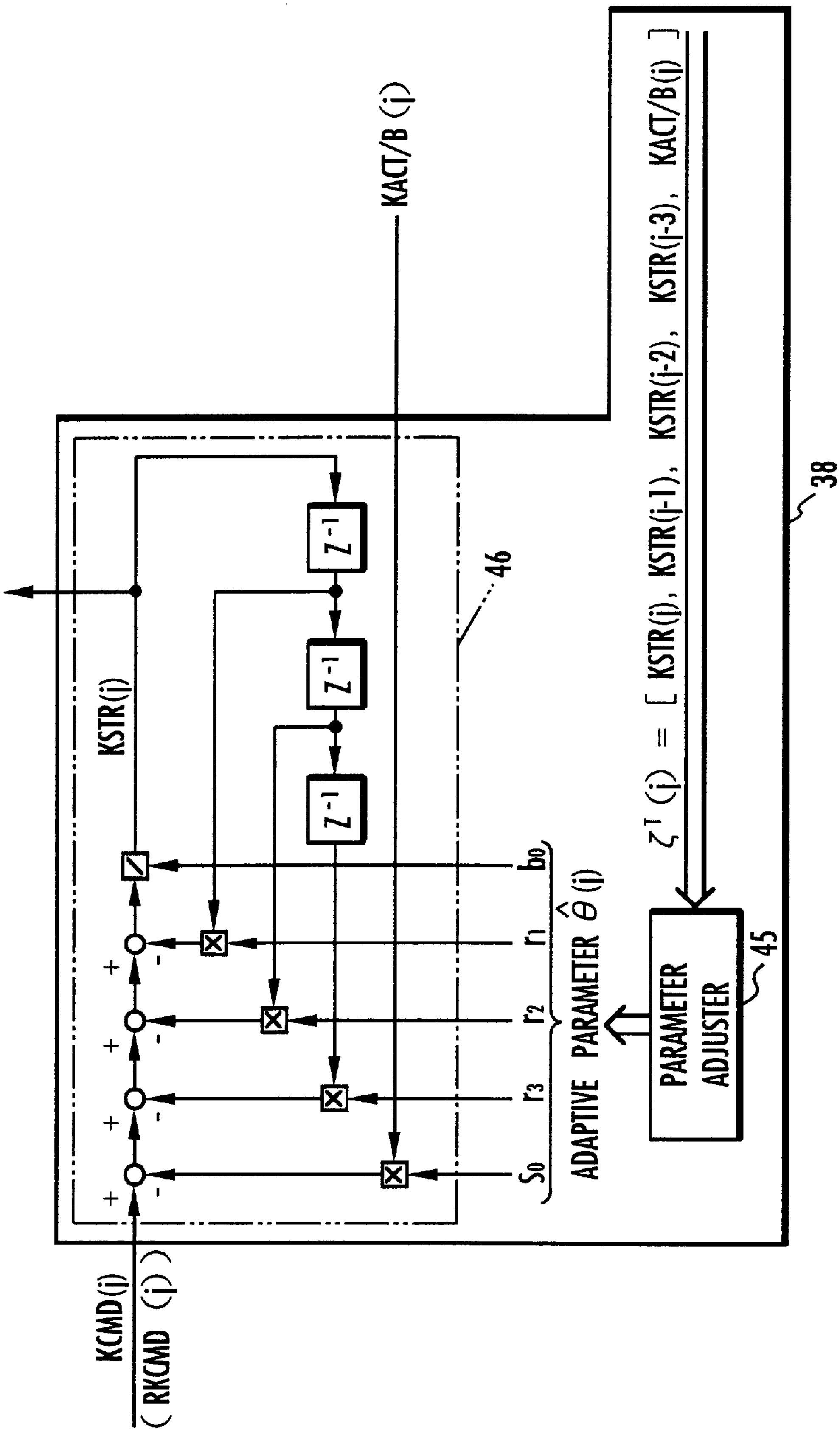
FIG. 7 is a block diagram of a basic arrangement of an adaptive controller of the fuel supply controller shown in FIG. 6.

The adaptive controller 38 is a recursive-type controller which makes it possible to carry out a feedback control process while compensating for dynamic behavioral changes of the engine 1. As shown in FIG. 7, the adaptive controller 31 comprises a parameter adjuster 45 for establishing a plurality of adaptive parameters using the parameter adjusting law proposed by I. D. Landau, et al., and a manipulated variable calculator 46 for calculating the feedback manipulated variable KSTR using the established adaptive parameters.

The parameter adjuster 45 will be described below. According to the parameter adjusting law proposed by I. D. Landau, et al., when polynomials of the denominator and the numerator of a transfer function $B(Z^{-1})/A(Z^{-1})$ of a discrete-system object to be controlled are generally expressed respectively by equations (31), (32), given below, an adaptive parameter θ hat (j) (j indicates the ordinal number of a control cycle) established by the parameter adjuster 45 is represented by a vector (transposed vector) according to the equation (33) given below. An input ζ(j) to the parameter adjuster 45 is expressed by the equation (34) given below. In the present embodiment, it is assumed that the cylinder group 4 of the engine 1, which is an object to be controlled by the general feedback controller 35, is considered to be a plant of a first-order system having a dead time $d_p$ corresponding to the time of three combustion cycles of the engine 1, and m=n=1, $d_p$=3 in the equations (31)–(34), and five adaptive parameters $s_0$, $r_1$, $r_2$, $r_3$, $b_0$ are established (see FIG. 7). In the upper and middle expressions of the equation (34), $u_s$, $y_s$, generally represent an input (manipulated variable) to the object to be controlled and an output (controlled variable) from the object to be controlled. In the present embodiment, the input is the feedback manipulated variable KSTR and the output from the object (the cylinder group 4 of the engine 1) is the output KACT/B (detected air-fuel ratio) from the LAF sensor 14, and the input ζ(j) to the parameter adjuster 45 is expressed by the lower expression of the equation (34) (see FIG. 7).

$$A(Z^1)=1+a1Z^{-1}+ \dots +anZ^{-n} \tag{31}$$

$$B(Z^1)=\mathbf{32}\ b0+b1Z^{-1}+ \dots +bmZ^{-m} \tag{32}$$

$$\begin{aligned}\hat{\theta}^T(j) &= [\hat{b}_0(j), \hat{B}_R(Z^{-1}, j), \hat{S}(Z^{-1}, j)] \\ &= [b_0(j), r_1(j), \cdots, r_{m+d_p-1}(j), s_o(j), \cdots, s_{n-1}(j)] \\ &= [b_0(j), r_1(j), r_2(j), r_3(j), s_o(j)]\end{aligned} \tag{33}$$

$$\begin{aligned}\zeta^T(j) &= [us(j), \cdots, us(j-m-dp+1), \\ &\quad ys(j), \cdots, ys(j-n+1)] \\ &= [us(j), us(j-1), us(j-2), us(j-3), ys(j)] \\ &= [KSTR(j), KSTR(j-1), KSTR(j-2), \\ &\quad KSTR(j-3), KACT/B(j)]\end{aligned} \tag{34}$$

The adaptive parameter θ hat expressed by the equation (33) is made up of a scalar quantity element $b_0$ hat$^{-1}$ (j) for determining the gain of the adaptive controller 38, a control element $B_R$ hat ($Z^{-1}$, j) expressed using a manipulated variable, and a control element S ($Z^{-1}$, j) expressed using a controlled variable, which are expressed respectively by the following equations (35)–(37) (see the block of the manipulated variable calculator 46 shown in FIG. 7):

$$\hat{b}_0(j) = \frac{1}{b_0} \tag{35}$$

$$\begin{aligned}\hat{B}_R(Z^{-1}, j) &= r_1Z^{-1} + r_2Z^{-2} + \cdots + r_{m+d_p-1}Z^{-(n+d_p-1)} \\ &= r_1Z^{-1} + r_2Z^{-2} + r_3Z^{-3}\end{aligned} \tag{36}$$

$$\begin{aligned}\hat{S}(Z^{-1}, j) &= s_0 + s_1Z^{-1} + \cdots + s_{n-1}Z^{-(n-1)} \\ &= s_0\end{aligned} \tag{37}$$

The parameter adjuster 45 establishes coefficients of the scalar quantity element and the control elements, described above, and supplies them as the adaptive parameter θ hat expressed by the equation (33) to the manipulated variable calculator 46. The parameter adjuster 45 calculates the adaptive parameter θ hat so that the output KACT/B from the LAF sensor 14 will agree with the target air-fuel ratio KCMD, using time-series data of the feedback manipulated variable KSTR from the present to the past and the output KACT/B from the LAF sensor 14.

Specifically, the parameter adjuster 45 calculates the adaptive parameter θ hat according to the following equation (38):

$$\hat{\theta}(j)=\hat{\theta}(j-1)+\Gamma(j-1)\cdot\zeta(j-d_p)\cdot e^*(j) \tag{38}$$

where Γ(j) represents a gain matrix (whose degree is indicated by $m+n+d_p$) for determining a rate of establishing the adaptive parameter θ hat, and e*(j) an estimated error of the adaptive parameter θ hat. Γ(j) and e*(j) are expressed respectively by the following recursive formulas (39), (40):

$$\Gamma(j) = \frac{1}{\lambda_1(j)} \cdot \left[\Gamma(j-1) - \frac{\lambda_2(j)\cdot\Gamma(j-1)\cdot\zeta(j-d_p)\cdot\zeta^T(j-d_p)\cdot\Gamma(j-1)}{\lambda_1(j)+\lambda_2(j)\cdot\zeta^T(j-d_p)\cdot\Gamma(j-1)\cdot\zeta(j-d_p)}\right] \tag{39}$$

where $0<\lambda_1(j)\leqq 1$, $0\leqq\lambda_2(j)<2$, $\Gamma(0)>0$.

$$e^*(j) = \frac{D(Z^{-1})\cdot KACT/B(j) - \hat{\theta}^T(j-1)\cdot\zeta(j-d_p)}{1+\zeta^T(j-d_p)\cdot\Gamma(j-1)\cdot\zeta(j-d_p)} \tag{40}$$

where $D(Z^{-1})$ represents an asymptotically stable polynomial for adjusting the convergence. In the present embodiment, $D(Z^{-1})=1$.

Various specific algorithms including the degressive gain algorithm, the variable gain algorithm, the fixed trace algorithm, and the fixed gain algorithm are obtained depending on how $\lambda_1(j)$, $\lambda_2(j)$ in the equation (39) are selected. For a time-dependent plant such as a fuel injection process, an air-fuel ratio, or the like of the engine 1, either one of the degressive gain algorithm, the variable gain algorithm, the fixed gain algorithm, and the fixed trace algorithm is suitable.

Using the adaptive parameter θ hat ($s_0$, $r_1$, $r_2$, $r_3$, $b_0$) established by the parameter adjuster 45 and the target air-fuel ratio KCMD, the manipulated variable calculator 46 determines the feedback manipulated variable KSTR according to a recursive formula expressed by the following equation (41):

$$KSTR = \frac{KCMD(j) - s_0\cdot KACT/B(j) - r_t\cdot KSTR(j-1) - r_2\cdot KSTR(j-2) - r_3\cdot KSTR(j-3)}{b_0} \tag{41}$$

The manipulated variable calculator 46 shown in FIG. 7 represents a block diagram of the calculations according to the equation (41).

The feedback manipulated variable KSTR determined according to the equation (41) becomes the target air-fuel ratio KCMD insofar as the output KACT/B of the LAF sensor 14 agrees with the target air-fuel ratio KCMD. Therefore, the feedback manipulated variable KSTR is divided by the target air-fuel ratio KCMD by the divider 39 for thereby determining the feedback manipulated variable kstr that can be used as the feedback correction coefficient KFB.

As is apparent from the foregoing description, the adaptive controller 38 thus constructed is a recursive-type controller taking into account dynamic behavioral changes of the engine 1 which is an object to be controlled. Stated otherwise, the adaptive controller 38 is a controller described in a recursive form to compensate for dynamic behavioral changes of the engine 1, and more particularly a controller having a recursive-type adaptive parameter adjusting mechanism.

A recursive-type controller of this type may be constructed using an optimum regulator. In such a case, however, it generally has no parameter adjusting mechanism. The adaptive controller 38 constructed as described above is suitable for compensating for dynamic behavioral changes of the engine 1.

The details of the adaptive controller 38 have been described above.

The PID controller 37, which is provided together with the adaptive controller 38 in the general feedback controller

35, calculates a proportional term (P term), an integral term (I term), and a derivative term (D term) from the difference between the output KACT/B of the LAF sensor 14 and the target air-fuel ratio KCMD, and calculates the total of those terms as the feedback manipulated variable KLAF, as is the case with the general PID control process. In the present embodiment, the feedback manipulated variable KLAF is set to "1" when the output KACT/B of the LAF sensor 14 agrees with the target air-fuel ratio KCMD by setting an initial value of the integral term (I term) to "1", so that the feedback manipulated variable KLAF can be used as the feedback correction coefficient KFB for directly correcting the fuel injection quantity. The gains of the proportional term, the integral term, and the derivative term are determined from the rotational speed and intake pressure of the engine 1 using a predetermined map.

The switcher 40 of the general feedback controller 35 outputs the feedback manipulated variable KLAF determined by the PID controller 37 as the feedback correction coefficient KFB for correcting the fuel injection quantity if the combustion in the engine 1 tends to be unstable as when the temperature of the coolant of the engine 1 is low, the engine 1 rotates at high speeds, or the intake pressure is low, or if the output KACT/B of the LAF sensor 14 is not reliable due to a response delay of the LAF sensor 14 as when the target air-fuel ratio KCMD changes largely or immediately after the air-fuel ratio feedback control process has started, or if the engine 1 operates highly stably as when it is idling and hence no high-gain control process by the adaptive controller 38 is required. Otherwise, the switcher 40 outputs the feedback manipulated variable kstr which is produced by dividing the feedback manipulated variable KSTR determined by the adaptive controller 38 by the target air-fuel ration KCMD, as the feedback correction coefficient KFB for correcting the fuel injection quantity. This is because the adaptive controller 38 effects a high-gain control process and functions to converge the output KACT/B of the LAF sensor 14 quickly toward the target air-fuel ratio KCMD, and if the feedback manipulated variable KSTR determined by the adaptive controller 38 is used when the combustion in the engine 1 is unstable or the output KACT/B of the LAF sensor 14 is not reliable, then the air-fuel ratio control process tends to be unstable.

Such operation of the switcher 40 is disclosed in detail in Japanese laid-open patent publication No. 8-105345 or U.S. Pat. No. 5,558,075, and will not be described in detail below.

The above arrangement and functions of the feedback controller 34 associated with the cylinder group 4 are identical to those of the feedback controller 33 associated with the cylinder group 3. The feedback controller 33 associated with the cylinder group 3 carries out exactly the same operating process as that of the feedback controller 34 described above, using the output KACT/A of the LAF sensor 13 associated with the cylinder group 3, for thereby controlling the air-fuel ratio of each of the cylinders of the cylinder group 3.

In the above description of the fuel supply controller 16, the target air-fuel ratio KCMD generated by the exhaust system controller 15 at all times is used for controlling the air-fuel ratio of each of the cylinder groups 3, 4. Specifically, the second correction coefficient calculator 32 and the general feedback controller 35 of each of the feedback controllers 33, 34 use the target air-fuel ratio KCMD generated by the exhaust system controller 15 for performing their processing. However, the second correction coefficient calculator 32 and the general feedback controller 35 may use a target air-fuel ratio determined separately from the target air-fuel ratio KCMD sequentially generated by the exhaust system controller 15 for controlling the air-fuel ratio in the cylinder groups 3, 4 under certain operating conditions, described later on, of the engine 1, specifically, when the supply of fuel to the engine 1 is cut off or the throttle valve is fully opened. In such a case, the target air-fuel ratio KCMD used in the above control process is forcibly set to the separately determined target air-fuel ratio to control the air-fuel ratio in the cylinder groups 3, 4. Thus, the target air-fuel ratio KCMD used by the second correction coefficient calculator 32 and the general feedback controller 35 for their processing is actually the actually used target air-fuel ratio RKCMD (usually, RKCMD=KCMD).

Operation of the entire system according to the present embodiment will be described below.

First, a control process carried out by the fuel supply controller 16 will be described below with reference to FIGS. 8 and 9.

The fuel supply controller 16 performs the control process in control cycles in synchronism with a crankshaft angle period (TDC) of the engine 1 as follows:

The fuel supply controller 16 reads outputs from various sensors including sensors for detecting the rotational speed NE and intake pressure PB of the engine 1, the $O_2$ sensor 12, the LAF sensors 13, 14 in STEPa.

At this time, the output VO2/OUT of the $O_2$ sensor 12 which is required by the processing carried out by the exhaust system controller 15, and the outputs KACT/A, KACT/B of the LAF sensors 13, 14 are given via the fuel supply controller 16 to the exhaust system controller 15. Therefore, the read data including the VO2/OUT, KACT/A, KACT/B, including data obtained in past control cycles, are stored in a time-series fashion in a memory (not shown).

Then, the basic fuel injection quantity calculator 30 corrects a fuel injection quantity corresponding to the rotational speed NE and intake pressure PB of the engine 1 depending on the effective opening area of the throttle valve, thereby calculating a basic fuel injection quantity Tim in STEPb. The first correction coefficient calculator 31 calculates a first correction coefficient KTOTAL depending on the coolant temperature and the amount by which the canister is purged in STEPc.

The fuel supply controller 16 decides whether the target air-fuel ratio KCMD generated by the exhaust system controller 15 is to be used or not, i.e., determines ON/OFF of an air-fuel ratio manipulating process, in order to actually manipulate the air-fuel ratio in the cylinder groups 3, 4 of the engine 1, and sets a value of a flag f/prism/on which represents ON/OFF of the air-fuel ratio manipulating process in STEPd. When the value of the flag f/prism/on is "0", it means that the target air-fuel ratio KCMD generated by the exhaust system controller 15 is not to be used (OFF), and when the value of the flag f/prism/on is "1", it means that the target air-fuel ratio KCMD generated by the exhaust system controller 15 is to be used (ON)

Figure 9:
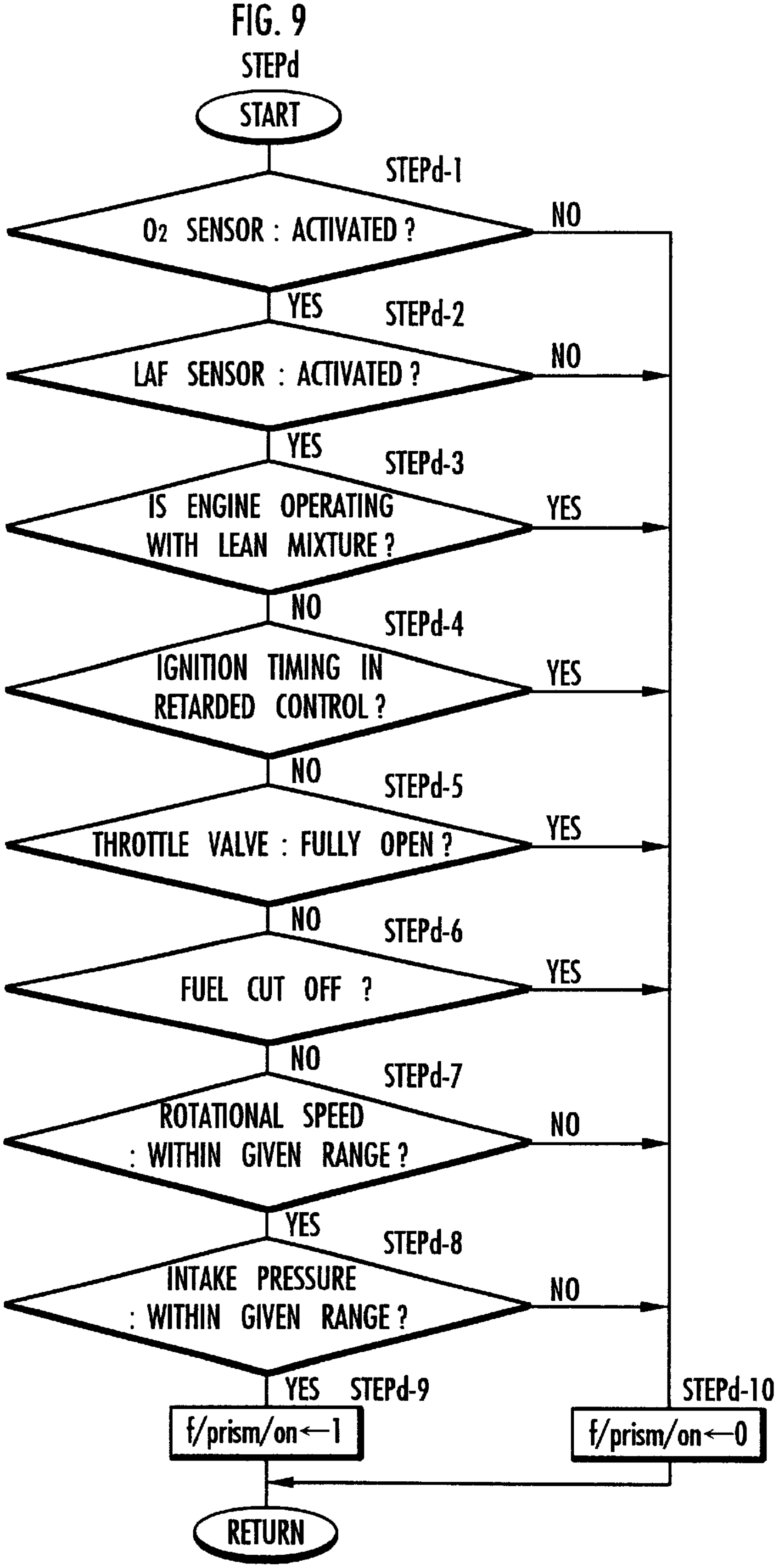
FIG. 9 is a flowchart of a subroutine of the processing sequence shown in FIG. 8.

The deciding subroutine of STEPd is shown in detail in FIG. 9. As shown in FIG. 9, the fuel supply controller 16 decides whether the $O_2$ sensor 12 is activated or not in STEPd-1 and both the LAF sensors 13, 14 are activated or not in STEPd-2. The fuel supply controller 16 decides whether the $O_2$ sensor 12 is activated or not based on the output voltage of the $O_2$ sensor 12, for example, and decides whether the LAF sensors 13, 14 are activated or not based on the resistance of a sensor device thereof.

If neither one of the $O_2$ sensor 12 and the LAF sensors 13, 14 is activated, since detected data from the $O_2$ sensor 12 or the LAF sensors 13, 14 for use by the fuel supply controller

16 is not accurate enough, the value of the flag f/prism/on is set to "0" in STEPd-10.

Then, the fuel supply controller 16 decides whether the engine 1 is operating with a lean air-fuel mixture or not in STEPd-3. The fuel supply controller 16 decides whether the ignition timing of the engine 1 is retarded for early activation of the catalytic converters 9, 10, 11 immediately after the start of the engine 1 or not in STEPd-4. The fuel supply controller 16 decides whether the throttle valve of the engine 1 is fully open or not in STEPd-5. The fuel supply controller 16 decides whether the supply of fuel to the engine 1 is being stopped or not in STEPd-6. If either one of the conditions of these steps is satisfied, then since it is not preferable or possible to manipulate the air-fuel ratio of the engine 1 using the target air-fuel ratio KCMD generated by the exhaust system controller 15, the value of the flag f/prism/on is set to "0" in STEPd-10.

The fuel supply controller 16 then decides whether the rotational speed NE and the intake pressure PB of the engine 1 fall within respective given ranges or not respectively in STEPd-7, STEPd-8. If either one of the rotational speed NE and the intake pressure PB does not fall within its given range, then since it is not preferable or possible to manipulate the air-fuel ratio of the engine 1 using the target air-fuel ratio KCMD generated by the exhaust system controller 15, the value of the flag f/prism/on is set to "0" in STEPd-10.

If the conditions of STEPd-1, STEPd-2, STEPd-7, STEPd-8 are satisfied, and the conditions of STEPd-3, STEPd-4, STEPd-5, STEPd-6 are not satisfied (the engine 1 is in normal operation in these cases), then the value of the flag f/prism/on is set to "1" to use the target air-fuel ratio KCMD generated by the exhaust system controller 15 for manipulating the air-fuel ratio of the engine 1 in STEPd-9.

Figure 8:
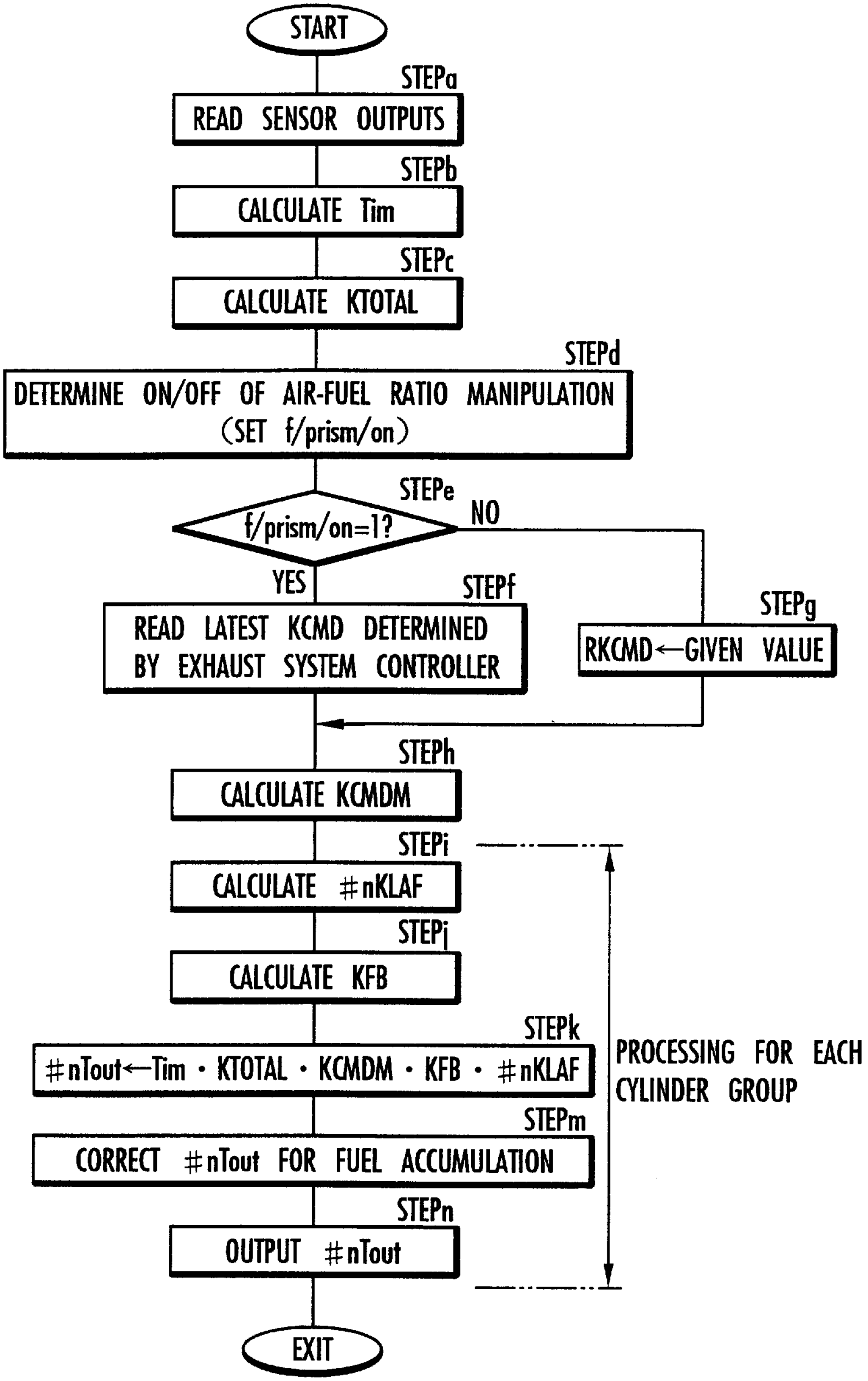
FIG. 8 is a flowchart of a processing sequence of the fuel supply controller of the air-fuel ratio control apparatus shown in FIG. 1.

In FIG. 8, after the value of the flag f/prism/on has been set as described above, the fuel supply controller 16 determines the value of the flag f/prism/on in STEPe. If f/prism/on=1, then the fuel supply controller 16 reads the latest target air-fuel ratio KCMD generated by the exhaust system controller 15 as the actually used target air-fuel ratio RKCMD in the present control cycle in STEPf. If f/prism/on=0, then the fuel supply controller 16 sets a value determined from the rotational speed NE and intake pressure PB of the engine 1 using a predetermined map, for example, as the actually used target air-fuel ratio RKCMD in the present control cycle in STEPg.

The value of the actually used target air-fuel ratio RKCMD determined by the fuel supply controller 16 in the processing in STEPe–STEPg is stored in a time-series fashion in a memory (not shown) in the fuel supply controller 16.

The second correction coefficient calculator 32 calculates in STEPh a second correction coefficient KCMDM depending on the actually used target air-fuel ratio RKCMD determined in STEPf or STEPg.

Then, the feedback controllers 33, 34 perform the processing in STEPi–STEPn for each of the cylinder groups 3, 4.

For the cylinder group 4, for example, in the local feedback controller 36 of the feedback controller 34, the PID controllers 35 calculate respective feedback correction coefficients #nKLAF in order to eliminate variations in the air-fuel ratio between the cylinders, based on actual air-fuel ratios #nA/F of the respective cylinders of the cylinder group 4 which have been estimated from the output KACT/B of the LAF sensor 14 by the observer 41, in STEPi. Then, the general feedback controller 35 calculates a feedback correction coefficient KFB in STEPj.

Depending on the operating conditions of the engine 1, the switcher 40 selects either the feedback manipulated variable KLAF determined by the PID controller 37 or the feedback manipulated variable kstr which has been produced by dividing the feedback manipulated variable KSTR determined by the adaptive controller 38 by the actually used target air-fuel ratio RKCMD (normally, the switcher 40 selects the feedback manipulated variable kstr). The switcher 40 then outputs the selected feedback manipulated variable KLAF or kstr as a feedback correction coefficient KFB for correcting the fuel injection quantity.

When switching the feedback correction coefficient KFB from the feedback manipulated variable KLAF from the PID controller 37 to the feedback manipulated variable kstr from the adaptive controller 38, the adaptive controller 38 determines a feedback manipulated variable KSTR in a manner to hold the correction coefficient KFB to the preceding correction coefficient KFB (=KLAF) as long as in the cycle time for the switching in order to avoid an abrupt change in the correction coefficient KFB. When switching the feedback correction coefficient KFB from the feedback manipulated variable kstr from the adaptive controller 38 to the feedback manipulated variable KLAF from the PID control controller 37, the PID controller 37 calculates a present correction coefficient KLAF in a manner to regard the feedback manipulated variable KLAF determined by itself in the preceding cycle time as the preceding correction coefficient KFB (=kstr).

Then, the feedback controller 34 multiplies the basic fuel injection quantity Tim, determined as described above, by the first correction coefficient KTOTAL, the second correction coefficient KCMDM, the feedback correction coefficient KFB, and the feedback correction coefficients #nKLAF of the respective cylinders, determining output fuel injection quantities #nTout of the respective cylinders of the cylinder group 4 in STEPk. The output fuel injection quantities #nTout are then corrected for accumulated fuel particles on intake pipe walls of the engine 1 by the fuel accumulation correctors 43 in STEPm. The corrected output fuel injection quantities #nTout are applied to the non-illustrated fuel injectors of the engine 1 in STEPn.

The processing in STEPi–STEPn is also performed for the cylinder group 3 by the feedback controller 33 associated with the cylinder group 3.

In the engine 1, the fuel injectors inject fuel into the respective cylinders of the cylinder groups 3, 4 according to the respective output fuel injection quantities #nTout.

The above control of the fuel injection of the engine 1 is carried out in successive cycles synchronous with the crankshaft angle period (TDC) of the engine 1 for controlling the air-fuel ratio of the air-fuel mixture combusted in the cylinder groups 3, 4 in order to converge the outputs KACT/A, KACT/B of the LAF sensors 13, 14 toward the actually used target air-fuel ratio RKCMD, which usually is equal to the target air-fuel ratio KCMD generated by the exhaust system controller 15. While the feedback manipulated variable kstr from the adaptive controller 38 is being used as the feedback correction coefficient KFB, the output KACT/A, KACT/B of the LAF sensors 13, 14 are quickly converged toward the actually used target air-fuel ratio RKCMD with high stability against behavioral changes such as changes in the operating conditions of the engine 1 or characteristic changes thereof. A response delay of the engine 1 is also appropriately compensated for.

Figure 10:
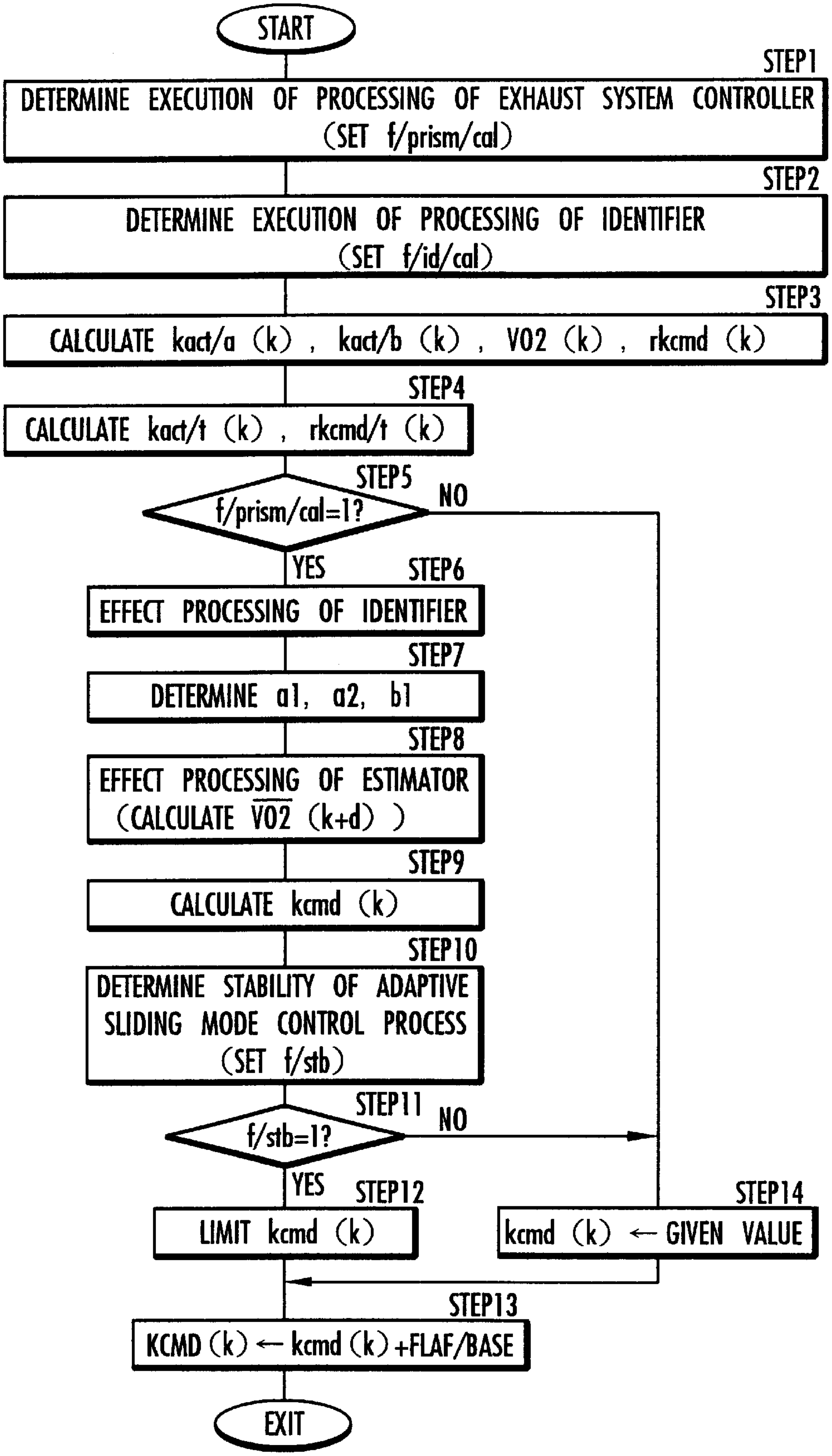
FIG. 10 is a flowchart of a processing sequence of the exhaust system controller of the air-fuel ratio control apparatus shown in FIG. 1.

Concurrent with the above air-fuel ratio manipulation for the engine 1, i.e., the above control of the fuel injection quantity, the exhaust system controller 15 executes a main routine shown in FIG. 10 in control cycles of a constant period.

As shown in FIG. 10, the exhaust system controller 15 decides whether its own processing (the processing of the identifier 23, the estimator 24, and the sliding mode controller 25) is to be executed or not, and sets a value of a flag f/prism/cal indicative of whether the processing is to be executed or not in STEP1. When the value of the flag f/prism/cal is "0", it means that the processing of the exhaust system controller 15 is not to be executed, and when the value of the flag f/prism/cal is "1", it means that the processing of the exhaust system controller 15 is to be executed.

Figure 11:
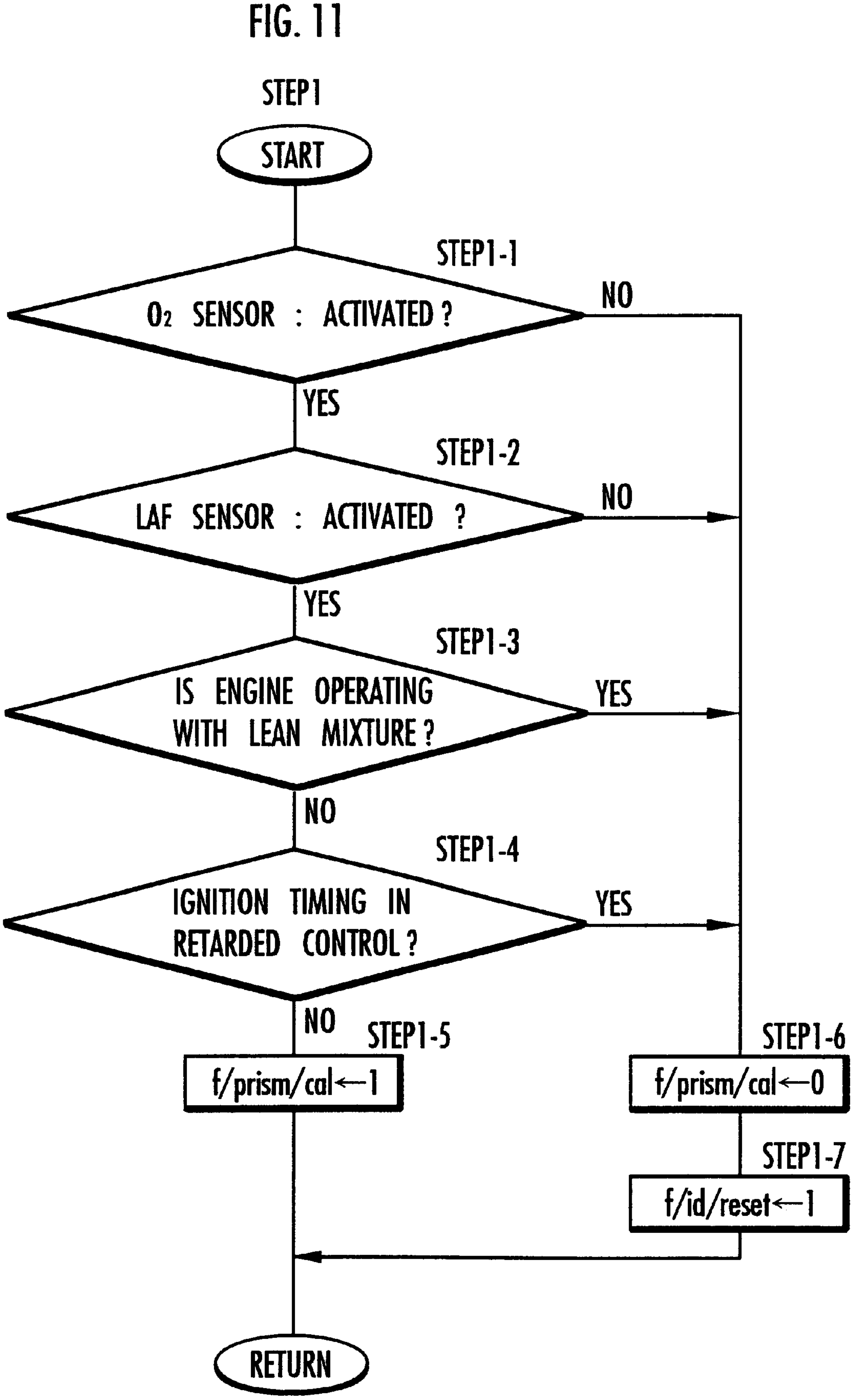
FIG. 11 is a flowchart of a subroutine of the processing sequence shown in FIG. 10.

The deciding subroutine in STEP1 is shown in detail in FIG. 11. As shown in FIG. 11, the exhaust system controller 15 decides whether the $O_2$ sensor 12 is activated or not in STEP1-1 and whether the LAF sensors 13, 14 are activated or not in STEP1-2. If neither one of the $O_2$ sensor 12 and the LAF sensors 13, 14 is activated, since detected data from the $O_2$ sensor 12 and the LAF sensors 13, 14 for use by the exhaust system controller 15 are not accurate enough, the value of the flag f/prism/cal is set to "0" in STEP1-6.

Then, in order to initialize the identifier 23 as described later on, the value of a flag f/id/reset indicative of whether the identifier 23 is to be initialized or not is set to "1" in STEP1-7. When the value of the flag f/id/reset is "1", it means that the identifier 23 is to be initialized, and when the value of the flag f/id/reset is "0", it means that the identifier 23 is not to be initialized.

The exhaust system controller 15 decides whether the engine 1 is operating with a lean air-fuel mixture or not in STEP1-3. The exhaust system controller 15 decides whether the ignition timing of the engine 1 is retarded for early activation of the catalytic converters 9, 10, 11 immediately after the start of the engine 1 or not in STEP1-4. If the conditions of these steps are satisfied, then since the target air-fuel ratio KCMD calculated to convert the output VO2/OUT of the $O_2$ sensor 12 to the target value VO2/TARGET is not used for the fuel control for the engine 1, the value of the flag f/prism/cal is set to "0" in STEP1-6, and the value of the flag f/id/reset is set to "1" in order to initialize the identifier 23 in STEP1-7.

If the conditions of STEP1-1, STEP1-2 are satisfied and the conditions of STEP1-3, STEP1-4 are not satisfied, then the value of the flag f/prism/cal is set to "1" in STEP1-5.

By thus setting the flag f/prism/cal, even in a situation where the target air-fuel ratio KCMD generated by the exhaust system controller 15 is not used by the fuel supply controller 16 (see FIG. 9), when the supply of fuel to the engine 1 is being cut off or when the throttle valve is being fully open, the flag f/prism/cal is set to "1". When the supply of fuel to the engine 1 is being cut off or when the throttle valve is being fully open, therefore, the exhaust system controller 15 performs the operating processes of the identifier 23, the estimator 24, and the sliding mode controller 25, or specifically performs the process of determining the target combined differential air-fuel ratio kcmd/t in order to converge the output VO/OUT of the $O_2$ sensor 12 to the target value VO2/TARGET. This is because such an operating situation of the engine 1 is basically temporary.

In FIG. 10, after the above deciding subroutine, the exhaust system controller 15 decides whether a process of identifying (updating) the gain coefficients a1, a2, b1 with the identifier 23 is to be executed or not, and sets a value of a flag f/id/cal indicative of whether the process of identifying (updating) the gain coefficients a1, a2, b1 is to be executed or not in STEP2. When the value of the flag f/id/cal is "0", it means that the process of identifying (updating) the gain coefficients a1, a2, b1 is not to be executed, and when the value of the flag f/id/cal is "1", it means that the process of identifying (updating) the gain coefficients a1, a2, b1 is to be executed.

The deciding subroutine of STEP2 is carried out as follows: The exhaust system controller 15 decides whether the throttle valve of the engine 1 is fully open or not, and also decides whether the supply of fuel to the internal combustion engine 1 is being stopped or not. If either one of these conditions is satisfied, then since it is impossible to identify the gain coefficients a1, a2, b1 appropriately, the value of the flag f/id/cal is set to "0". If neither one of these conditions is satisfied, then the value of the flag f/id/cal is set to "1" to identify (update) the gain coefficients a1, a2, b1 with the identifier 23.

The exhaust system controller 15 calculates the latest differential output kact/a(k) (=KACT/A−FLAF/BASE) of the LAF sensor 13, the latest differential output kact/b(k) (=KACT/B−FLAF/BASE) of the LAF sensor 14, and the latest differential output VO2(k) (=VO2/OUT−FLAF/BASE) of the $O_2$ sensor 12 respectively with the subtractors 19, 20, 22 in STEP3.

Specifically, the subtractors 19, 20, 22 select latest ones of the time-series data of the outputs KACT/A, KACT/B of the LAF sensors 13, 14 and the output of VO2/OUT of the $O_2$ sensor 12 which have been read by the fuel supply controller 16 and stored in the non-illustrated memory in STEPa shown in FIG. 8, and calculate the differential outputs kact/a(k), kact/b(k), VO2(k).

In STEP3, the subtractor 28 calculates the actually used target differential air-fuel ratio rkcmd(k) (=RKCMD−FLAF/BASE) corresponding to the actually used target air-fuel ratio RKCMD that is presently used by the fuel supply controller 16 for controlling the air-fuel ratio in each of the cylinder groups 3, 4.

Specifically, the subtractor 28 selects a latest one of the time-series data of the actually used target air-fuel ratio RKCMD which is stored in the non-illustrated memory in each control cycle by the fuel supply controller 16, and calculates the actually used target differential air-fuel ratio rkcmd. The actually used target air-fuel ratio RKCMD which is presently used by the fuel supply controller 16 corresponds to the target air-fuel ratio KCMD(k−1) determined in the preceding control cycle by the exhaust system controller 15, and is usually equal to the target air-fuel ratio KCMD(k−1).

The differential outputs kact/a, kact/b, VO2, and the actually used target differential air-fuel ratio rkcmd that are calculated in STEP3 are stored, together with those calculated in the past, in a time-series manner in the non-illustrated memory in the exhaust system controller 15.

Then, in STEP4, the first filter 21 calculates the combined differential air-fuel ratio kact/t(k) in the present control cycle.

Specifically, the first filter 21 selects time-series data kact/a(k−dD), kact/a(k−dD−1) of the past values of the differential output kact/a and time-series data kact/b(k), kact/b(k−1) of the present and past values of the differential output kact/b, from the time-series data of the differential outputs kact/a, kact/b of the LAF sensors 13, 14 thus stored, and calculates the right side of the equation (3) using those selected data for thereby calculating the combined differential air-fuel ratio kact/t(k).

In STEP4, the second filter 29 calculates the actually used combined differential air-fuel ratio rkcmd/t(k) in the present control cycle.

Specifically, the second filter 29 selects time-series data rkcmd(k), rkcmd(k−1), rkcmd(k−dD), rkcmd(k−dD−1) of the present and past values of the actually used combined differential air-fuel ratio rkcmd, from the time-series data of the actually used combined differential air-fuel ratio rkcmd thus stored, and calculates the right side of the equation (9) using those selected data for thereby calculating the actually used target combined differential air-fuel ratio rkcmd/t (k).

The combined differential air-fuel ratio kact/t and the actually used target combined differential air-fuel ratio rkcmd which are calculated in STEP4 are stored, together with those calculated in the past, in a time-series manner in the non-illustrated manner in the exhaust system controller 15.

Then, in STEP5, the exhaust system controller 15 determines the value of the flag f/prism/cal set in STEP1. If f/prism/cal=0, i.e., if the processing of the exhaust system controller 15 is not to be executed, then the exhaust system controller 15 forcibly sets the target differential air-fuel ratio kcmd(k) in the present control cycle to a predetermined value in STEP14. The predetermined value may be a predetermined fixed value (e.g., "0") or a value kcmd(k−1) of the target differential air-fuel ratio kcmd determined in the preceding control cycle, for example.

After the target differential air-fuel ratio kcmd(k) is set to the predetermined value, the adder 27 adds the reference air-fuel ratio FLAF/BASE to the target differential air-fuel ratio kcmd(k) of the predetermined value, thus determining the target air-fuel ratio KCMD(k) in the present control cycle in STEP13. Thereafter, the processing in the present control cycle is finished.

If f/prism/cal=1 in STEP5, i.e., if the processing of the exhaust system controller 15 is to be executed, then the exhaust system controller 15 effects the processing of the identifier 23 in STEP6.

Figure 12:
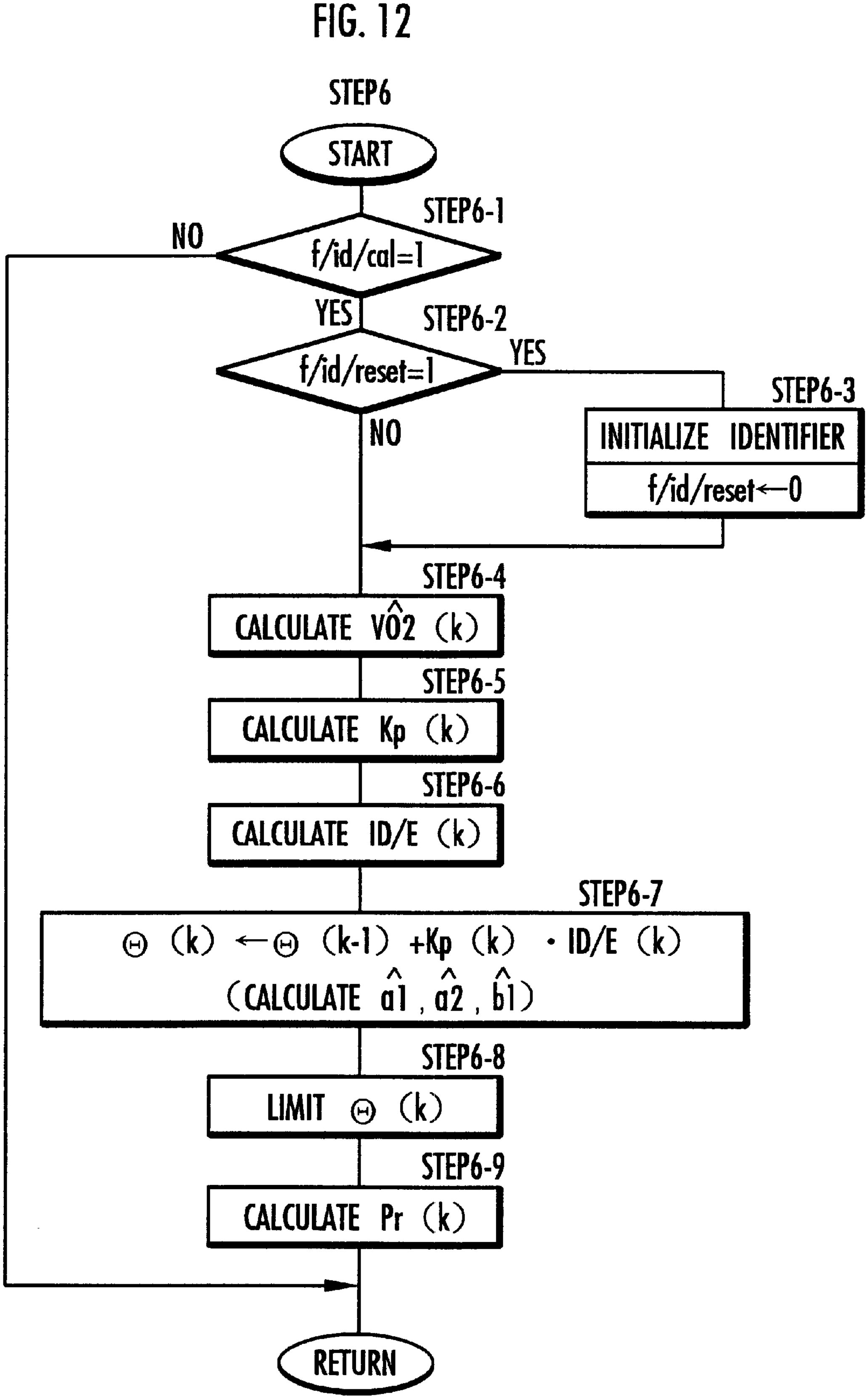
FIG. 12 is a flowchart of another subroutine of the processing sequence shown in FIG. 10.

The processing of the identifier 23 is shown in detail in FIG. 12.

The identifier 23 determines the value of the flag f/id/cal set in STEP2 in STEP6-1. If the value of the flag f/id/cal is "0", i.e., if the throttle valve of the engine 1 is fully open or the supply of fuel to the internal combustion engine 1 is being stopped, then since the process of identifying the gain coefficients a1, a2, b1 with the identifier 23 is not carried out, control immediately goes back to the main routine shown in FIG. 10.

If the value of the flag f/id/cal is "1", then the identifier 23 determines the value of the flag f/id/reset set in STEP1 with respect to the initialization of the identifier 23 in STEP6-2. If the value of the flag f/id/reset is "1", the identifier 23 is initialized in STEP6-3. When the identifier 23 is initialized, the identified gain coefficients a1 hat, a2 hat, b1 hat are set to predetermined initial values (the identified gain coefficient vector Θ is initialized), and the elements of the matrix P (diagonal matrix) according to the equation (14) are set to predetermined initial values. The value of the flag f/id/reset is reset to "0".

Then, the identifier 23 calculates the identified differential output VO2(k) hat from the model of the equivalent exhaust system 18 (see the equation (10)) which is expressed using the present identified gain coefficients a1(k−1) hat, a2(k−1) hat, b1(k−1) hat (the identified gain coefficients determined in the preceding control cycle) in STEP6-4. Specifically, the identifier 23 calculates the identified differential output VO2(k) hat according to the equation (10), using the past data VO2(k−1), VO2(k−2) of the differential output VO2 which are calculated in each control cycle in STEP3, the past data kact/t(k−d1−1) of the combined differential air-fuel ratio kact/t which are calculated in each control cycle in STEP4, and the identified gain coefficients a1(k−1) hat, a2(k−1) hat, b1(k−1) hat.

The identifier 23 then calculates the vector Kp(k) to be used in determining the new identified gain coefficients a1 hat, a2 hat, b1 hat according to the equation (13) in STEP6-5. Thereafter, the identifier 23 calculates the identified error ID/E(k) (see the equation (11)), in STEP6-6.

The identified error ID/E(k) obtained in STEP6-6 may basically be calculated according to the equation (11). In the present embodiment, however, a value (=VO2−VO2 hat) calculated according to the equation (11) from the differential output VO2 calculated in each control cycle in STEP3 (see FIG. 10), and the identified differential output VO2 hat calculated in each control cycle in STEP6-4 is filtered with predetermined frequency-pass characteristics (specifically, low-pass characteristics) to calculate the identified error ID/E(k).

The above filtering is carried out for the following reasons: The frequency characteristics of changes in the output VO2/OUT of the $O_2$ sensor 12 which is the output quantity from the equivalent exhaust system 18 with respect to changes in the combined air-fuel ratio KACT/T which is the input quantity to the equivalent exhaust system 18 are generally of a high gain at low frequencies because of the effect of the catalytic converters 9, 10, 11 included in the object exhaust system 17 as a basis of the equivalent exhaust system 18 in particular.

Therefore, it is preferable to attach importance to the low-frequency behavior of the equivalent exhaust system 18 in appropriately identifying the gain coefficients a1, a2, b1 of the model of the equivalent exhaust system 18 depending on the actual behavior of the equivalent exhaust system 18 at low frequencies. According to the present embodiment, therefore, the identified error ID/E(k) is determined by filtering the value (=VO2−VO2 hat) obtained according to the equation (11) with low-pass characteristics.

Both the differential output VO2 and the identified differential output VO2 hat may be filtered with the same frequency-pass characteristics. For example, after the differential output VO2 and the identified differential output VO2 hat have separately been filtered, the equation (11) may be calculated to determine the identified error ID/E(k). The above filtering is carried out by a moving average process which is a digital filtering process.

After the identifier 23 has determined the identified error ID/E(k), the identifier 23 calculates a new identified gain coefficient vector Θ(k), i.e., new identified gain coefficients a1(k) hat, a2(k) hat, b1(k) hat, according to the equation (12) using the identified error ID/E(k) and Kp(k) calculated in SETP5-5 in STEP6-7.

After having calculated the new identified gain coefficients a1(k) hat, a2(k) hat, b1(k) hat, the identifier 23 limits the values of the gain coefficients a1 hat, a2 hat, b1 hat to meet predetermined conditions in STEP6-8. The identifier 23 updates the matrix P(k) according to the equation (14) for the processing of a next control cycle in STEP6-9, after which control returns to the main routine shown in FIG. 10.

The process of limiting the identified gain coefficients a1 hat, a2 hat, b1 hat in STEP6-8 comprises a process of limiting the combination of the values of the identified gain coefficients a1 hat, a2 hat, b1 hat to a certain combination, i.e., a process of limiting a point (a1 hat, a2 hat) to a predetermined region on a coordinate plane having a1 hat, a2 hat as components thereof, and a process of limiting the value of the identified gain coefficient b1 hat to a predetermined range. According to the former process, if the point (a1(k) hat, a2(k) hat) on the coordinate plate determined by the identified gain coefficients a1(k) hat, a2(k) hat calculated in STEP6-7 deviates from the predetermined region on the coordinate plane, then the values of the identified gain coefficients a1(k) hat, a2(k) hat are forcibly limited to the values of a point in the predetermined region. According to the latter process, if the value of the identified gain coefficient b1 hat calculated in STEP6-7 exceeds the upper or lower limit of the predetermined range, then the value of the identified gain coefficient b1 hat is forcibly limited to the upper or lower limit of the predetermined range.

The above process of limiting the identified gain coefficients a1 hat, a2 hat, b1 hat serves to keep stable the target combined differential output kcmd/t generated by the sliding mode controller 25.

Specific details of the process of limiting the identified gain coefficients a1 hat, a2 hat, b1 hat are disclosed in Japanese laid-open patent publication No. 11-153051 or U.S. patent application Ser. No. 09/153300, and hence will not be described below.

The processing subroutine of STEP6 in FIG. 10 for the identifier 23 has been described above.

In FIG. 10, after the processing of the identifier 23 has been carried out, the exhaust system controller 15 determines the gain coefficients a1, a2, b1 in STEP7.

More specifically, if the value of the flag f/id/cal established in STEP2 is "1", i.e., if the gain coefficients a1, a2, b1 have been identified by the identifier 023, then the gain coefficients a1, a2, b1 are set to the respective identified gain coefficients a1(k) hat, a2(k) hat, b1(k) hat (limited in STEP6-8) determined by the identifier 23 in STEP6. If f/id/cal=0, i.e., if the gain coefficients a1, a2, b1 have not been identified by the identifier 23, then the gain coefficients a1, a2, b1 are set to respective predetermined values. The predetermined values to which the gain coefficients a1, a2, b1 are to be set if f/id/cal=0, i.e., if the throttle valve of the internal combustion engine 1 is fully open or if the supply of fuel to the internal combustion engine 1 is being stopped, may be predetermined fixed values. However, if the condition in which f/id/cal=0 is temporary, i.e., if the identifying process carried out by the identifier 23 is temporarily interrupted, then the gain coefficients a1, a2, b1 may be set to the identified gain coefficients a1 hat, a2 hat, b1 hat determined by the identifier 23 immediately before the flag f/id/cal becomes 0.

Then, the exhaust system controller 15 effects a processing operation of the estimator 24 in the main routine shown in FIG. 10, i.e., calculates the estimated differential output VO2(k+d) bar which is an estimated value of the differential output VO2 of the $O_2$ sensor 12 after the total dead time d from the present control cycle in STEP8.

Specifically, the estimator 24 calculates the coefficients α1, α2, β(j) (j=1, 2, . . . , d) to be used in the equation (18), using the gain coefficients a1, a2, b1 determined in STEP7 (these values are basically the identified gain coefficients a1(k) hat, a2(k) hat, b1(k) hat which have been limited in STEP6-8 shown in FIG. 12) according to the definitions in the equation (16).

Then, the estimator 24 calculates the estimated differential output VO2(k+d) bar (estimated value of the differential output VO2 after the total dead time d from the time of the present control cycle) according to the equation (18), using the two time-series data VO2(k), VO2(k−1), from before the present control cycle, of the differential output VO2 of the $O_2$ sensor 12 which are calculated in each control cycle in STEP3 shown in FIG. 10, the (d2−1) time-series data rkcmd/t(k), . . . , rkcmd/t(k−d2+2) of the present and past values of the actually used target combined differential air-fuel ratio rkcmd/t calculated in each control cycle in STEP 4, and the coefficients α1, α2, β(j) (j=1, 2, . . . , d) calculated as described above.

The estimated differential output VO2(k+d) bar which has been calculated as described above is limited to a predetermined allowable range in order that its value will be prevented from being excessively large or small. If its value is in excess of the upper or lower limit of the predetermined allowable range, it is forcibly set to the upper or lower limit of the predetermined allowable range. In this manner, the value of the estimated differential output VO2(k+d) bar is finally determined. Usually, however, the value calculated according to the equation (18) becomes the estimated differential output VO2(k+d) bar.

After the estimator 24 has determined the estimated differential output VO2(k+d) bar for the $O_2$ sensor 12, the sliding mode controller 15 and the target differential air-fuel ratio calculator 26 calculate the target differential air-fuel ratio kcmd/(k) in the present control cycle in STEP9.

Figure 13:
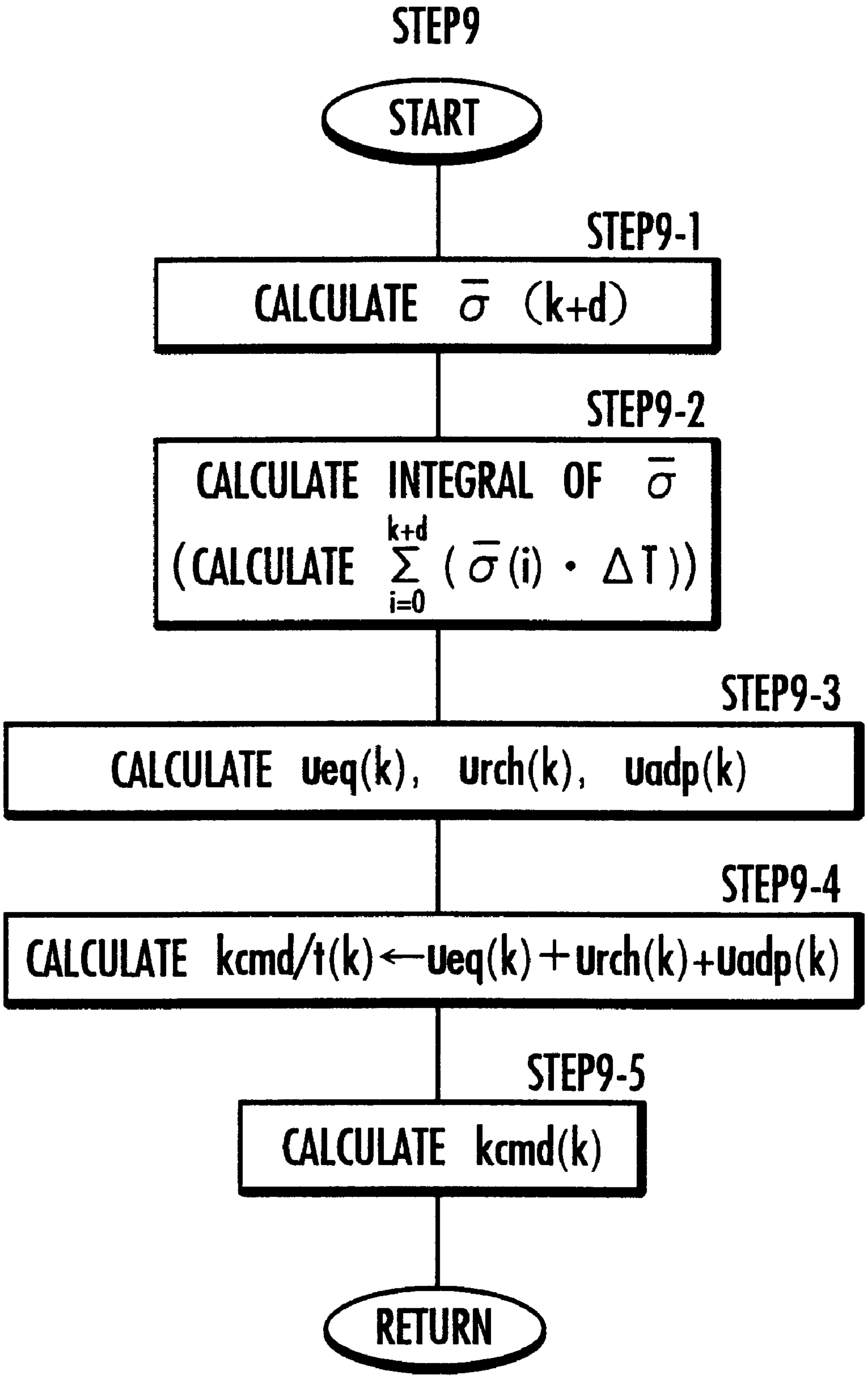
FIG. 13 is a flowchart of still another subroutine of the processing sequence shown in FIG. 10.

The calculating subroutine of STEP9 is shown in detail in FIG. 13.

The sliding mode controller 25 calculates the target combined differential air-fuel ratio kcmd/t(k) in STEP9-1 through STEP9-4.

As shown in FIG. 13, the sliding mode controller 25 calculates a value σ(k+d) bar (corresponding to an estimated value, after the total dead time d, of the switching function σ defined according to the equation (19)) of the switching function σ bar defined according to the equation (28) after the total dead time d from the present control cycle in STEP9-1.

At this time, the value of the switching function σ(k+d) bar is calculated according to the equation (28), using the present value VO2(k+d) bar and the preceding value VO2 (k+d−1) bar (more accurately, their limited values) of the estimated differential output VO2 bar determined according to the equation (8) by the estimator 24 in STEP8.

If the value of the switching function σ(k+d) bar is excessively large, then the value of the reaching control law input Urch determined depending on the value of the switching function σ bar tends to be excessively large and the adaptive control law input Uadp tends to change abruptly, making the target combined differential air-fuel ratio kcmd/t (the control input to the equivalent exhaust system 18) determined by the sliding mode controller 25 inappropriate in converging the output VO2/OUT of the $O_2$ sensor 12 stably to the target value VO2/TARGET. According to the present embodiment, therefore, the value of the switching function σ bar is determined to fall within a predetermined allowable range, and if the value of the σ bar determined according to the equation (28) exceeds the upper or lower limit of the predetermined allowable range, then the value of the σ bar is forcibly set to the upper or lower limit of the predetermined allowable range.

Then, the sliding mode controller 25 accumulatively adds the product σ(k+d) bar·ΔT of the value of the switching function σ(k+d) bar calculated in each control cycle and the period ΔT (constant period) of the control cycles of the exhaust system controller 15, i.e., adds the product σ(k+d) bar·ΔT of the σ(k+d) bar calculated in the present control cycle and the period ΔT to the sum determined in the preceding control cycle, thereby calculating an integrated value (hereinafter expressed by Σσ bar) of the σ bar which is the calculated result of the term Σ(σ bar·ΔT) in the equation (30) in STEP9-2.

In order to prevent the adaptive control law input Uadp, determined depending on the integrated value Σσ bar, from becoming excessively large, the integrated value Σσ bar is determined to fall within a predetermined allowable range. If the integrated value Σσ bar exceeds the upper or lower limit of the predetermined allowable range, then the integrated value $\Sigma\sigma$ bar is forcibly set to the upper or lower limit of the predetermined allowable range.

The integrated value $\Sigma\sigma$ bar remains to be the present value (the value determined in the preceding control cycle) if the flag f/prism/on set in STEPd in FIG. 8 is "0", i.e., if the target air-fuel ratio KCMD generated by the exhaust system controller 15 is not used by the fuel supply controller 15.

Then, the sliding mode controller 25 calculates, STEP9-3, the equivalent control input Ueq(k), the reaching control law input Urch(k), and the adaptive control law input Uadp(k) corresponding to the present control cycle according to the respective equations (27), (29), (30), using the present value VO2(k+d) bar and the preceding value VO2(k+d−1) bar of the estimated differential output VO2 bar determined by the estimator 24 in STEP8, the value $\sigma$(k+d) bar of the switching function $\sigma$ bar and the integrated value $\Sigma\sigma$ bar which have been determined respectively in STEP9-1, STEP9-2 in the present control cycle, and the gain coefficients a1, a2, b1 determined in STEP7 (these values are basically the identified gain coefficients a1(k) hat, a2(k) hat, b1(k) hat determined by the identifier 23 in STEP6 in the present control cycle).

The sliding mode controller 25 adds the equivalent control input Ueq(k), the reaching control law input Urch(k), and the adaptive control law input Uadp(k) determined in STEP9-4 according to the equation (21), thus calculating a target combined differential air-fuel ratio kcmd/t(k) in the present control cycle, i.e., a control input to be given to the equivalent exhaust system 18 for converging the output VO2/OUT of the $O_2$ sensor 12 to the target value VO2/TARGET in STEP9-4.

Then, the target differential air-fuel ratio calculator 26 calculates the target differential air-fuel ratio kcmd(k) in the present control cycle according to the equation (5) in STEP9-5.

Specifically, the target differential air-fuel ratio calculator 26 calculates the right side of the equation (5) from the target combined differential air-fuel ratio kcmd/t(k) determined by the sliding mode controller 25 in STEP9-4 and the time-series data kcmd(k−1), kcmd(k−dD), kcmd(k−dD−1) of the past values of the target differential air-fuel ratio kcmd determined in the past control cycles by the target differential air-fuel ratio calculator 26 itself, thus determining the target differential air-fuel ratio kcmd(k) in the present control cycle.

Details of the processing in STEP9 have been described above.

In FIG. 10, the exhaust system controller 15 carries out a process of determining the stability of the adaptive sliding mode control process carried out by the sliding mode controller 25, more specifically, the stability of a controlled state (hereinafter referred to as "SLD controlled state") of the output VO2/OUT of the $O_2$ sensor 12 based on the adaptive sliding mode control process, and sets a value of a flag f/stb indicative of whether the SLD controlled state is stable or not in STEP10.

Figure 14:
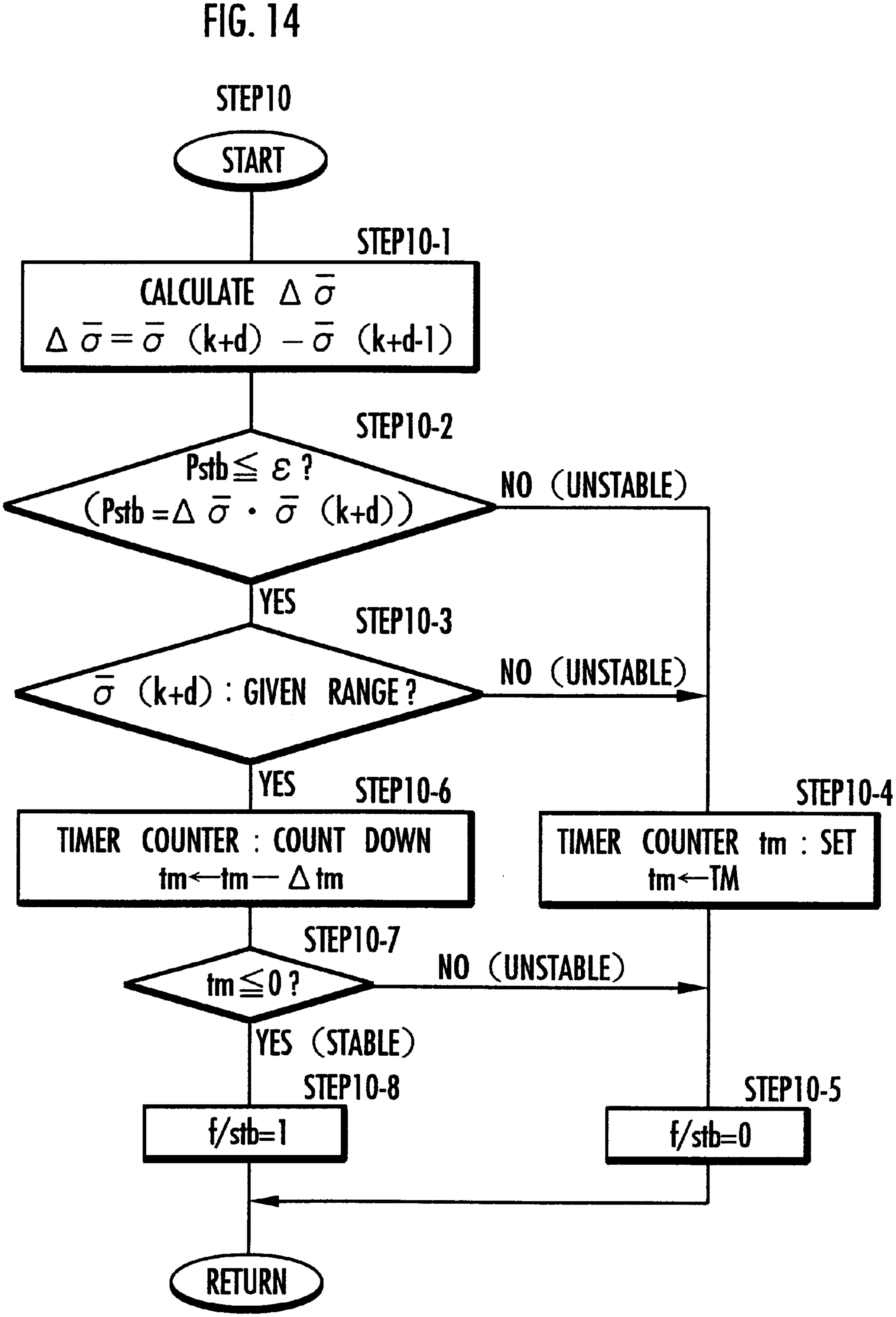
FIG. 14 is a flowchart of yet another subroutine of the processing sequence shown in FIG. 10.

The process of determining the stability of the adaptive sliding mode control process is performed according to a flowchart shown in FIG. 14.

As shown in FIG. 14, the exhaust system controller 15 calculates a difference $\Delta\sigma$ bar (corresponding to a rate of change of the switching function $\sigma$ bar) between the present value $\sigma$(k+d) bar and the preceding value $\sigma$(k+d−1) bar of the switching function $\sigma$ bar calculated in STEP9-1 by the sliding mode controller 25 in STEP10-1.

Then, the exhaust system controller 15 decides whether or not a product $\Delta\sigma$ bar·$\sigma$(k+d) bar (corresponding to the time-differentiated function of a Lyapunov function $\sigma$ bar$^2$/2 relative to the $\sigma$ bar) of the difference $\Delta\sigma$ bar and the present value $\sigma$(k+d) bar of the switching function $\sigma$ bar is equal to or smaller than a predetermined value $\epsilon$ (>0) in STEP10-2.

The product $\Delta\sigma$ bar·$\sigma$(k+d) bar (hereinafter referred to as "stability determining parameter Pstb") will be described below. When the stability determining parameter Pstb is Pstb>0, the value of the switching function $\sigma$ bar is basically changing away from "0". When the stability determining parameter Pstb is Pstb <0, the value of the switching function $\sigma$ bar is basically converged to or converging to "0". Generally, in order to converge the controlled quantity stably to the target value in the sliding mode control process, it is necessary that the value of the switching function be stably converged to "0". Therefore, it can be determined whether the SLD controlled state is stable or unstable depending on whether or not the value of the stability determining parameter Pstb is equal to or smaller than "0".

However, if the stability of the SLD controlled state is judged by comparing the value of the stability determining parameter Pstb with "0", then the determined stability is affected merely when the switching function $\sigma$ bar contains slight noise.

According to the present embodiment, the predetermined value $\epsilon$ to be compared with the stability determining parameter Pstb is of a positive value slightly greater than "0".

If Pstb>$\epsilon$ in STEP10-2, then the SLD controlled state is judged as being unstable, and the value of a timer counter tm (count-down timer) is set to a predetermined initial value TM (the timer counter tm is started) in order to inhibit the processing operation of the fuel supply controller 16 using the target air-fuel ratio KCMD(k) (=kcmd(k)+FLAF/BASE) which corresponds to the target differential air-fuel ratio kcmd(k) calculated in STEP9, for a predetermine period in STEP10-4. Thereafter, the value of the flag f/stb is set to "0" (the flag f/stb=0 represents that the SLD controlled state is unstable) in STEP10-5. Thereafter, control returns to the main routine shown in FIG. 10.

If Pstb<$\epsilon$ in STEP10-2, then the exhaust system controller 15 decides whether the present value $\sigma$(k+d) bar of the switching function $\sigma$ bar determined by the sliding mode controller 25 in STEP9-1 falls within a predetermined range or not in STEP10-3.

If the present value $\sigma$(k+d) bar of the switching function $\sigma$ bar does not fall within the predetermined range, then since the present value $\sigma$(k+d) bar of the switching function $\sigma$ bar is spaced widely apart from "0", the target combined differential air-fuel ratio kcmd/t(k) or the target differential air-fuel ratio kcmd(k) determined in STEP9 may possibly be inappropriate in converging the output VO2/OUT of the $O_2$ sensor 12 stably to the target value VO2/TARGET. Therefore, if the present value $\sigma$(k+d) bar of the switching function $\sigma$ bar does not fall within the predetermined range in STEP10-3, then the SLD controlled state is judged as being unstable, and the processing of STEP10-4 and STEP10-5 is executed to start the timer counter tm and set the value of the flag f/stb to "0".

Because the value of the switching function $\sigma$ bar is limited in the processing of STEP9-1 that is carried out by the sliding mode controller 25, the judging process of STEP10-3 may be dispensed with. If the present value $\sigma$(k+d) bar of the switching function $\sigma$ bar falls within the predetermined range in STEP10-3, then the sliding mode controller 25 counts down the timer counter tm for a predetermined time Atm in STEP10-6. The sliding mode controller 25 then decides whether or not the value of the timer counter tm is equal to or smaller than "0", i.e., whether a time corresponding to the initial value TM has elapsed from the start of the timer counter tm or not, in STEP10-7.

If tm>0, i.e., if the timer counter tm is still measuring time and its set time has not yet elapsed, then the SLD controlled state tends to be unstable as no substantial time has elapsed since the SLD controlled state was judged as being unstable in STEP10-2 or STEP10-3. Therefore, if tm>0 in STEP10-7, then the value of the flag f/stb is set to "0" in STEP10-5.

If tm≦0 in STEP10-7, i.e., if the set time of the timer counter tm has elapsed, then the SLD controlled state is judged as being stable, and the value of the flag f/stb is set to "1" (the flag f/stb=1 represents that the SLD controlled state is stable) in STEP10-8.

According to the above processing sequence, if the SLD controlled state is judged as being unstable, then the value of the flag f/stb is set to "0", and if the SLD controlled state is judged as being stable, then the value of the flag f/stb is set to "1".

The above process of determining the stability of the SLD controlled state is illustrated by way of example. However, the stability of the SLD controlled state may be determined by another process. For example, the frequency with which the value of the stability determining parameter Pstb is greater than the predetermined value $\epsilon$ in each predetermined period longer than the control cycles may be determined. If the frequency is in excess of a predetermined value, then the SLD controlled state may be judged as being unstable. Otherwise, the SLD controlled state may be judged as being stable.

Referring back to FIG. 10, after a value of the flag f/stb indicative of the stability of the SLD controlled state has been set, the exhaust system controller 15 determines the value of the flag f/stb in STEP11. If the value of the flag f/stb is "1", i.e., if the SLD controlled state is judged as being stable, then the exhaust system controller 15 limits the target differential air-fuel ratio kcmd(k) to its value determined in STEP9 in the present control cycle in STEP12.

Specifically, the exhaust system controller 15 determines whether the value of the target differential air-fuel ratio kcmd(k) falls within a predetermined allowable range or not. If the value of the target differential air-fuel ratio kcmd(k) falls within the predetermined allowable range, then the exhaust system controller 15 forcibly limits the value of the target differential air-fuel ratio kcmd(k) to the upper or lower limit of the predetermined allowable range.

The adder 27 adds the reference air-fuel ratio FLAF/BASE to the limited target differential air-fuel ratio kcmd(k) (which is usually the target differential air-fuel ratio kcmd(k) determined in STEP9), thereby determining the target air-fuel ratio KCMD(k) in the present control cycle in STEP13. The processing sequence of the exhaust system controller 15 in the present control cycle is now finished.

If f/stb=0 in STEP11, i.e., if the SLD controlled state is unstable in STEP10, then the exhaust system controller 15 performs the processing in STEP14 to set the target differential air-fuel ratio kcmd(k) in the present control cycle to a predetermined value (e.g., "0"). Then, after the exhaust system controller 15 determines the target air-fuel ratio KCMD(k), the processing sequence of the exhaust system controller 15 in the present control cycle is finished.

The target differential air-fuel ratio kcmd finally determined in each control cycle in STEP12 or STEP14 is stored as time-series data in a memory (not shown) in order for the target differential air-fuel ratio calculator 26 to determine a new target differential air-fuel ratio kcmd(k) in each control cycle. The target air-fuel ratio KCMD determined in STEP13 is stored as time-series data in the exhaust system controller 15 for use in the processing operation of the fuel supply controller 16.

Details of the processing sequence of the air-fuel ratio control apparatus have been described above.

Operation of the air-fuel ratio control apparatus will be summarized as follows:

The exhaust system controller 15 sequentially determines the target air-fuel ratio KCMD (the target value for the outputs KACT/A, KACT/B of the LAF sensors 13, 14) for the cylinder groups 3, 4 in order to converge (set) the output VO2/OUT of the $O_2$ sensor 12 downstream of the catalytic converters 9, 10, 11. The exhaust system controller 15 adjusts the fuel injection quantity for the cylinder groups 3, 4 in order to converge the outputs KACT/A, KACT/B of the LAF sensors 13, 14 to the target air-fuel ratio KCMD. In this manner, the air-fuel ratio in each of the cylinder groups 3, 4 is feed-back controlled at the target air-fuel ratio KCMD, and hence the output VO2/OUT of the $O_2$ sensor 12 is converted to the target value VO2/TARGET. As a result, the catalytic converters 9, 10, 11 as a whole can have an optimum purifying capability regardless of their deterioration.

At this time, the exhaust system controller 15 regards the object exhaust system 17 (see FIG. 1) as being equivalent to the equivalent exhaust system 18 (see FIG. 3) which is a 1-input, 1-output system, and defines the combined differential air-fuel ratio kact/t (=KACT/T−FLAF/BASE) as the single input quantity to the equivalent exhaust system 18 according to the filtering process of the mixed model type. For determining the target air-fuel ratio KCMD for the cylinder groups 3, 4, the exhaust system controller 15 regards the equivalent exhaust system 18 as a system to be controlled, and determines the target combined differential air-fuel ratio kcmd/t as the control input to the equivalent exhaust system 18 which is required to converge the output VO2/OUT of the $O_2$ sensor 12 to the target value VO2/TARGET. Based on the characteristics of filtering process of the mixed model type, the exhaust system controller 15 uses the target air-fuel ratio KCMD commonly for the cylinder groups 3, 4, and determines the correlation between t he target air-fuel ratio KCMD and the target combined differential air-fuel ratio kcmd/t according to the equation (4), and determines the target air-fuel ratio KCMD indirectly from the target combined differential air-fuel ratio kcmd/t.

Since the equivalent exhaust system 18 is a 1-input, 1-output system, the model of the equivalent exhaust system 18 can be of a relatively simple arrangement as indicated by the equation (1) in order to determine the target combined differential air-fuel ratio kcmd/t, and an algorithm for determining the target combined differential air-fuel ratio kcmd/t using the model can also be of a relatively simple arrangement. Therefore, the exhaust system controller 15 does not require a complex algorithm and model for determining the target air-fuel ratio KCMD for each of the cylinder groups 3, 4, but can determine the target air-fuel ratio KCMD for the cylinder groups 3, 4 which is appropriate for converging the output VO2/OUT of the $O_2$ sensor 12 to the target value VO2/TARGET.

In order for the exhaust system controller 15 to determine the target combined differential air-fuel ratio kcmd/t, the equivalent exhaust system 18 as an object to be controlled is modeled with a response delay element and a dead time element due to the catalytic converters 9, 10, 11 and the auxiliary exhaust pipes 6, 7, and the air-fuel ratio manipulating system (composed of the fuel supply controller 16 and the engine 1) as a system for generating the input quantity to the equivalent exhaust system 18 is molded as a dead time element. According to the algorithm constructed on the basis of these models, the estimator 24 sequentially determines, in each control cycle, the estimated differential output VO2 bar which is an estimated value of the differential output VO2 from the $O_2$ sensor 12 after the total dead time d which is the sum of the dead time d1 of the equivalent exhaust system 18 and the dead time d2 of the air-fuel ratio manipulating system.

The sliding mode controller 25 of the exhaust system controller 15 determines the target combined differential air-fuel ratio kcmd/t in order to converge the estimated differential output VO2 bar to "0" and hence converge the output VO2/OUT of the $O_2$ sensor 12 to the target value VO2/TARGET, according to the algorithm of the adaptive sliding mode control process which is highly stable against the effect of a disturbance.

Therefore, the exhaust system controller 15 can determine the target combined differential air-fuel ratio kcmd/t suitable for converging the output VO2/OUT of the $O_2$ sensor 12 to the target value VO2/TARGET and hence the target air-fuel ratio KCMD suitable for the cylinder groups 3, 4, while compensating for the dead time d1 of the equivalent exhaust system 18, the dead time d2 of the air-fuel ratio manipulating system, and the effect of a disturbance. As a result, the control process of converging the output VO2/OUT of the $O_2$ sensor 12 to the target value VO2/TARGET can be performed highly stably.

The identifier 23 of the exhaust system controller 15 sequentially identifies, on a real-time basis, the identified values of the gain coefficients a1, a2, b1, which are parameters of the equivalent exhaust system 18 used by the estimator 24 and the sliding mode controller 25 in their operating processes, i.e., the identified gain coefficients a1 hat, a2 hat, b1 hat.

Therefore, the estimated differential output VO2 bar of the $O_2$ sensor 12 can be determined accurately depending on the actual behavior of the object exhaust system 18 as a basis for the equivalent exhaust system 18, and the target combined differential air-fuel ratio kcmd/t required to converge the output VO2/OUT of the $O_2$ sensor 12 to the target value VO2/TARGET can also be determined appropriately depending on the actual behavior of the object exhaust system 18.

As a consequence, the output VO2/OUT of the $O_2$ sensor 12 can be converged to the target value VO2/TARGET extremely highly stably and quickly, allowing the catalytic converters 9, 10, 11 to achieve an optimum purifying capability reliably.

In the present embodiment, the estimator 24 determines the estimated differential output VO2 bar according to the equation (18), using the outputs KACT/A, KACT/B of the LAF sensors 13, 14, i.e., the combined differential air-fuel ratio kact/t determined from the detected value of the air-fuel ratio of the air-fuel mixture combusted in the cylinder groups 3, 4, and the target air-fuel ratio actually used by the fuel supply controller 16 to manipulate the air-fuel ratio in the cylinder groups 3, 4, i.e., the actually used target combined differential air-fuel ratio rkcmd/t determined by the actually used target air-fuel ratio RKCMD. Therefore, the estimated differential output VO2 bar is determined depending on the actually manipulated state of the air-fuel ratio in the cylinder groups 3, 4 and the actual air-fuel ratio of the air-fuel mixture in the cylinder groups 3, 4, and hence is highly reliable.

In the present embodiment, inasmuch as the model of the equivalent exhaust system 18 is constructed as a discrete time model, the algorithm of the processing sequences of the estimator 24, the sliding mode controller 25, and the identifier 23 can easily be constructed.

Figure 15:
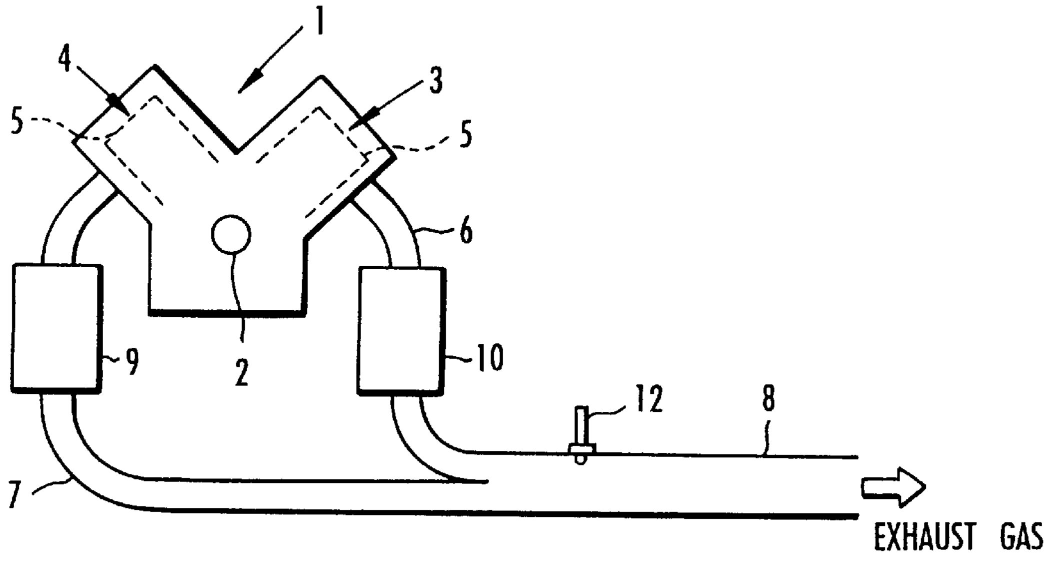
FIG. 15 is a block diagram of an exhaust system of a V-type engine as a multicylinder internal combustion engine.
Figure 17:
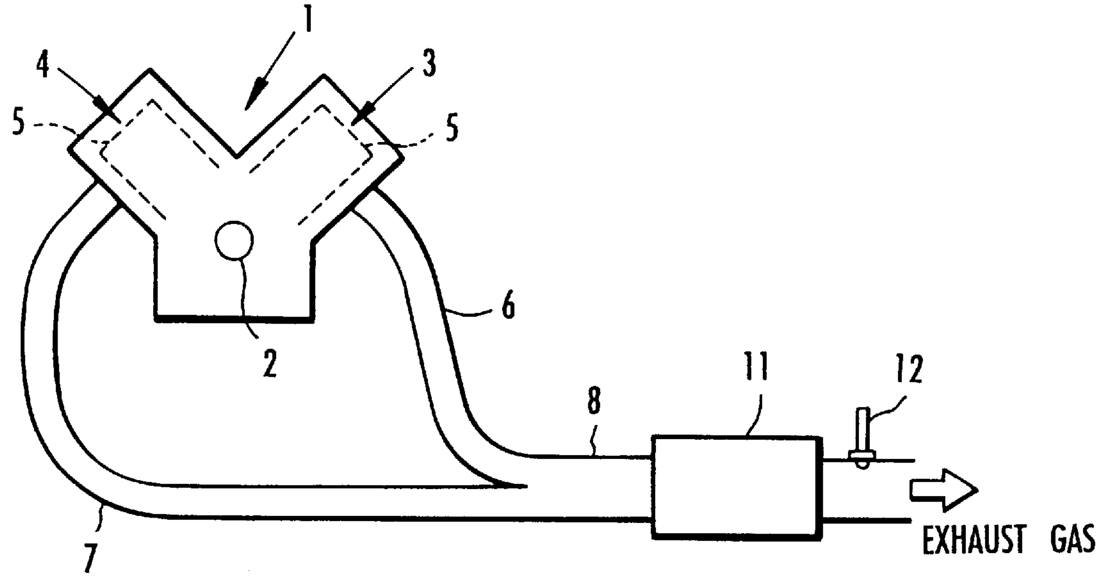
FIG. 17 is a block diagram of still another exhaust system of a V-type engine as a multicylinder internal combustion engine.
Figure 18:
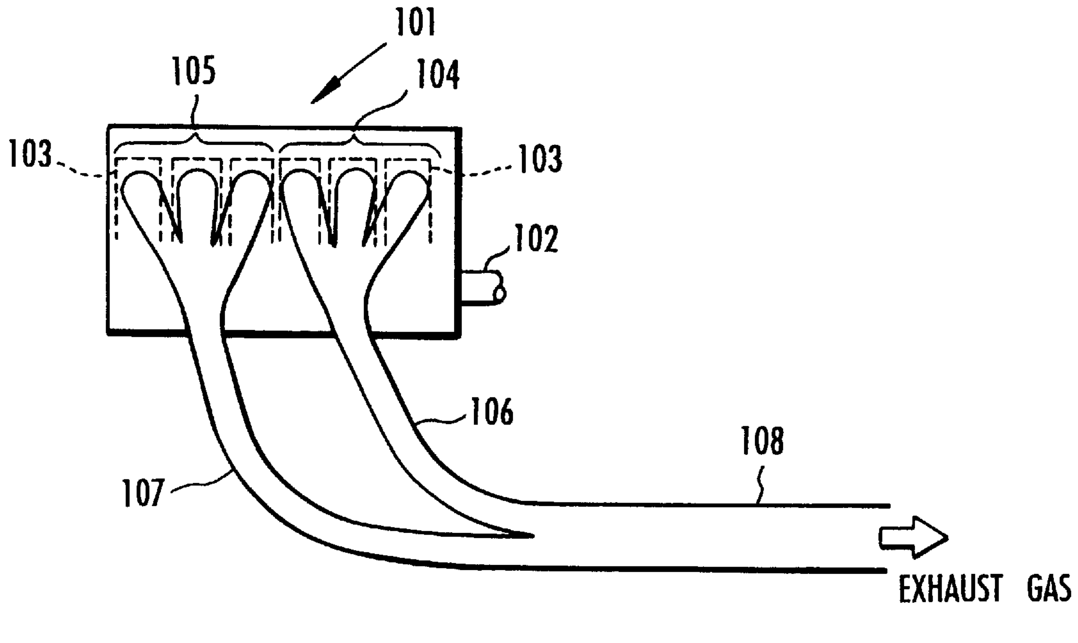
FIG. 18 is a block diagram of an exhaust system of an in-line 6-cylinder engine as a multicylinder internal combustion engine.

In the present embodiment, the fuel supply controller 16 uses the adaptive controller 38 of the recursive type for converging the outputs KACT/A, KACT/B of the LAF sensors 13, 14 to the target air-fuel ratio KCMD, the fuel supply controller 16 can perform its converging process highly quickly and stably, for thereby appropriately compensating for response delay characteristics of the engine The air-fuel ratio control apparatus according to the present invention is not limited to the above embodiment, but may be modified as follows:

In the above embodiment, the air-fuel ratio control apparatus for the engine 1 has been described with the engine 1 being a V-type 6-cylinder engine having the exhaust system arrangement shown in FIG. 16. However, the engine 1 may be a V-type type having the exhaust system arrangement shown in FIG. 15 or 17, or an in-line 6-cylinder engine shown in FIG. 18. Furthermore, a system to which the present invention is applied can be constructed for a V-type 8-cylinder engine. In this case, the local feedback controller 36 of each of the feedback controllers 33, 34 of the fuel supply controller 16 is constructed for controlling the air-fuel ratio in four cylinders.

In the above embodiment, the estimator 24 determines the estimated differential output VO2 bar of the $O_2$ sensor 12 according to the equation (18). However, the estimator 24 may determine the estimated differential output VO2 bar according to the equation (16) or (17). According the equation (16), the estimated differential output VO2(k+d) bar can be determined from the time-series data VO2(k), VO2(k−1) of the differential output VO2 of the $O_2$ sensor 12 and the time-series data kcmd/t(k−j) (j=1, 2, . . . , d) of the past values of the target combined differential air-fuel ratio kcmd/t determined by the sliding mode controller 25. According to the equation (17), the estimated differential output VO2(k+d) bar can be determined from the time-series data VO2(k), VO2(k−1) of the differential output VO2 of the $O_2$ sensor 12, the time-series data kcmd/t(k−j) (j=1, 2, . . . , d2−1) of the past values of the target combined differential air-fuel ratio kcmd/t, and the time-series data kact/t(k+d2−i) (i=d2, d2+1, . . . , d) of the present and past values of the combined differential air-fuel ratio kact/t determined by the first filter 21.

With the above modifications, the second filter 29 and the subtractor 28 shown in FIG. 4 may be dispensed with, and their operating processes may be dispensed with. However, it is preferable to determine the estimated differential output VO2 bar according to the equation (18) for increasing the reliability of the estimated differential output VO2 bar in the cylinder groups 3, 4.

If the target air-fuel ratio KCMD determined by the exhaust system controller 15 according to the operating processes of the estimator 24 and the sliding mode controller 25 is used by the fuel supply controller 16 at all times, then the estimated differential output VO2(k+d) bar may be determined according to either one of the equations (17), (18). It is preferable to determine the estimated differential output VO2 bar according to the equation (17).

The estimator 24 has been described in the embodiment with the dead time d2 of the air-fuel ratio manipulating system being d2=3 (more generally d2>1), for example. If d2=1, i.e., if the dead time d2 of the air-fuel ratio manipulating system is about the same as the period of the control cycles of the exhaust system controller 15, then when the equation (8) is applied to the equation (16), the following equation (42), which is similar to the equation (17) except that the term including "kcmd/t" is removed, is obtained:

$$\overline{VO2}(k+d) = \alpha 1 \cdot VO2(k) + \alpha 2 \cdot VO2(k-1) + \sum_{j=1}^{d} \beta j \cdot kact/t(k+1-j) \quad (42)$$

(d2=1)

Therefore, if the dead time d2 of the air-fuel ratio manipulating system can be set to "1", then it is possible to sequentially determine the estimated differential output VO2 (k+d) bar from the time-series data VO2(k), VO2(k−1) of the differential output VO2 of the $O_2$ sensor 12 and the time-series data kact/t(k+1−i) (i=1, 2, . . . , d) of the present and past values of the combined differential air-fuel ratio kact/t determined by the first filter 21. In this case, the second filter 29 and the subtractor 28 shown in FIG. 4 may be dispensed with.

If the dead time d2 of the air-fuel ratio manipulating system is negligibly smaller than the period of the control cycles of the exhaust system controller 15, then the target combined differential air-fuel ratio kcmd/t can be determined by compensating for only the effect of the dead time d1 of the equivalent exhaust system 18 specifically, if d2=0, then since kact/t(k)=kcmd/t(k) from the equation (8), it is applied to the equation (16) to obtain the following equation (43):

$$\begin{aligned}\overline{VO2}(k+d) &= \overline{VO2}(k+d1) \\ &= \alpha 1 \cdot VO2(k) + \alpha 2 \cdot VO2(k-1) + \sum_{j=1}^{d1} \beta j \cdot kact/t(k-j)\end{aligned} \quad (43)$$

(d2=0, d=d1)

Therefore, the estimator 24 can determine the estimated differential output VO2(k+d1) bar of the $O_2$ sensor 12 after the dead time d1 (=the dead time of the equivalent exhaust system 18) according to the equation (43). In this case, the sliding mode controller 25 may determine the equivalent control input Ueq, the reaching control law input Urch, and the adaptive control law input Uadp according to the equations (27)–(30) where d=d1, and determine the sum of the determined control law inputs as the target combined differential air-fuel ratio kcmd/t.

With the above modification, the second filter 29 and the subtractor 28 shown in FIG. 4 may be dispensed with.

If the dead time d1 of the equivalent exhaust system 18, i.e., a shorter one of the cylinder-group-3-side exhaust system dead time dA and the cylinder-group-4-side exhaust system dead time dB, is sufficiently shorter than the period of the control cycles of the exhaust system controller 15, then the estimator 24 may be dispensed with. In this case, the processing sequence of the estimator 24 of the exhaust system controller 15 in the above embodiment is dispensed with, i.e., the processing in STEP 8 shown in FIG. 10 is dispensed with. The sliding mode controller 25 may determine the equivalent control input Ueq, the reaching control law input Urch, and the adaptive control law input Uadp according to the equations (22), (23), (25) where d=0, and determine the sum of the determined control law inputs as the target combined differential air-fuel ratio kcmd/t.

With the above modification, too, the second filter 29 and the subtractor 28 may be dispensed with.

In the above embodiment, since the cylinder-group-3-side exhaust system dead time dA is larger than the cylinder-group-4-side exhaust system dead time dB, and the difference dD between cylinder-group-3-side exhaust system dead time dA and the cylinder-group-4-side exhaust system dead time dB is dD>0, the target differential air-fuel ratio calculator 26 determines the target differential air-fuel ratio kcmd according to the equation (5). If the difference dD between cylinder-group-3-side exhaust system dead time dA and the cylinder-group-4-side exhaust system dead time dB is substantially "0", however, the target differential air-fuel ratio calculator 26 may determine the target differential air-fuel ratio kcmd according to the equation (6).

In the above embodiment, the sliding mode controller 25 determines the target combined differential air-fuel ratio kcmd/t according to the adaptive sliding mode control process. However, the sliding mode controller 25 may determine the target combined differential air-fuel ratio kcmd/t according to an ordinary sliding mode control process which does not employ an adaptive algorithm. In this case, the sliding mode controller 25 may calculate the sum of the equivalent control input Ueq and the reaching control law input Urch as the target combined differential air-fuel ratio kcmd/t.

In the above embodiment, the algorithm of the sliding mode control process is used to determine the target combined differential air-fuel ratio kcmd/t. However, any of various other feedback control processes including an adaptive control process, an optimum control process, an H∞ control process, etc. may be used.

In the above embodiment, the values of the gain coefficients a1, a2, b1 which are parameters to be set of the model of the equivalent exhaust system 18 are identified on a real-time basis by the identifier 23. However, the gain coefficients a1, a2, b1 may be of predetermined values or may be set using a map from the rotational speed and intake pressure of the engine 1.

In the above embodiment, the model of the equivalent exhaust system 18 for the estimator 24 to determine the estimated differential output VO2 bar and the model of the equivalent exhaust system 18 for the sliding mode controller 25 to determine the target combined differential air-fuel ratio kcmd/t are identical to each other. However, they may be different from each other.

In the above embodiment, the model of the equivalent exhaust system 18 is constructed as a discrete time system. However, the model of the equivalent exhaust system 18 may be constructed as a continuous time system, and an algorithm for determining the estimated differential output VO2 bar of the $O_2$ sensor 12 may be constructed on the basis of the model as a continuous time system and an algorithm of a feedback control process for determining the target combined differential air-fuel ratio kcmd/t may be constructed on the basis of the model as a continuous time system.

In the above embodiment, the LAF sensors (widerange air-fuel ratio sensors) 13, 14 are employed as air-fuel ratio sensors. However, the air-fuel ratio sensors may comprise an ordinary $O_2$ sensor or any of various other types of sensors insofar as it can detect an air-fuel ratio.

In the above embodiment, the $O_2$ sensor 12 is employed as an exhaust gas sensor. However, the exhaust gas sensor may comprise any of various other types of sensors insofar as it can detect the concentration of a certain component of an exhaust gas downstream of the catalytic converter. For example, if carbon monoxide (CO) in an exhaust gas downstream of the catalytic converter is to be controlled, then the exhaust gas sensor may comprise a CO sensor. If nitrogen oxide (NOx) in an exhaust gas downstream of the catalytic converter is to be controlled, the exhaust gas sensor may comprise an NOx sensor. If hydrocarbon (HC) in an exhaust gas downstream of the catalytic converter is to be controlled, the exhaust gas sensor may comprise an HC sensor. When a three-way catalytic converter is employed, then even if the concentration of any of the above gas components is detected, it may be controlled to maximize the purifying performance of the three-way catalytic converter. If a catalytic converter for oxidation or reduction is employed, then purifying performance of the catalytic converter can be increased by directly detecting a gas component to be purified.

Although a certain preferred embodiment of the present invention has been shown and described in detail, it should be understood that various changes and modifications may be made therein without departing from the scope of the appended claims.

What is claimed is:

1. An apparatus for controlling the air-fuel ratio of a multicylinder internal combustion engine having all cylinders divided into a plurality of cylinder groups and an exhaust system including a plurality of auxiliary exhaust passages for discharging exhaust gases produced when an air-fuel mixture of air and fuel is combusted from said cylinder groups, respectively, a main exhaust passage joining said auxiliary exhaust passages together at downstream sides thereof, an exhaust gas sensor mounted in said main exhaust passage for detecting the concentration of a given component in the exhaust gases flowing through said main exhaust passage, and a catalytic converter connected to said auxiliary exhaust passages and/or said main exhaust passage upstream of said exhaust gas sensor, so that the air-fuel ratio of the air-fuel mixture combusted in each of said cylinder groups is controlled to converge an output from said exhaust gas sensor to a predetermined target value, said apparatus comprising:

a plurality of air-fuel ratio sensors mounted respectively in said auxiliary exhaust passages upstream of said catalytic converter, for detecting the air-fuel ratio of the air-fuel mixture combusted in each of said cylinder groups;

said exhaust system including an object exhaust system disposed upstream of said exhaust gas sensor and including said auxiliary exhaust passages and said catalytic converter, said object exhaust system being equivalent to a system for generating an output of said exhaust gas sensor from a combined air-fuel ratio determined by combining the values of air-fuel ratios of air-fuel mixtures combusted by the cylinder groups, respectively, according to a filtering process of the mixed model type;

target combined air-fuel ratio data generating means for sequentially generating target combined air-fuel ratio data representing a target value for said combined air-fuel ratio which is required to converge the output from said exhaust gas sensor to said predetermined target value with said system equivalent to said object exhaust system serving as an object to be controlled;

target air-fuel ratio data generating means for sequentially generating target air-fuel ratio data from the target combined air-fuel ratio data generated by said target combined air-fuel ratio data generating means according to a predetermined converting process based on characteristics of a filtering process identical to said filtering process of the mixed model type, said target air-fuel ratio data representing a target air-fuel ratio for the air-fuel mixture combusted in each of said cylinder groups, said target air-fuel ratio being shared by said cylinder groups, said target combined air-fuel ratio data being produced by subjecting said target air-fuel ratio data to said filtering process; and air-fuel ratio manipulating means for manipulating the air-fuel ratio of the air-fuel mixture combusted in each of said cylinder groups in order to converge an output of each of said air-fuel ratio sensors to the target air-fuel ratio represented by said target air-fuel ratio data generated by said target air-fuel ratio data generating means.

2. An apparatus according to claim 1, wherein said filtering process of the mixed model type comprises a filtering process for obtaining said combined air-fuel ratio in each given control cycle by combining a plurality of time-series values of the air-fuel ratio of the air-fuel mixture combusted in each of said cylinder groups in a control cycle earlier than the control cycle, according to a linear function having said time-series values as components thereof.

3. An apparatus according to claim 2, wherein said target air-fuel ratio data generating means comprises means for generating target air-fuel ratio data in each given control cycle from the target combined air-fuel ratio data generated by said target combined air-fuel ratio data generating means, according to a predetermined operating process determined by a linear function in which said target combined air-fuel ratio data in each given control cycle employs time-series data of said target air-fuel ratio data earlier than the control cycle as components of said linear function.

4. An apparatus according to claim 1, wherein said air-fuel ratio manipulating means comprises means for manipulating the air-fuel ratio of the air-fuel mixture combusted in each of said cylinder groups in order to converge the output of each of said air-fuel ratio sensors to the target air-fuel ratio represented by said target air-fuel ratio data generated by said target air-fuel ratio data generating means, using recursive-type feedback control means respectively for said cylinder groups.

5. An apparatus according to claim 4, wherein each of said recursive-type feedback control means comprises an adaptive controller.

6. An apparatus according to claim 1, wherein said target combined air-fuel ratio data generating means comprises means for generating said target combined air-fuel ratio data in order to converge the output of said exhaust gas sensor to said predetermined target value according to an algorithm of a feedback control process constructed based on a predetermined model of said system equivalent to said object exhaust system which is defined as a system for generating data representing the output of said exhaust gas sensor with at least a response delay from the combined air-fuel ratio data representing said combined air-fuel ratio.

7. An apparatus according to claim 6, wherein said algorithm of the feedback control process performed by said target combined air-fuel ratio data generating means comprises an algorithm of a sliding mode control process.

8. An apparatus according to claim 7, wherein said sliding mode control process comprises an adaptive sliding mode control process.

9. An apparatus according to claim 7, wherein said algorithm of the sliding mode control process employs, as a switching function for the sliding mode control process, a linear function having, as components, a plurality of time-series data of the difference between the output of said exhaust gas sensor and said predetermined target value.

10. An apparatus according to claim 6, wherein said model comprises a model which expresses a behavior of said system equivalent to said object exhaust system with a discrete time system.

11. An apparatus according to claim 10, wherein said model comprises a model which expresses data representing the output of said exhaust gas sensor in each given control cycle with data representing the output of said exhaust gas sensor in a past control cycle prior to the control cycle and said combined air-fuel ratio data.

12. An apparatus according to claim 10, further comprising first filtering means for sequentially determining said combined air-fuel ratio data by effecting a filtering process identical to said filtering process of the mixed model type on the output of each of said air-fuel ratio sensors, and identifying means for sequentially identifying a value of a parameter to be set of said model using the combined air-fuel ratio data determined by said first filter means and the data representing the output of said exhaust gas sensor, wherein said algorithm of the feedback control process performed by said target combined air-fuel ratio data generating means comprises an algorithm for generating said target combined air-fuel ratio data using the value of said parameter identified by said identifying means.

13. An apparatus according to claim 1, further comprising estimating means for sequentially generating data representing an estimated value of the output of said exhaust gas sensor after a dead time according to an algorithm constructed based on a predetermined model of said system equivalent to said object exhaust system which is defined as a system for generating data representing the output of said exhaust gas sensor with a response delay and said dead time from the combined air-fuel ratio data representing said combined air-fuel ratio, wherein said target combined air-fuel ratio data generating means comprises means for generating said target combined air-fuel ratio data in order to converge the output of said exhaust gas sensor to said predetermined target value according to an algorithm of a feedback control process constructed using the data generated by said estimating means.

14. An apparatus according to claim 13, further comprising first filtering means for sequentially determining said combined air-fuel ratio data by effecting a filtering process identical to said filtering process of the mixed model type on the output of each of said air-fuel ratio sensors, wherein the algorithm performed by said estimating means comprises an algorithm for generating the data representing the estimated value of the output of said exhaust gas sensor using the data representing the output of said exhaust gas sensor and said combined air-fuel ratio data generated by said first filter means.

15. An apparatus according to claim 1, further comprising estimating means for sequentially generating an estimated value of the output of said exhaust gas sensor after a total dead time which is the sum of a dead time of said system equivalent to said object exhaust system and a dead time of a system comprising said air-fuel ratio manipulating means and said multicylinder internal combustion engine, according to according to an algorithm constructed based on a predetermined model of said system equivalent to said object exhaust system which is defined as a system for generating data representing the output of said exhaust gas sensor with a response delay and said dead time from the combined air-fuel ratio data representing said combined air-fuel ratio, and a predetermined model of said system comprising said air-fuel ratio manipulating means and said multicylinder internal combustion engine which is defined as a system for generating said combined air-fuel ratio data with said dead time from said target combined air-fuel ratio data, wherein said target combined air-fuel ratio data generating means comprises means for generating said target combined air-fuel ratio data in order to converge the output of said exhaust gas sensor to said predetermined target value according to an algorithm of a feedback control process constructed using the data generated by said estimating means.

16. An apparatus according to claim 15, further comprising first filtering means for sequentially determining said combined air-fuel ratio data by effecting a filtering process identical to said filtering process of the mixed model type on the output of each of said air-fuel ratio sensors, wherein the algorithm performed by said estimating means comprises an algorithm for generating the data representing the estimated value of the output of said exhaust gas sensor using the data representing the output of said exhaust gas sensor and said combined air-fuel ratio data generated by said first filter means.

17. An apparatus according to claim 15, further comprising first filtering means for sequentially determining said combined air-fuel ratio data by effecting a filtering process identical to said filtering process of the mixed model type on the output of each of said air-fuel ratio sensors, wherein the algorithm performed by said estimating means comprises an algorithm for generating the data representing the estimated value of the output of said exhaust gas sensor using the data representing the output of said exhaust gas sensor, said combined air-fuel ratio data generated by said first filter means, and said target combined air-fuel ratio data.

18. An apparatus according to claim 17, wherein said air-fuel ratio manipulating means comprises means for manipulating the air-fuel ratio of the air-fuel mixture combusted in each of said cylinder groups depending on a target air-fuel ratio other than the target air-fuel ratio represented by said target air-fuel ratio data generated by said target air-fuel ratio data generating means, depending on operating conditions of said multicylinder internal combustion engine, further comprising second filter means for sequentially determining actually used target combined air-fuel ratio data as target combined air-fuel ratio data corresponding to an actual target air-fuel ratio by effecting a filtering process identical to said filtering process of the mixed model type on data representing the actual target air-fuel ratio that is actually used by said air-fuel ratio manipulating means to manipulate the air-fuel ratio in each of said cylinder groups, wherein said estimating means comprises means for generating the data representing the estimated value of the output of said exhaust gas sensor using said actually used target combined air-fuel ratio data determined by said second filter means instead of said target combined air-fuel ratio data.

19. An apparatus according to any one of claims 13 through 18, wherein said model of said system equivalent to said object exhaust system comprises a model which expresses a behavior of said system with a discrete time system.

20. An apparatus according to claim 19, wherein said model of said system equivalent to said object exhaust system comprises a model which expresses the data representing the output of said exhaust gas sensor in each given control cycle, with the data representing the output of said exhaust gas sensor in a past control cycle prior to the control cycle, and said combined air-fuel ratio data in a control cycle which is earlier than the control cycle by a dead time of said system equivalent to said object exhaust system.

21. An apparatus according to claim 19, further comprising identifying means for sequentially identifying values of parameters to be set of said model of said system equivalent to said object exhaust system, using said combined air-fuel ratio data determined by said first filter means and the output representing the output of said exhaust gas sensor, wherein the algorithm performed by said estimating means comprises an algorithm for using the values of said parameters identified by said identifying means in order to generate the data representing the estimated value of the output of said exhaust gas sensor.

22. An apparatus according to claim 21, wherein said algorithm of the feedback control process performed by said target combined air-fuel ratio data generating means comprises an algorithm constructed based on said model of said system equivalent to said object exhaust system, for generating said target combined air-fuel ratio data using the values of said parameters identified by said identifying means.

23. An apparatus according to claim 13 or 15, wherein said model of said system equivalent to said object exhaust system comprises a model which expresses a behavior of said system with a discrete time system.

24. An apparatus according to claim 23, wherein said model of said system equivalent to said object exhaust system comprises a model which expresses the data representing the output of said exhaust gas sensor in each given control cycle, with the data representing the output of said exhaust gas sensor in a past control cycle prior to the control cycle, and said combined air-fuel ratio data in a control cycle which is earlier than the control cycle by a dead time of said system equivalent to said object exhaust system.

25. An apparatus according to any one of claims 13 through 18, wherein said algorithm of the feedback control process performed by said target combined air-fuel ratio data generating means comprises an algorithm for generating said target combined air-fuel ratio data in order to converge the estimated value of the output of said exhaust gas sensor which is represented by the data generated by said estimating means to the predetermined target value.

26. An apparatus according to any one of claims 13 through 18, wherein said algorithm of the feedback control process performed by said target combined air-fuel ratio data generating means comprises an algorithm of a sliding mode control process.

27. An apparatus according to claim 26, wherein said sliding mode control process comprises an adaptive sliding mode control process.

28. An apparatus according to claim 26, wherein said algorithm of the sliding mode control process employs, as a switching function for the sliding mode control process, a linear function having, as components, a plurality of time-series data of the difference between estimated value of the output of said exhaust gas sensor which is represented by the data generated by said estimating means and said predetermined target value.

* * * * *